(12) United States Patent
Abu El Ata

(10) Patent No.: US 11,030,551 B2
(45) Date of Patent: *Jun. 8, 2021

(54) PREDICTIVE DECONSTRUCTION OF DYNAMIC COMPLEXITY

(71) Applicant: X-ACT Science Inc., Tortola (VG)

(72) Inventor: Nabil A. Abu El Ata, New York, NY (US)

(73) Assignee: X-ACT SCIENCE INC., Tortola (VG)

( * ) Notice: Subject to any disclaimer, the term of this patent is extended or adjusted under 35 U.S.C. 154(b) by 0 days.

This patent is subject to a terminal disclaimer.

(21) Appl. No.: 16/837,935

(22) Filed: Apr. 1, 2020

(65) Prior Publication Data

US 2020/0226507 A1 Jul. 16, 2020

Related U.S. Application Data

(63) Continuation of application No. 13/362,786, filed on Jan. 31, 2012, now Pat. No. 10,726,362.

(60) Provisional application No. 61/438,045, filed on Jan. 31, 2011.

(51) Int. Cl.
G06Q 10/00 (2012.01)
G06Q 10/06 (2012.01)

(52) U.S. Cl.
CPC ....... *G06Q 10/06* (2013.01); *G06Q 10/06393* (2013.01)

(58) Field of Classification Search
None
See application file for complete search history.

(56) References Cited

U.S. PATENT DOCUMENTS

| | | |
|---|---|---|
| 6,311,144 B1 | 10/2001 | Abu El Ata |
| 6,560,569 B1 | 5/2003 | Abu El Ata |
| 6,904,449 B1 | 6/2005 | Quinones |
| 6,990,437 B1 | 1/2006 | Abu El Ata |

(Continued)

OTHER PUBLICATIONS

Lorenz (The Essence of Chaos, 1993, University of Washington Press, Chapter 2: A Journey Into Chaos, p. 69, 3rd-4th Paragraph). (Year: 1993).*

(Continued)

*Primary Examiner* — Rutao Wu
*Assistant Examiner* — Scott M Ross
(74) *Attorney, Agent, or Firm* — Hamilton, Brook, Smith & Reynolds, P.C.

(57) ABSTRACT

The dynamic complexity and the operational risk inherent in a system are defined and incorporated into a mathematical model of the system. The mathematical model is emulated to predict the states of instability that can occur within the operation of the system. Dynamic complexity of a service is demonstrated where there is an observed effect where the cause can be multiple and seemingly inter-related effects of a many-to-one or many-to-many relationship. Having assessed the dynamic complexity efficiency and the operational risk index of a service (e.g., a business, process or information technology), these indexes can be employed to emulate all attributes of a service, thereby determining how a service responds in multiple states of operation, the states where the dynamic complexity of a service can occur, optimal dynamic complexity efficiency of a service, and the singularities wherein a service becomes unstable.

28 Claims, 27 Drawing Sheets

(56) References Cited

U.S. PATENT DOCUMENTS

| | | | |
|---|---|---|---|
| 7,031,901 B2 | 4/2006 | Abu El Ata | |
| 7,035,786 B1 | 4/2006 | Abu El Ata et al. | |
| 7,389,211 B2 | 6/2008 | Abu El Ata et al. | |
| 7,783,468 B2 | 8/2010 | Abu El Ata et al. | |
| 7,881,920 B2 | 2/2011 | Abu El Ata et al. | |
| 8,103,456 B2 | 1/2012 | Doniger et al. | |
| 8,280,657 B2 | 10/2012 | Van Gorp et al. | |
| 8,364,519 B1 | 1/2013 | Basu et al. | |
| 8,577,775 B1 | 11/2013 | Gerber | |
| 2002/0077717 A1 | 6/2002 | Harburda et al. | |
| 2004/0249482 A1* | 12/2004 | Abu El Ata | G06Q 10/06 700/44 |
| 2006/0241931 A1* | 10/2006 | Abu el Ata | G06T 11/206 703/27 |
| 2007/0294121 A1 | 12/2007 | Galt et al. | |
| 2007/0294128 A1 | 12/2007 | Wedemeyer | |
| 2007/0299706 A1 | 12/2007 | Galt et al. | |
| 2007/0299720 A1 | 12/2007 | Tafoya | |
| 2008/0162232 A1 | 7/2008 | Gamarnik et al. | |
| 2008/0243543 A1 | 10/2008 | Jung et al. | |
| 2009/0112668 A1* | 4/2009 | Abu El Ata | G06Q 10/06 705/7.27 |
| 2009/0182593 A1 | 7/2009 | Whitmore | |
| 2009/0204234 A1 | 8/2009 | Sustaeta et al. | |
| 2009/0254411 A1 | 10/2009 | Bhattacharya et al. | |
| 2010/0004963 A1* | 1/2010 | Ficery | G06Q 10/10 705/7.38 |
| 2010/0004977 A1 | 1/2010 | Marci et al. | |
| 2010/0191472 A1 | 7/2010 | Doniger et al. | |
| 2011/0078411 A1 | 3/2011 | Maclinovsky et al. | |
| 2011/0295618 A1 | 12/2011 | Naipaul et al. | |
| 2011/0295621 A1 | 12/2011 | Farooq et al. | |
| 2012/0016714 A1 | 1/2012 | Apte et al. | |
| 2012/0022939 A1 | 1/2012 | Tiwari et al. | |
| 2012/0035962 A1 | 2/2012 | Iliff | |
| 2012/0046999 A1 | 2/2012 | Jayaraman et al. | |
| 2012/0197686 A1 | 8/2012 | Abu El Ata | |
| 2012/0210292 A1 | 8/2012 | Zhang et al. | |
| 2012/0316930 A1 | 12/2012 | Clemenson | |
| 2013/0060603 A1 | 3/2013 | Wagner | |
| 2013/0282415 A1 | 10/2013 | Saito et al. | |
| 2015/0333992 A1* | 11/2015 | Vasseur | H04L 12/4641 370/252 |
| 2015/0339263 A1 | 11/2015 | Abu El Ata et al. | |
| 2020/0387845 A1* | 12/2020 | Aasoori | G06Q 10/06375 |

OTHER PUBLICATIONS

Riolli, L., and Savicki, V. "Information System Organizational Resilience," Omega: The International Journal of Management Science (31:3), 2003, pp. 227-233. (Year: 2003).*

J. Barkley Rosser, Jr., "Computational and Dynamic Compliexity in Economics" (Mar. 2007).

Kahkipuro, P., "Performance Modeling Framework for CORBA Based Distributed Systems,"Department of Computer Science Series of Publications A Report A-2000-3, Finland, University of Helsinki (2000).

Kellert, "In the Wake of Chaos: Unpredictable Order in Dynamical Systems," 1993, University of Chicago Press.

Lorenz, "The Essence of Chaos," 1993, University of Washington Press, Chapter 2: A Journey Into Chaos, p. 69, 3rd-4th Paragraph.

Morrison, "The Art of Modeling Dynamic Systems: Forecasting for Chaos, Randomness, and Determinism," 1991, Turtle Hollow Associates, Inc.

"UML Based Performance Modeling," Chapter 5, pp. 75-167.

Wickboldt, "Improving IT Change Management Processes with Automated Risk Assessment," 2009, In IEEE International Workshop on Distributed Systems: Operations and Management, pp. 71-84 (Year: 2009).

Setzer, "Decision Support for Service Transition Management," 2008, In NOMS 2008-2008 IEEE Network Operations and Management Symposium, pp. 200-207 (Year: 2008).

* cited by examiner

MODEL EXTERNAL ENTITY DATABASE

| NAME | QUANTITY | AVAILABLE TIME(S) | IT RESOURCES | RESPONSE TIME(S) |
|---|---|---|---|---|
| ACCOUNT OPERATOR | 72 | 144,000 | WORKSTATION_01 (1) | N/A |
| SALES OPERATOR | 25 | 275,000 | WORKSTATION_05 (1) | N/A |
| CUSTOMER SERVICE | 17 | 126,000 | WORKSTATION_02 (1) | N/A |
| IT TECHNICIAN | 8 | 168,000 | WORKSTATION_06 (2) | N/A |
| ACCOUNT AUDIT | N/A | N/A | TX_ACCT_DATA | 172,800 |
| SHIP PRODUCT | N/A | N/A | N/A | 259,200 |

MANAGEMENT MODEL

PREDICTIVE DECONSTRUCTION OF DYNAMIC COMPLEXITY

RELATED APPLICATIONS

This application is a continuation of U.S. application Ser. No. 13/362,786, filed Jan. 31, 2012, which claims the benefit of U.S. Provisional Application No. 61/438,045, filed on Jan. 31, 2011. The entire teachings of the above applications are incorporated herein by reference.

BACKGROUND

Current approaches to considering complex environments and systems are typically based on analysis where the functional and non-functional characteristics and attributes of a system are loosely coupled.

This assumption implies a limited inter-relationship between the attributes and it would follow that standard queuing mechanisms can be used to determine the optimum service. It is the claim of this discovery is that this is over simplistic; in that in a large class of important real systems there is a strong relationship between a dynamic system's characteristics—functional and non-functional—that combine and need to be balanced to determine a system's optimal service. In fact in these systems queues are symptoms rather than causes.

When system characteristics and attributes are closely coupled they affect each other and in so doing they create unpredictable states or singularities. Dynamic complexity is a measure of interactions between components in an environment. In a dynamically complex environment, the result of such interactions can be difficult to predict, and may cause the system to enter an unexpected state or singularity. Such behavior is destabilizing and dangerous, not just for the system itself, but the environments that surround the system. Emulation of a dynamic system is described in further detail in U.S. Pat. No. 7,389,211, as well as U.S. patent application Ser. No. 12/262,453, titled "Dynamic Service Emulation of Corporate Performance," published as U.S. Pub 2009/0112668, the entirety of which are incorporated herein by reference. In the aforementioned publication, systems and methods are disclosed that provide a predictive model, the model indicating the timing of an event, the amplitude of that event and the combination of actions or attributes within a system that combine to cause the event.

In a system with high dynamic complexity, the occurrence of such events, and the interactions between them, becomes myriad. Under these conditions, the system may become unstable. Under current methods and approaches there is no method or approach to determine the level of dynamic complexity or which of the attributes or events within the operation of a system combine to have greatest impact on the system.

Under typical methods, static complexity of a service is the only dimension of complexity that is considered today, and is typically demonstrated by cause and effect, being a one-to-one relationship. Such an analysis suffers considerable limitation in dealing and assessing the impact of complexity.

SUMMARY

Example embodiments of the present invention provide systems and methods for determining the dynamic complexity and the operational risk inherent in a system or service, as well as the states of instability that can occur within the operation of a service. Dynamic complexity of a service is demonstrated where there is an observed effect where the cause can be multiple and seemingly inter-related effects of a many-to-one or many-to-many relationship.

Having assessed the dynamic complexity efficiency and the operational risk index of a service (e.g., a business, process or information technology), these indexes can be employed to emulate all attributes of a service, thereby determining: 1) how a service responds in multiple states of operation, 2) the states where the dynamic complexity of a service can occur, 3) optimal dynamic complexity efficiency of a service, and 4) the singularities where a service becomes unstable.

BRIEF DESCRIPTION OF THE DRAWINGS

The foregoing and other objects, features and advantages of the invention will be apparent from the following more particular description of preferred embodiments of the invention, as illustrated in the accompanying drawings in which like reference characters refer to the same parts throughout the different views. The drawings are not necessarily to scale, emphasis instead being placed upon illustrating the principles of the invention.

FIG. 15a is a table of a database maintaining properties of external resources and dynamics used in embodiments of the present invention.

DETAILED DESCRIPTION

Figure 1:
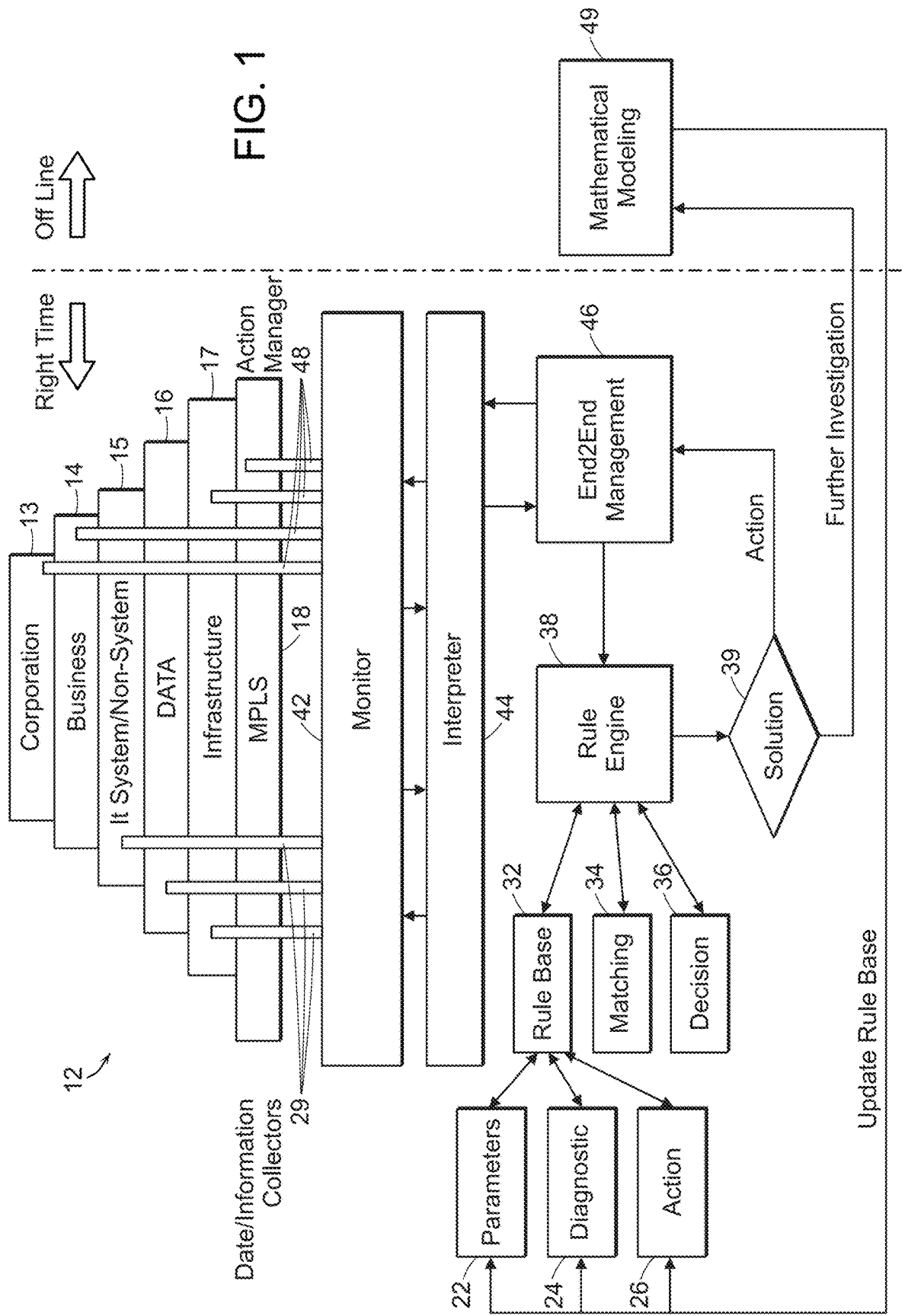
FIG. 1 is a schematic view of an automated management system according to the principles of the present invention including a model based architecture assembly.

A description of example embodiments of the invention follows. The teachings of all patents, published applications and references cited herein are incorporated by reference in their entirety.

Example embodiments of the present invention may be applied to various systems and methods for emulating services and systems, including business organizations, information technology (IT) architecture, and other complex entities. Such methods are described in U.S. Pat. Nos. 6,990,437, 6,311,144, 6,560,569, 7,035,786, 7,031,901, 7,783,468, 7,881,920, and 7,389,211, and U.S. Pub. No. 2009/0112668. The entire teachings of the above patents and published applications are incorporated herein by reference.

Example embodiments may determine a measure of dynamic complexity (referred to herein as "Dynamic Complexity Efficiency" (DCE)) of a service provided by an entity, which in turn is driven by business processes and IT architecture. The DCE may be developed against a standard of performance to create a way of measuring or benchmarking a service such that similar services can be compared. In order to evaluate a service in this manner, a number of components delivering the service must be considered.

The business or corporate entity is made up from a mix of people, process and supporting technology. In evaluating such an entity, the people who perform tasks, the processes (rules) they follow in performing those tasks, and the technology employed in completing those tasks, are measured. The technology is generally referred to as IT Services, which are the applications and infrastructure that support/automate portions of the processes, and aid the people in completing their tasks. The efficiency and effectiveness of both human and technological components of a service are evaluated, and, as a result, modifications can be provided.

In particular, a service can be evaluated for a number of attributes, including throughput, cost, quality, continuity, response time, operational efficiency, sustainable power usage, security, and coding efficiency. The Dynamic Complexity Efficiency (DCE) may be defined as a product of each of these attributes. Rather than measured within a point of time, the attributes may be determined over a period of time as the weighting of the attributes changes, dependent on the place within the time period.

Using a structural framework, example embodiments may discover, identify, emulate, predict and project both static and dynamic complexity and their effect on an environment's or system's properties and dynamics behavioral patterns. Multiple stages may be implemented to deconstruct or decompose the environment or system into its parts or units. From these parts, embodiments may compute the changes in the complexity of the internal dynamic working of the environment or system and show how changes within the environment, even though these may be small, can cause the unexpected to happen at a specific time.

Embodiments of the invention may implement the following component processes:

1. Definition of the static complexity base and its deconstruction.
2. Definition of the dynamic complexity base and its deconstruction.
3. Construction of an emulator based upon defined Mathematics and Deconstruction obtained in prior steps/processes.
4. Drive the emulator.
5. Identify root causes of unexpected behavior/singularities and define improvements.
6. Predict the new behavior patterns with the newly-defined dynamic complexity using the emulator.

Illustrated in FIG. 1 is an automated management system including a model based architecture assembly in accordance with the principles of the present invention. An assembly 12 models the information system (IS) and IS architecture of a subject enterprise. Preferably assembly 12 is generated by a model-based architecture system of U.S. Pat. No. 6,311,144 (herein incorporated by reference) which has been extended from a single business unit to apply to an enterprise with multiple business units. This extension is accomplished by a corporate layer 13.

In particular, the assembly 12 models the IS architecture of a subject enterprise at different levels of abstraction beginning with a corporate layer (e.g., enterprise level) 13. The corporate layer 13 defines enterprise practices (e.g., financial practices/targets), constraints (e.g., limits on operations cost) and parameters. The corporate layer 13 also describes the strategic objectives of the enterprise including service and quality requirements. The corporate layer 13 feeds these definitions and requirements to a business layer 14.

In response, the business layer 14 defines the different business processes of the organization, the content of each process (e.g., subprocesses and functions), the intercommunication among processes (and subprocesses and functions) and their interdependencies. Performance criteria and service and cost criteria as dictated or otherwise influenced by corporate layer 13 are also defined. The business layer 14 definitions and criteria are technology independent and are passed to an application architecture layer (or IT and non-IT system layer) 15.

The IT/non-IT system layer 15 translates the corporate and business functions and practices (of corporate layer 13 and business layer 14) into computer application software solutions and other components (including non-IT system ones). Layer 15 also translates the corporate and business layers 13, 14 quality and performance criteria into quantitative requirements and quantitative indicators. There is a many-to-many correspondence between business processes of layer 14 and application or other components (IT and non-IT systems) of layer 15. Application (IT and non-IT)

architecture layer 15 effectively outputs to the next layer 16 a blueprint on how the computer application architecture is distributed vertically (application layers such as presentation layer, management, logic, data and associated communication) as well as horizontally (cycles corresponding to back office activity, mid and front office, client access, etc.)

Data and technical architecture layer 16 translates the high level definitions (logical structures and performance criteria) produced by corporate layer 13, business layer 14 and application architecture layer 15 into physical definitions and implementation constraints. That is, layer 16 identifies the physical requirements (processing speed, memory, storage, infrastructure services, etc.) to achieve and support the business processes and corresponding application/software components. Layer 16 describes in detail data and information structures including metadata, storage, retrieval and security. Layer 16 also defines transaction rate, memory capacity and speed, processing speed and similar physical requirements. Interfaces, monitoring and data management alternatives are also determined, modeled and prototyped here. Although this layer 16 is technology dependent, the considerations involved in layer 16 are not platform dependent, i.e., determinations at this layer are made without regard to or independent of platform.

The infrastructure architecture layer 17 is the technology or platform specific layer. The definitions and requirements produced in the preceding layers 13, 14, 15, 16 are implemented by layer 17. In particular, layer 17 determines platform specific hardware and network components, implementation language(s), program applications and techniques and standards (e.g., for communication, signal transmission, circuits, routing mechanisms, etc.) to carry out the architecture direction. In one embodiment, this may be an IP network or MPLS (multi-protocol label switching) network.

Mathematical models are defined and utilized at each layer 13, 14, 15, 16, 17, and performance metrics are determined for constructing the IS architecture. The construction of mathematical models and determination of performance metrics preferably follows the techniques described in U.S. Pat. No. 6,990,437 (herein incorporated by reference). The multilayer mathematical modeling and IS architecture optimization is represented at (includes), for example, the MPLS layer 18 in FIG. 1, which represents the network layer. In some embodiments, the multilayer mathematical model of the enterprise IS architecture has a business layer, an application/data layer and a technology layer.

In practice, assembly 12 models the IS architecture of the subject enterprise and in particular for each layer of the multilayer mathematical model, provides cost modeling (a cost architecture model) and quality of service modeling (a service architecture model). This is preferably accomplished as illustrated in FIGS. 2 and 3.

Figure 2:
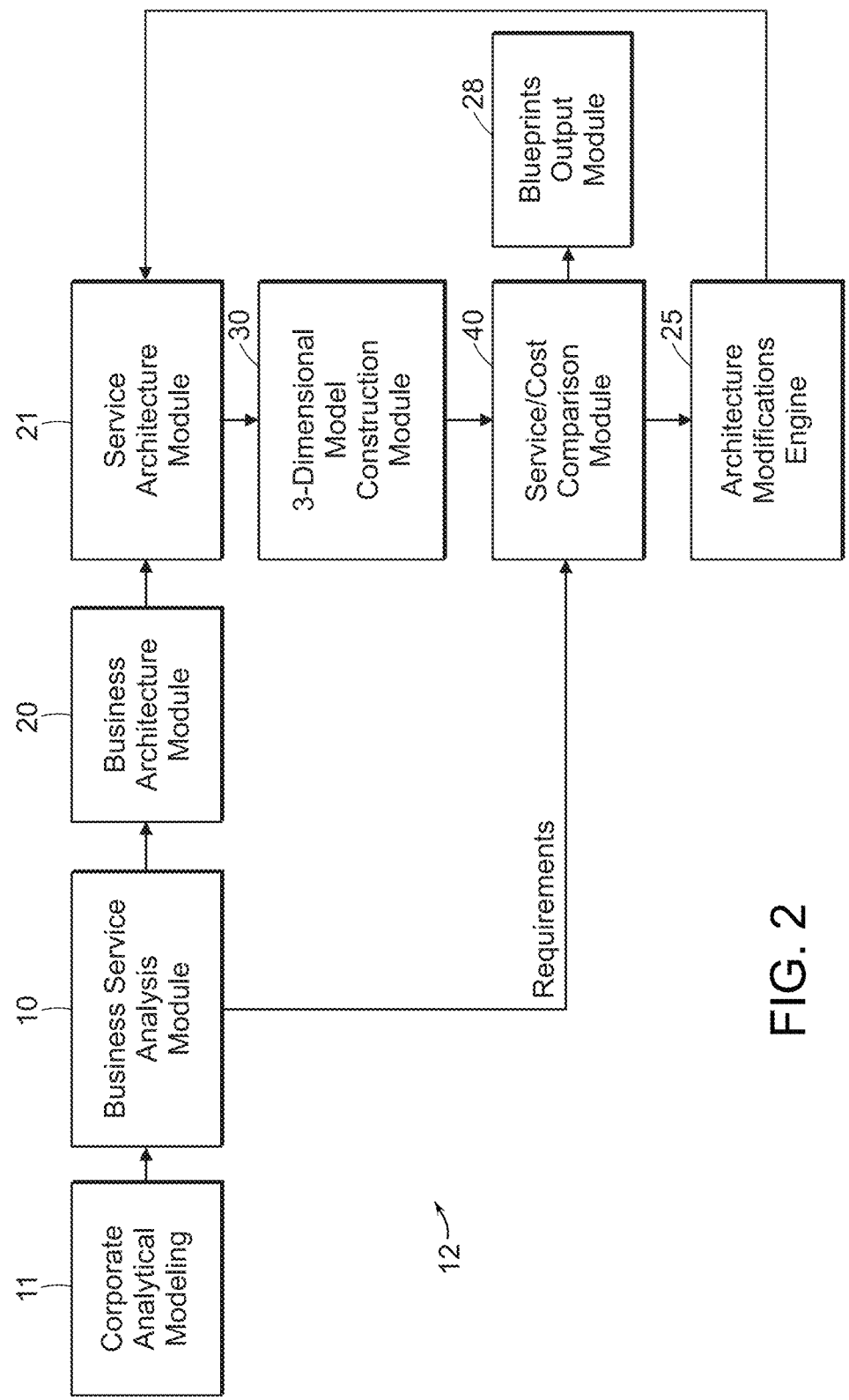
FIG. 2 illustrates the functional stages and modules of the model based architecture assembly of FIG. 1.

With reference to FIG. 2, a corporate analytical modeling stage 11 provides a graphical layout interface through which a system architect inputs or otherwise provides details and parameters of corporate plans, financial practices and targets, and service and quality requirements.

The business service analysis module 10 provides a graphical layout interface, through which the system architect inputs a business process design. A business process design identifies business processes within a business organization and the flow of communication and workload among them. Furthermore, the business process design defines a set of business requirements (including business service requirements) for each individual business process.

A business architecture stage or module 20 provides a graphical user interface through which the system architect constructs a multi-layer mathematical model of an enterprise IS architecture. The IS architecture has a business architecture which supports the business process design that was input at business service analysis module 10. Likewise at a service architecture module 21, the system architect constructs a respective multi-layer mathematical model that supports the enterprise description (plans and practices) input at the corporate modeling stage 11. In particular, service architecture module 21 defines contractual, operational, service and cost constraints (i.e., service and cost architectures) of the respective multi-layer mathematical model and applicants refer to this as the enterprise dynamic model.

Preferably, the structure of the above multi-layer mathematical models are as described in U.S. patent application Ser. No. 09/127,191 (now U.S. Pat. No. 6,311,144) entitled "Method and Apparatus for Designing and Analyzing Information Systems Using Multi-Layer Mathematical Models," filed Jul. 31, 1998, the entire contents of which are incorporated herein by reference.

The model construction module 30 combines the business architecture of business architecture stage 20, the service architecture of module 21 and the cost architecture of module 21 to form a three dimensional enterprise management model. Construction module 30 also calculates performance metrics for each component and determines interdependencies. The results of construction module 30 is a three dimensional (e.g., business, cost and service) model of the IS architecture of the subject enterprise. Thus each of the multi-layers of the mathematical model of the IS architecture has these three dimensions.

The comparison module 40 compares the modeled performance metrics output by construction module 30 with the defined set of enterprise requirements and business requirements provided at corporate analytical modeling stage 11 and business design module 10. In particular, comparison module 40 compares the calculated performance metrics for the service architecture and cost architecture to the enterprise requirements and the business service requirements. The comparison module 40 produces indications of whether one or more enterprise practices or business processes exhibit unacceptable performance metrics that do not satisfy the respective input enterprise requirements or business service requirements.

If unacceptable modeled enterprise and/or business performance metrics are identified, a rule-based modification engine 25 determines appropriate improvement inducing modifications to the three dimensional (e.g., throughput, service, cost), multi-layer model of the enterprise IS architecture. The modification engine 25 displays and proposes the modifications to the system architect for acceptance.

If accepted, the service architecture module 21 automatically incorporates the proposed modifications into the three dimensional multi-layer model of the enterprise IS architecture without further assistance from the system architect. The performance metrics for the modified IS architecture are updated by the construction module 30 and compared again by the comparison module 40. If the modeled performance metrics of the cost architecture and that of the service architecture do satisfy the enterprise requirements and the business service requirements, an output module 28 provides a detailed description of the enterprise IS architecture to the system architect for use in subsequent implementation stages. Otherwise, assembly 12 continues to iterate through the modification, modeling, and comparison stages of modules 25, 21, 30, and 40. This process continues until either (i) the modeled performance metrics of the cost architecture and the service architecture of each business process satisfy the enterprise and business service requirements or (ii) the performance metrics of the supporting hardware and software component models cannot be improved further without a change to the enterprise practices/plans and/or the business process design.

Figure 3A:
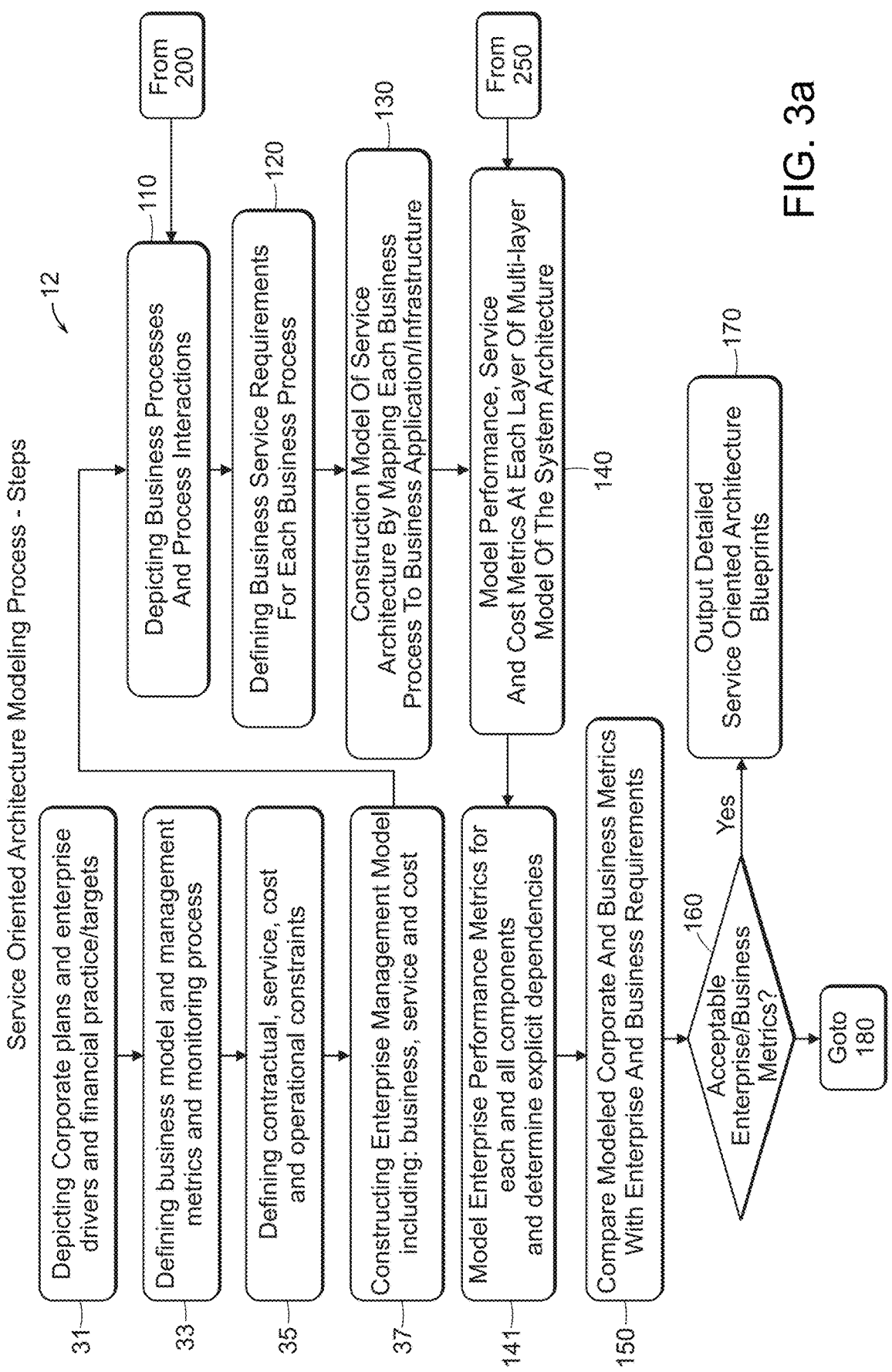
FIGS. 3A and 3B are flow diagrams of the model based architecture assembly of FIG. 1 generating a service architecture model of a subject enterprise.
Figure 3B:
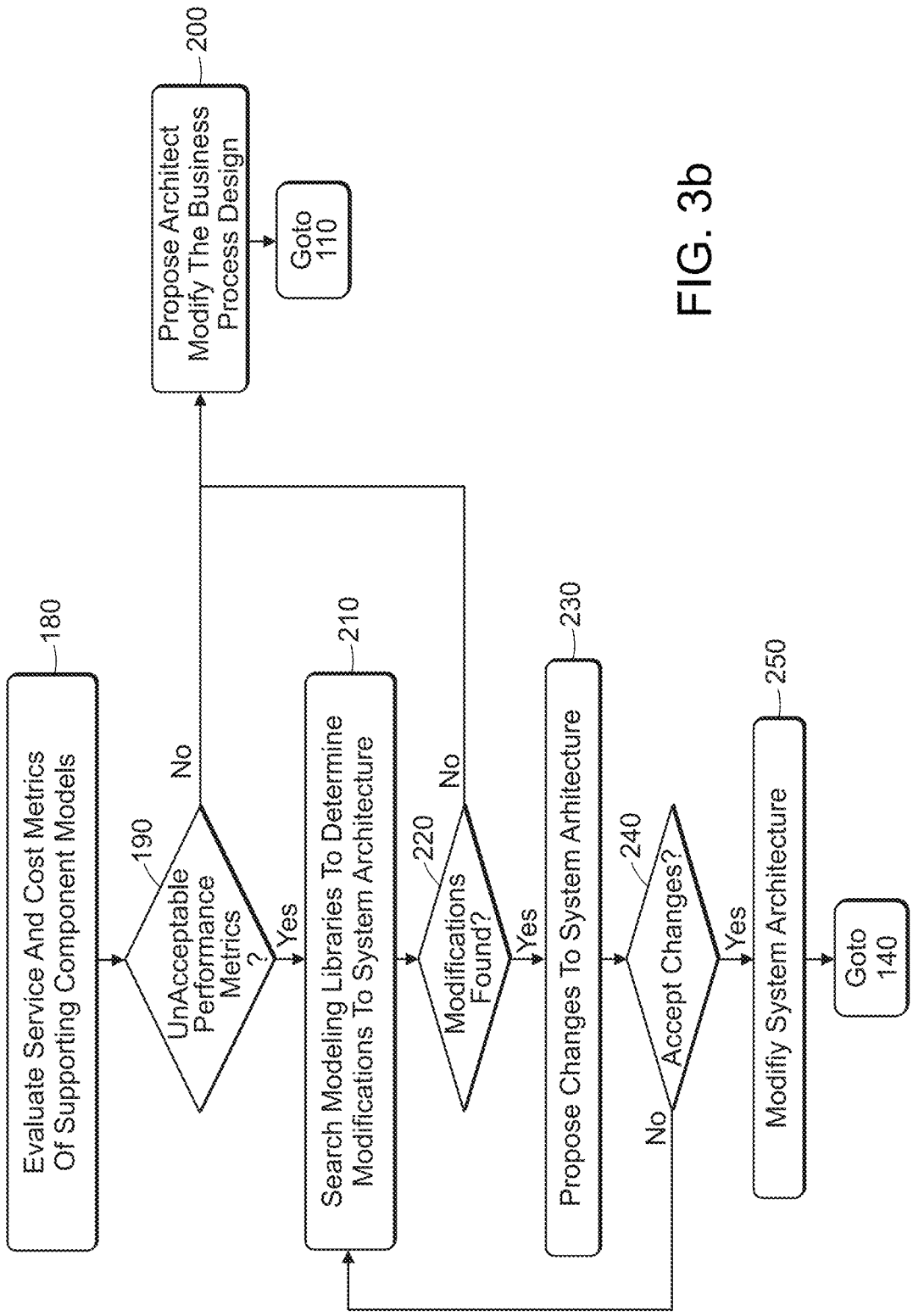

FIGS. 3A and 3B provide a flow diagram illustrating the operations of FIG. 2 in more particular detail.

At step 31, assembly 12 obtains from the system architect (user) details and parameters of corporate plans and targets as described above at corporate analytical modeling stage 11. In response, step 31 generates a depiction of corporate plans and enterprise financial practices and targets.

At step 33, assembly 12 defines the business model, management metrics and monitoring process. This is accomplished based on user input at the business service analysis module 10 and business architecture module 20.

Step 35 of FIG. 3A defines contractual service, cost and operational constraints based on user input at the service architecture module 21.

Step 37 constructs the three dimensional (business, service and cost) enterprise model of model construction module 30. In one embodiment, step 37 combines the business architecture, service architecture and cost architecture parameters and definitions from steps 31, 33 and 35 into a full enterprise dynamic model. Further data toward defining the enterprise IS architecture (three dimensional multi-layer model) is obtained through an interactive interface.

For example, at step 110, the business service analysis module 10 provides a graphical layout interface through which a system architect provides various information regarding business processes and the flow of process interactions of the subject enterprise. According to one embodiment, the graphical layout interface is implemented with a graphical scripting language, such as Universal Modeling Language (UML) or a hierarchy of graphical representations.

At step 120, the business service analysis module 10 provides a graphical layout interface through which the system architect defines the business service requirements for each business process. According to one embodiment, the business service requirements define business constraints and business drivers. Business drivers, in general, represent the workload that a business process is expected to receive. Typical business drivers include the expected number and kind of business events and the rate at which the events are received.

Business constraints refer to time and volume constraints imposed by the business needs. Typical time constraints include business response time, while typical volume constraints include events processed per day or events processed per second or events to be processed by a certain date or events that impose a certain definiteness on other events, for example. The business constraints provide a standard of comparison for determining whether the proposed system architecture meets the needs of the business unit.

At step 130, the business architecture module 20 provides a graphical user interface through which a system architect maps each business process to a business application or infrastructure. According to one embodiment, step 130 generates and displays to the system architect a list of premodeled business applications. Each listed business application is coupled to a default set of supporting hardware and software component models. The initial model is constructed by simply mapping the available business applications to corresponding business processes defined in the business process design. Thus, the system architect is relieved from defining all of supporting hardware and software components, further simplifying the automated process.

After mapping all of the business processes, the business architecture module 20/step 130 generates the multi-layer mathematical model of the subject enterprise IS architecture. In turn, at steps 140 and 141, the construction module 30 models performance metrics for each layer of the multi-layer mathematical model. Such metrics include service and cost (i.e., elongation, response time, volume of processed transactions, transaction processing rates, and cost of resources involved). According to one embodiment, the business drivers defined at step 120 are included in the modeling of the performance metrics. Step 141 calculates enterprise performance metrics for each component and determines explicit dependencies. The modeled performance metrics are then forwarded to the comparison module 40.

At step 150, the comparison module 40 makes an initial determination as to whether the modeled performance metrics of the enterprise practices and business processes satisfy the enterprise requirements and the business service requirements as defined in stages 10 and 11 of FIG. 2 (steps 110 and 120, FIG. 3A). According to one embodiment, the comparison is performed as the difference between the value of a modeled performance metric and the value of a corresponding business constraint, such as response time. Advance reasoning and fuzzy logic may also be used to ascertain whether a modeled performance metric satisfies a defined business constraint.

If, at step 160, the modeled performance metrics satisfy the enterprise/business service requirements of each business process, the modeled system architecture (generated at step 37) is forwarded to the output module 28 at step 170 to output a detailed description of the specifications of the model based IS architecture of the enterprise. The output module 28 formats the system architecture model (including service, cost and business dimensions at each layer) into a detailed set of "blueprints" describing the construction and implementation of the service oriented architecture. According to one embodiment, the format of the output is a Universal Modeling Language (UML) document, which can be displayed readily through an Internet browser. The UML-generated display shows the subject IS architecture containing hyperlinks between components within the business, application, and technology layers.

If, at step 160, at least one of the business processes exhibits unacceptable business performance metrics, the comparison module 40 at step 180 in FIG. 3B attempts to identify the supporting component models in the application and technology layers causing their unacceptable performance metrics. Toward that end, comparison module 40 evaluates the performance metrics of the supporting hardware and software component models linked to the one or more business processes exhibiting unacceptable performance metrics. According to one embodiment, the modeled performance metrics of the supporting component models are compared against vendor-provided or modeled benchmarks in order to determine if there are any inefficiencies associated with their operation.

If, at step 190, none of the supporting component models exhibits unacceptable modeled performance metrics, then the system architect is notified at step 200, through a graphical user interface, that the unacceptable performance metrics are caused by flaws in the business process design and/or enterprise plan. These flaws may include inefficient business process interactions or unrealistic business service requirements. The process returns to step 110 providing the system architect with the graphical layout interface of the business service analysis module 10 or service architecture module 21 to modify the business process or the service or cost architectures.

If, at step 190, one or more of the supporting component models do exhibit unacceptable performance metrics, then step 210 forwards the identity of the supporting components and the unacceptable performance metrics to the rule-based modification engine 25 to determine modifications to the subject IS architecture for improvement.

At step 210, the modification engine 25 determines modifications to the subject IS architecture to address the unacceptable performance metrics of supporting hardware and software components modeled therein. According to one embodiment, the rule-based modification engine 25 searches libraries (e.g., a logic tree implemented within a data store) using the identity of the supporting component models and their unacceptable metrics. The search results provide recommended modifications according to prior modeled results stored in tables (business ephemeris tables discussed below) 22, 24, 26 of FIG. 1. For example, if an increase in memory size is the recommended modification, the recommended size is a value obtained from previous modeled results. Such modifications may include replacement of the one or more supporting component models with alternate component models.

If, at step 220, the search is successful in finding recommended modifications to the subject IS architecture, then the modifications are proposed to the system architect through a graphical user interface for acceptance at step 230.

If, at step 240, the system architect rejects all of the proposed modifications, the logic tree is searched again at step 210 to locate alternative modifications to the subject IS architecture. If, at step 220, the search fails to find additional recommended modifications, then at step 220 the system architect is notified through a graphical user interface that the unacceptable performance metrics are caused by flaws in the enterprise plan or the business process design and the process returns to step 110 providing the system architect with the graphical layout interface of the business service analysis module 10 and/or service architecture module 21 to modify the business process design or enterprise plan components.

If, at step 240, the architect accepts one or more of the proposed modifications, the model of the IS architecture is automatically modified by the source architecture module 21 with the accepted modifications at step 250.

After modifying the IS architecture model, the process returns back to step 140 for further modeling, repeating the process until (i) the modeled performance metrics of each business process either satisfy the enterprise and business service requirements or (ii) the performance metrics of the supporting hardware and software component models cannot be improved further without a change to the enterprise practices/plans and/or the business process design.

Once the modeled performance metrics do satisfy the enterprise and business service requirements, the model of the enterprise IS architecture (i.e., a service oriented architecture) is formatted into a detailed description, which may be output from the output module 28 at step 170.

Referring back to FIG. 1, assembly 12 provides the model of an IS architecture, and in particular a model of a service oriented architecture of the subject enterprise according to the multi-layer mathematical modeling techniques of FIGS. 2 and 3A-3B. As such, assembly 12 models the quality of service, cost and throughput at each mathematical model layer (business, application, technology). From an initial model of assembly 12, triplet data points $\{s_i, c_i, T_i\}$ are formed with a respective quality of service value s, a cost value c and throughput value T, each at the same moment in time i in a layer of the mathematical model. Each triplet data point represents a state of the enterprise or more generally a "situation" of the enterprise. For each such state or situation, the model of assembly 12 can optimize or otherwise suggest modification to the IS architecture toward goal or target service, cost and/or throughput levels. Such optimization/modification poses or otherwise defines a remedy for the given state/situation.

The situation-remedy pairs are stored in a lookup table. The table then serves as a business ephemeris or a precalculated table indexed and searchable by situation (e.g., quality of service value, cost value and throughput value). Thus given a situation $\{s, c, T\}$, the table provides the corresponding remedy as results of the table lookup. FIG. 1 illustrates this business ephemeris (the predefined or premodeled table) feature implemented as Parameters 22 (time i and layer, e.g., business, application or technology), Diagnostic (state or situation) 24 and Action (remedy) 26. Each of these members 22, 24, 26 support the rules 32 of rule engine 38. Rules 32 cover each layer of the assembly 12 model and each dimension (service, cost, throughput) of each layer.

Figure 4:
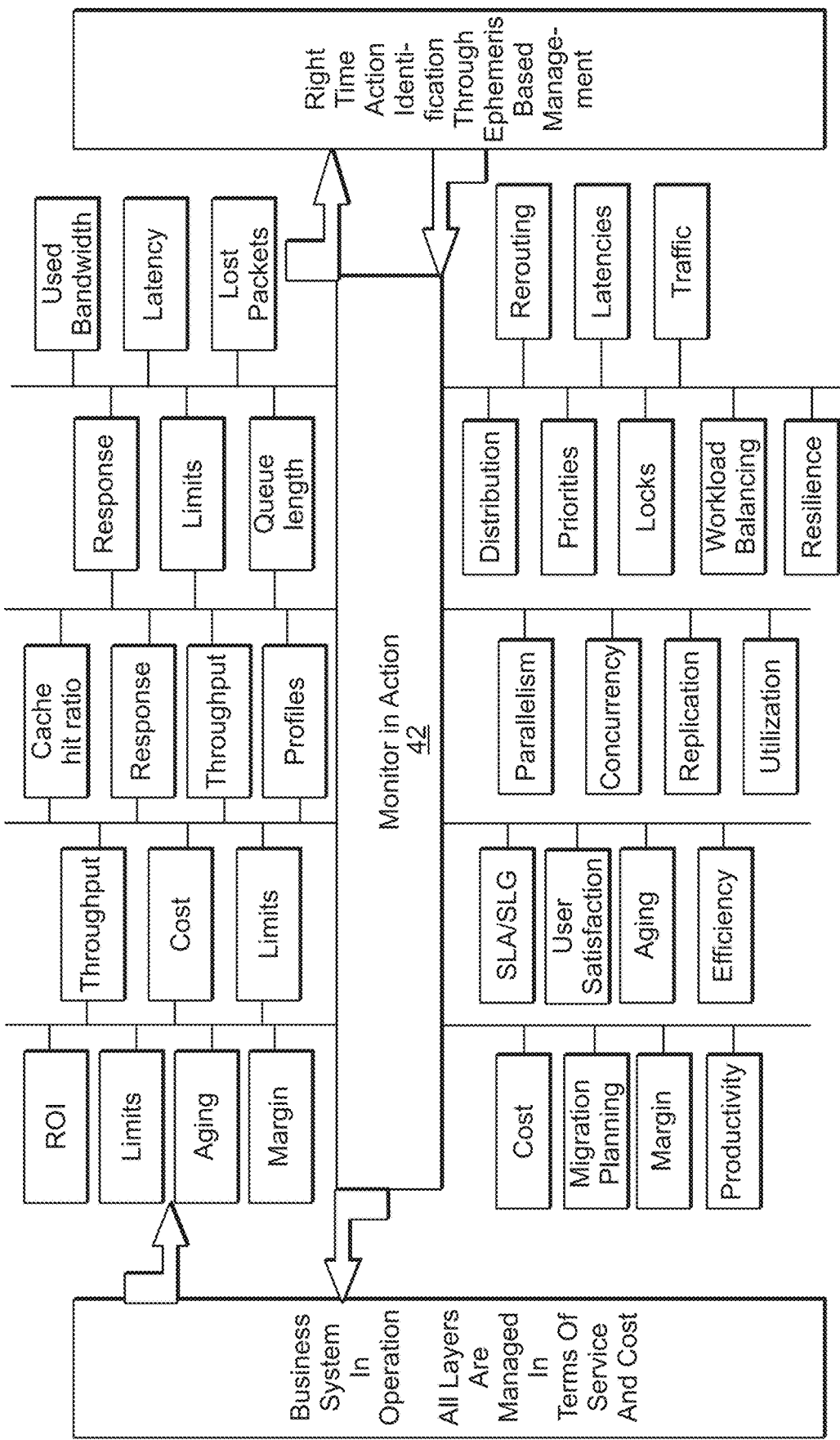
FIG. 4 is a block diagram of a monitor feature in the embodiment of FIG. 1

In practice, assembly 12 models the IS architecture of the subject enterprise in real time. This is accomplished by the multi-layer mathematical modeling with cost, service and throughput dimensions at each layer described above. For each layer (business, application, technology) of the mathematical model, a monitor 42 calculates and manages service and cost levels. For example, as shown in FIG. 4, monitor member 42 detects on the business layer ROI (return on investments), limits, aging, margins, throughput, cost, cache hit ratio, response time, profiles, number of responses, queue length, used bandwidth, latency and lost packets. Monitor member 42 preferably employs collectors 29 for this purpose as shown in FIG. 1.

Monitor member 42 passes the detected information to interpreter 44. In response, interpreter 44 determines the current detected/sampled service, cost and throughput triplet $\{s_1, c_1, T_1\}$. Interpreter 44 feeds this triplet data point to a management element 46 which employs rules engine 38. In turn, based on the rules 32 discussed above, rules engine 38 produces an optimization or modification (solution 39) for management element 46 to take action with. That is, rules engine 38/rules 32 use the received triplet as an indication of state of the enterprise and look up (cross reference) through business ephemeris/precalculated situation-remedy table 22, 24, 26 a corresponding remedy (e.g., modification/optimization 39).

Management element 46 passes the solution (modification/optimization) 39 to interpreter 44 which translates the solution 39 into proposed changes at the different levels 13, 14, 15, 16, 17 of abstraction of the enterprise IS architecture. Monitor 42 is responsive to the proposed changes and implements them through action managers 48. In the example of FIG. 4, monitor 42 implements the changes as migration planning, cost, margins, and productivity, SLA/SLG (service level agreement/service level guarantee), user satisfaction, aging, efficiency, parallelism, concurrency, replication, utilization, distribution, priorities, locks, workload balancing, resilience, rerouting, latencies and traffic.

In another example, excessive response time is observed by monitor member 42 and interpreter 44. Table I shows sample solutions 39 generated for implementation through action managers 48.

TABLE I

Solutions 39 for Observed Excessive Response Time

| Root Cause | Goal Solution (39) | Action (42, 44, 46, 48) |
|---|---|---|
| Excessive Physical I/O | Decrease Physical I/O Spread I/O | Increase cache hit ratio Reallocate data on disks |
| Insufficient CPU resource | Increase parallelism | Add more processors in application server, Redistribute workflows |
| Software limits parallelism | | Redesign application |
| Key process bottlenecked | allocate more resources | Change process priority |
| Excessive logical I/O | Reduce logical I/O | Index critical tables Redesign application |

Continuing with FIG. 1, off-line mathematical modeling provides further system feedback for purposes of improving business ephemeris/pre-modeled table 22, 24, 26. Solutions 39 are further investigated in an off-line mathematical model 49 that determines network impact of the changes proposed by solutions 39.

Based on an enterprise dynamic architecture description that covers all layers of the assembly 12 model, the off-line mathematic modeling member 49 calculates the impact of each application message (solution 39) on the different components of the enterprise dynamic architecture. The mathematical modeling member 49 takes into account each protocol used in the enterprise dynamic architecture for the message impact repartition. At each level of the assembly 12 model, the off-line mathematical modeling member 49 adds resource utilization due to the protocols. At this point, the mathematical model 49 has a realistic view of the load of each enterprise dynamic architecture component.

Into passive elements, such as links, algorithms known in the art (such as analytic methods derived from perturbation theory and/or stochastic analysis) are used to determine the response time, throughput and the cost. Into active elements, such as routers, links are made between the different passages on each ingress or egress port and the different router application components or processes. The impact of the enterprise dynamic architecture load is associated to each process to reflect the real use of the component. To determine the response time, throughput and cost in such complex systems, a predictive mathematical algorithm, based on perturbation theory, gives results with a maximum 1% variation from the physical observation. Other techniques for determining throughput, cost and response time given the above are suitable.

The sequence of steps described above enables off-line mathematical model 49 to create all kinds of system architectures for the enterprise. The realization is infrastructure involving MPLS model in which all the routing protocols that allow dynamic routing, the different Class of Services (CoS), fast convergence, VPN, etc. have been taken into account. This model accepts all types of enterprise dynamic architecture implementations in order to represent all types of applications running on a distributed infrastructure.

The off-line mathematical model 49 then feeds the determined impact results to parameters 22, diagnostics 24 and action 26 for purposes of updating the rule base 32. In a preferred embodiment, techniques of U.S. patent application Ser. No. 10/005,481, filed on Oct. 26, 2001 (herein incorporated by reference) are employed to implement this feedback and updating.

Figure 6:
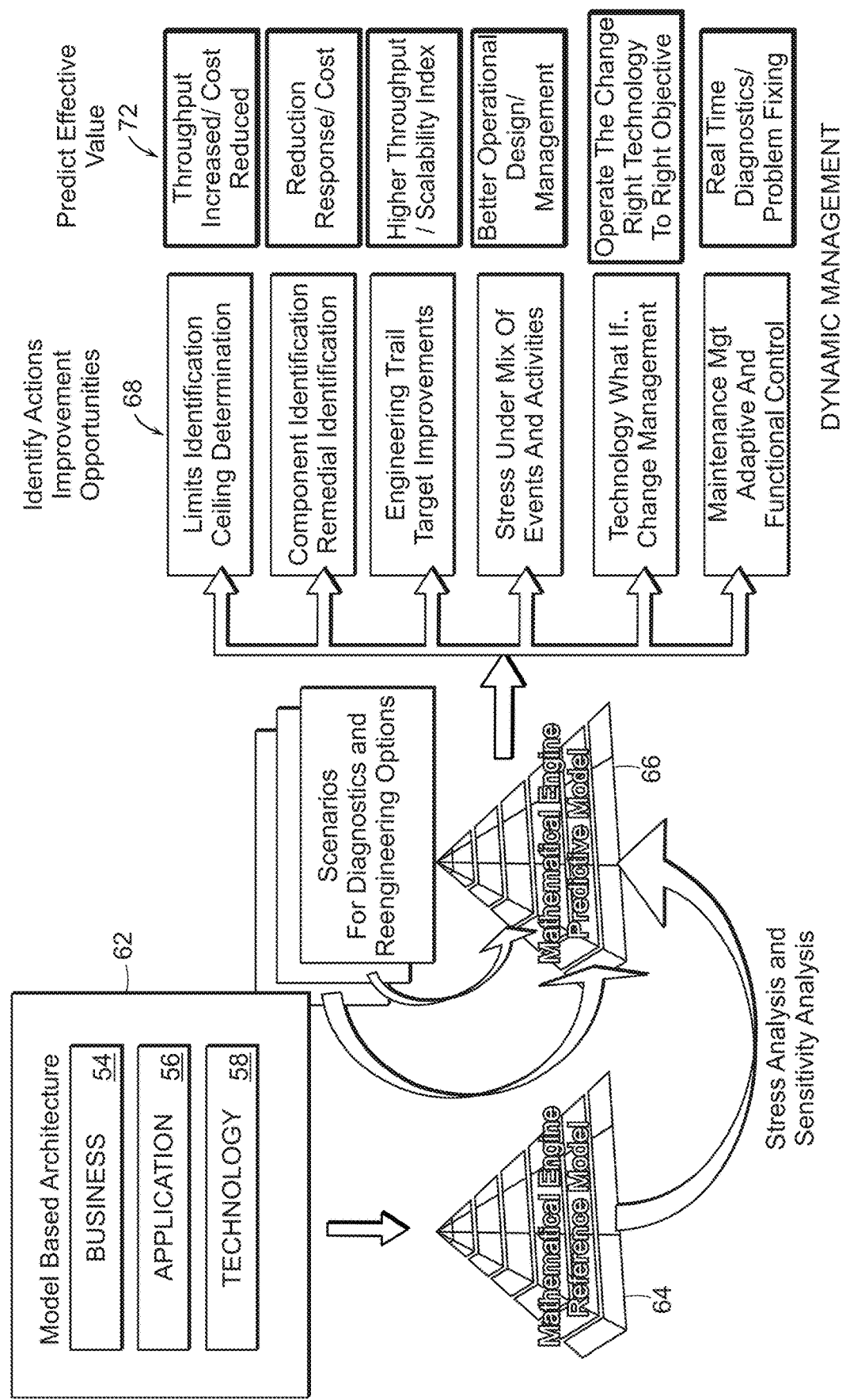
FIG. 6 is a schematic illustration of an automated management system including a predictive model.

Turning to FIG. 6 and given the above, further embodiments provide modeling and analysis of existing IS architectures as well as that of future (contemplated, to be designed) IS architectures. The basis of each such modeling is the multi-layer mathematical model 62 having a business layer 54, an application/data layer 56 and a technology layer 58 with the added corporate/enterprise layer 13 on top and multi-protocol label switching (MPLS network) layer 18 as a bottom layer.

The mathematical model 62 produces an initial reference model 64 from which various stress analysis and sensitivity analyses may be made. Various "what-if" scenarios and diagnostics for improvement purposes and the like may be applied to the initial model 64 to produce predictive model(s) 66. Only one such predictive model is shown for simplicity of presentation but it is understood that many such predictive models 66 may be produced.

Based on the predictive model(s) 66, suggested optimizations and/or solutions 39 may be generated to improve/fix areas using the business ephemeris 22, 24, 26 and rules engine 38 previously described. Examples of actions identified and indications of improvement opportunities are shown at 68, while the model predicted effect is shown at 72 in FIG. 6.

In some embodiments, techniques of U.S. application Ser. No. 10/014,317 filed Oct. 26, 2001 (herein incorporated by reference) are employed in calculating business performance metrics in construction module 30.

The modeling of a service oriented architecture and a cost architecture as described above is a quantitative modeling. However, qualitative modeling may be suitable for some embodiments.

The above described embodiment of FIG. 1 provides real time online diagnostics and problem solving. The modeling of cost, quality of service and throughput on each model layer and the business ephemeris/premodeled situation in remedy table 22, 24, 26 enables impact of any combination of quality (class) of service, cost, throughput or business capacity to be diagnosed. This is graphically illustrated in FIG. 5 where cost is one axis, quality of service is a second axis and throughput a third axis. In one embodiment, along the cost axis is provided a vector of resource and support consumption for a business event (particular and/or global). Along the quality of service axis required response (or time window) to deliver the business event is measured. The number of delivered business events per second is measured along the throughput axis. Similarly cost-based pricing is enabled.

Further, latency may be used as a measure of throughput in the foregoing.

Figure 7:
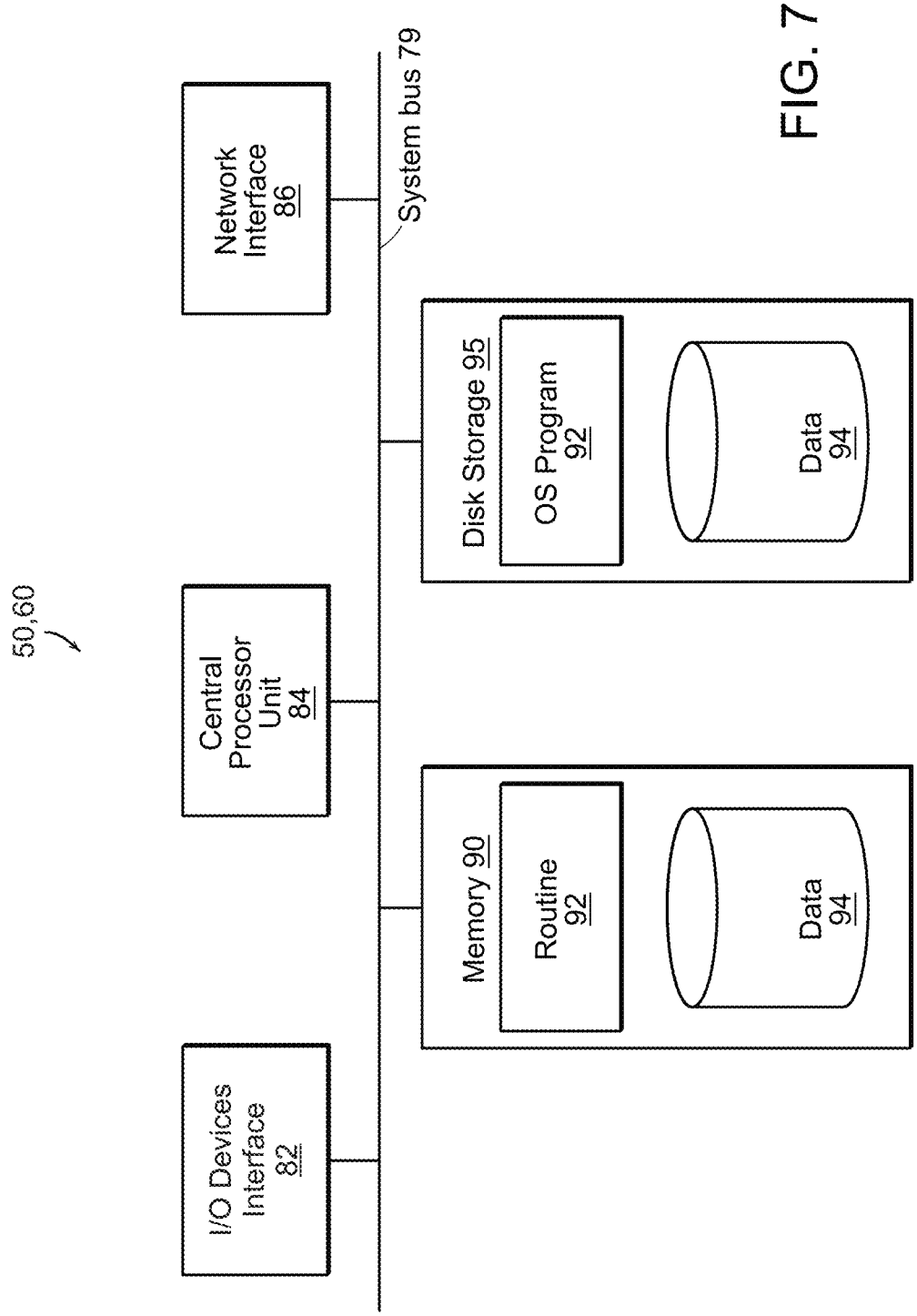
FIG. 7 is a block diagram of a computer system (digital processing system) in which embodiments of the present invention are implemented in hardware, software and/or a combination thereof.

FIG. 7 is a diagram of the internal structure of a computer system (e.g., client processor/device 50 or server computers 60). Each computer 50, 60 contains system bus 79, where a bus is a set of hardware lines used for data transfer among the components of a computer or processing system. Bus 79 is essentially a shared conduit that connects different elements of a computer system (e.g., processor, disk storage, memory, input/output ports, network ports, etc.) that enables the transfer of information between the elements. Attached to system bus 79 is I/O device interface 82 for connecting various input and output devices (e.g., keyboard, mouse, displays, printers, speakers, etc.) to the computer 50, 60. Network interface 86 allows the computer to connect to various other devices attached to a network. Memory 90 provides volatile storage for computer software instructions 92 and data 94 used to implement an automated management system using a model based architecture assembly (e.g., multilayered mathematical model 12 and monitor 42, interpreter 44, rules engine 38 and supporting code 32, 34, 36, business ephemeris 22, 24, 26 and other features code detailed above in FIGS. 1-6), as well as other embodiments of the present invention (detailed below). Disk storage 95 provides non-volatile storage for computer software instructions 92 and data 94 used to implement an embodiment of the present invention. Central processor unit 84 is also attached to system bus 79 and provides for the execution of computer instructions.

In one embodiment, the processor routines 92 and data 94 are a computer program product (generally referenced 92), including a computer readable medium (e.g., a removable storage medium such as one or more DVD-ROM's, CD-ROM's, diskettes, tapes, etc.) that provides at least a portion of the software instructions for the invention system. Computer program product 92 can be installed by any suitable software installation procedure, as is well known in the art. In another embodiment, at least a portion of the software instructions may also be downloaded over a cable, communication and/or wireless connection. In other embodiments, the invention programs are a computer program propagated signal product embodied on a propagated signal on a propagation medium (e.g., a radio wave, an infrared wave, a laser wave, a sound wave, or an electrical wave propagated over a global network such as the Internet, or other network(s)). Such carrier medium or signals provide at least a portion of the software instructions for the present invention routines/program 92.

In alternate embodiments, the propagated signal is an analog carrier wave or digital signal carried on the propagated medium. For example, the propagated signal may be a digitized signal propagated over a global network (e.g., the Internet), a telecommunications network, or other network. In one embodiment, the propagated signal is a signal that is transmitted over the propagation medium over a period of time, such as the instructions for a software application sent in packets over a network over a period of milliseconds, seconds, minutes, or longer. In another embodiment, the computer readable medium of computer program product 92 is a propagation medium that the computer system 50 may receive and read, such as by receiving the propagation medium and identifying a propagated signal embodied in the propagation medium, as described above for computer program propagated signal product.

Generally speaking, the term "carrier medium" or transient carrier encompasses the foregoing transient signals, propagated signals, propagated medium, storage medium and the like.

Referring back to FIG. 1, as described above, a model business architecture assembly 12 can be monitored in real time. Results of the monitoring, once interpreted, may be applied to the rule engine 38, which is supported by the rule base 32. The rule base 32 is, in turn, supported by the business ephemeris comprising parameters 22, diagnostic 24 and proposed action 26. Once a solution 39 is found, it is employed by the management element 46 for modifying the information system accordingly. The solution is also applied to the mathematical model 49 for further analysis off-line, the results of which may be applied to update the ephemeris 22, 24, 26.

In further embodiments, the ephemeris 22, 24, 26 may be employed to create cases that are specific to a subset of the enterprise or business information system, where the cases provide characteristics, diagnosis and fixing action specific to that subset. The cases may also be specific to metrics of the information system. To generate such cases, a model of the information system (such as the assembly 12) is used to generate several possible states of the model (e.g., normal operation, extreme operation, etc.). From these states the corresponding diagnosis and fixing options are determined for each state, thereby building a case base of cases comprising system characteristics, diagnosis and proposed solutions.

Through a matching process, parameters required to identify a case are extracted at a desired frequency, and the parameters are matched to a case form the case base. These parameters are measured characteristics of the enterprise. These characteristics may be measured by monitors that monitor the mathematical model as shown by monitor 42 in FIG. 1, or measured by monitoring the subject enterprise directly. Once a matching case is identified, a corresponding diagnosis and proposed fixing action are reported, which can include reporting to a user through a user interface and/or reporting to a hardware or software agent. The agent may respond with a fixing action that is applied through a self-healing process. If a matching case cannot be identified, then the extracted parameters are applied to the model to generate a matching case, thereby updating the case base.

It should be noted that a "business function," as used herein, relates to an operation performed in furtherance of a business transaction or a business relationship. For example, opening a new client account and processing a payment are business functions. A "business process," as used herein, relates to an operation performed by an information system in furtherance of a business function. For example, a business function of processing a payment may include several business processes, such as (i) receive payment, (ii) post payment, (iii) retrieve balance, and (iv) update balance. Embodiments of the present invention may provide reporting in terms of business functions and/or business processes, and thus reference to either a business function or a business process may be considered to incorporate the other.

Figure 8:
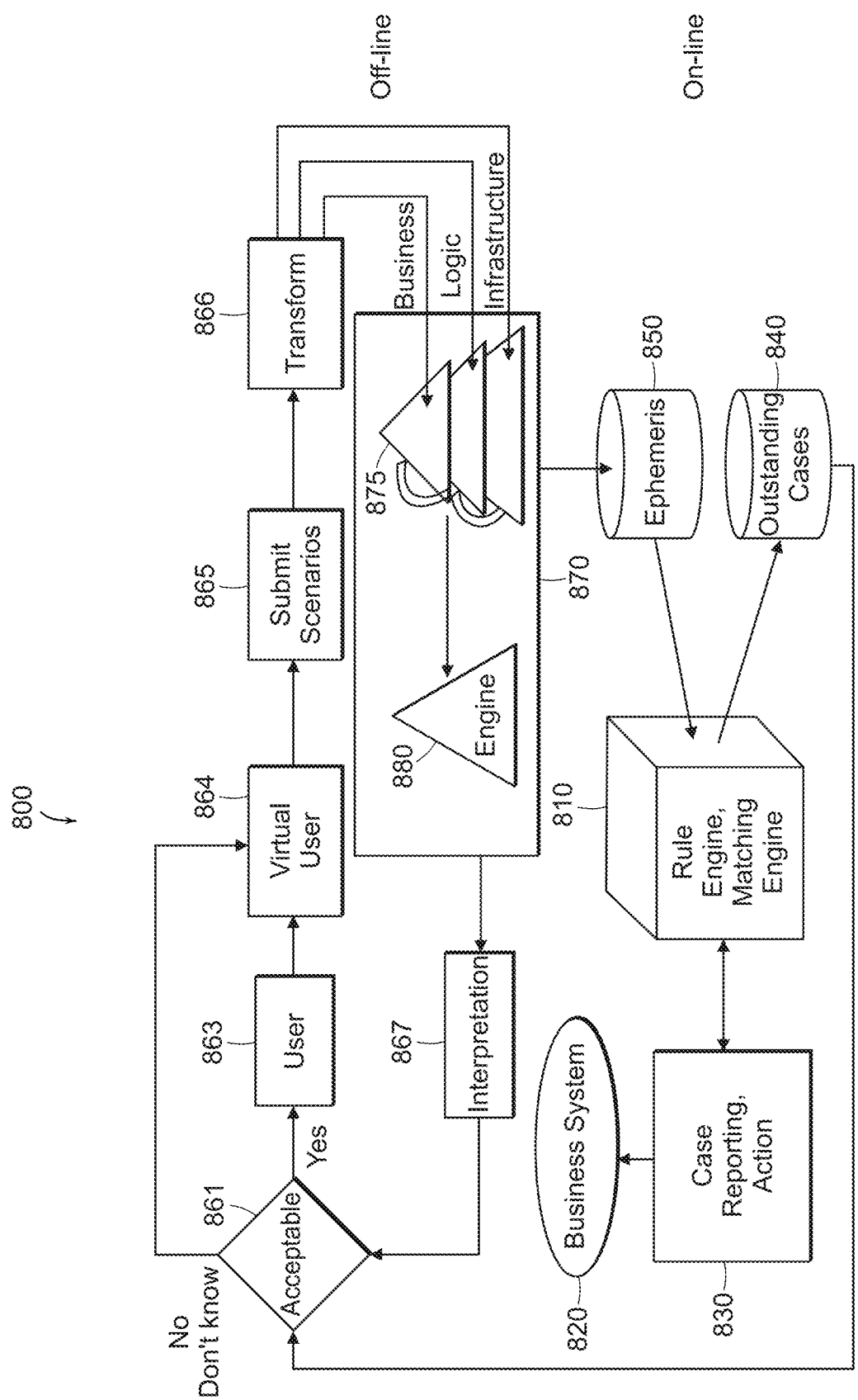
FIG. 8 is a high-level flow diagram of a system for implementing a set of cases in an enterprise information system according to the present invention.

FIG. 8 is a high-level flow diagram of a system 800 according to the present invention implementing a set of cases in an enterprise information system. The system 800 includes a model based architecture (MBA) assembly 870, which may incorporate features described above with reference to the assembly 12 of FIG. 1. The MBA assembly 870 includes a multi-layered mathematical model 875 and a reference model 880, which may incorporate features of the mathematical model 62, reference model 64 and predictive model 66, described above with reference to FIG. 6. The MBA assembly 870 produces a business ephemeris 850 as described above with respect to elements 22, 24, 26 in FIG. 1. The rule/matching engine 810 receives content from the ephemeris 850 relating to states of the reference model 880, and generates a set of cases (a case base 915, FIG. 9), each case including characteristics, diagnosis and proposed solutions for each state. The rule/matching engine 810 then compares the generated cases to characteristics of the enterprise or business information system 820. These characteristics may be obtained by monitoring a mathematical model 875 of the business system, such as the monitoring described above with respect to the monitor 42 in FIGS. 1 and 4. However, the rule/matching engine 810 only requires information pertinent to comparison with the content of the cases. Thus, monitoring the mathematical model 875 for matching a case may be limited to monitoring system workloads, profiles, availability of resources, and critical or other states, enabling efficient matching between the mathematical model 875 and cases of the case base 915. Because this information pertains to characteristics of the information system, the business information system may be monitored directly, rather than through the mathematical model, to obtain the information necessary to obtain a matching case.

If a match between the system 820 and a case is found, then the matching case is reported by case agent 830. The agent 830 may take a number of actions depending on the matching case, such as reporting diagnosis and proposed solutions to a user and acting on a proposed solution, without user intervention, by applying a self-healing algorithm to the business information system 820.

If a match between the system 820 and a case is not found, then the state of the system 820 is considered to be an "outstanding case." The outstanding case is collected to an outstanding cases store 840. In order to maintain a case base 915 that includes cases matching all states of the business information system 820, outstanding cases may be employed as parameters to generate new cases in the case base 915. Through an algorithm comprising steps 861-867, the outstanding case may be reported to a user 863 or a virtual user 864. The outstanding case may be submitted (step 865) as a scenario to the assembly 870, before which it is transformed (step 866) into business, logic and infrastructure data corresponding to respective layers of the mathematical model 875. With the corresponding data, the assembly 870 may generate a model corresponding to the business system 820. Alternatively, the assembly 870 may apply further analysis to generate a predictive model (not shown), comparable to the predictive model 66 described above with reference to FIG. 6. A corresponding business IS model (a reference model or predictive model) is interpreted (step 867) to provide modeled performance metrics.

The modeled performance metrics are compared with a set of corporate and business service requirements (step 861), producing respective indications of unacceptable performance metrics of one or more business processes. For business processes having unacceptable performance metrics, modifications to the enterprise IS architecture are determined and proposed to the system architect (user 863) for acceptance. If accepted, the model of the model IS architecture 875 is modified with the accepted modifications and the performance metrics are updated at each layer.

With the updated metrics, the model based assembly 870 updates the business ephemeris 850 with the updated metrics, including, for example, corresponding situations and remedies associated with the business information system 820. The updated ephemeris 850 may in turn be employed by the rule/matching engine 810 to generate a new case corresponding to the updated metrics of the ephemeris 850. The new case is then added to the case base, thereby updating the set of cases. As a result, the new case may provide diagnosis and proposed solutions to the business information system 820, allowing the case agent 830 to take reporting, self-healing or other actions as described above.

Figure 9:
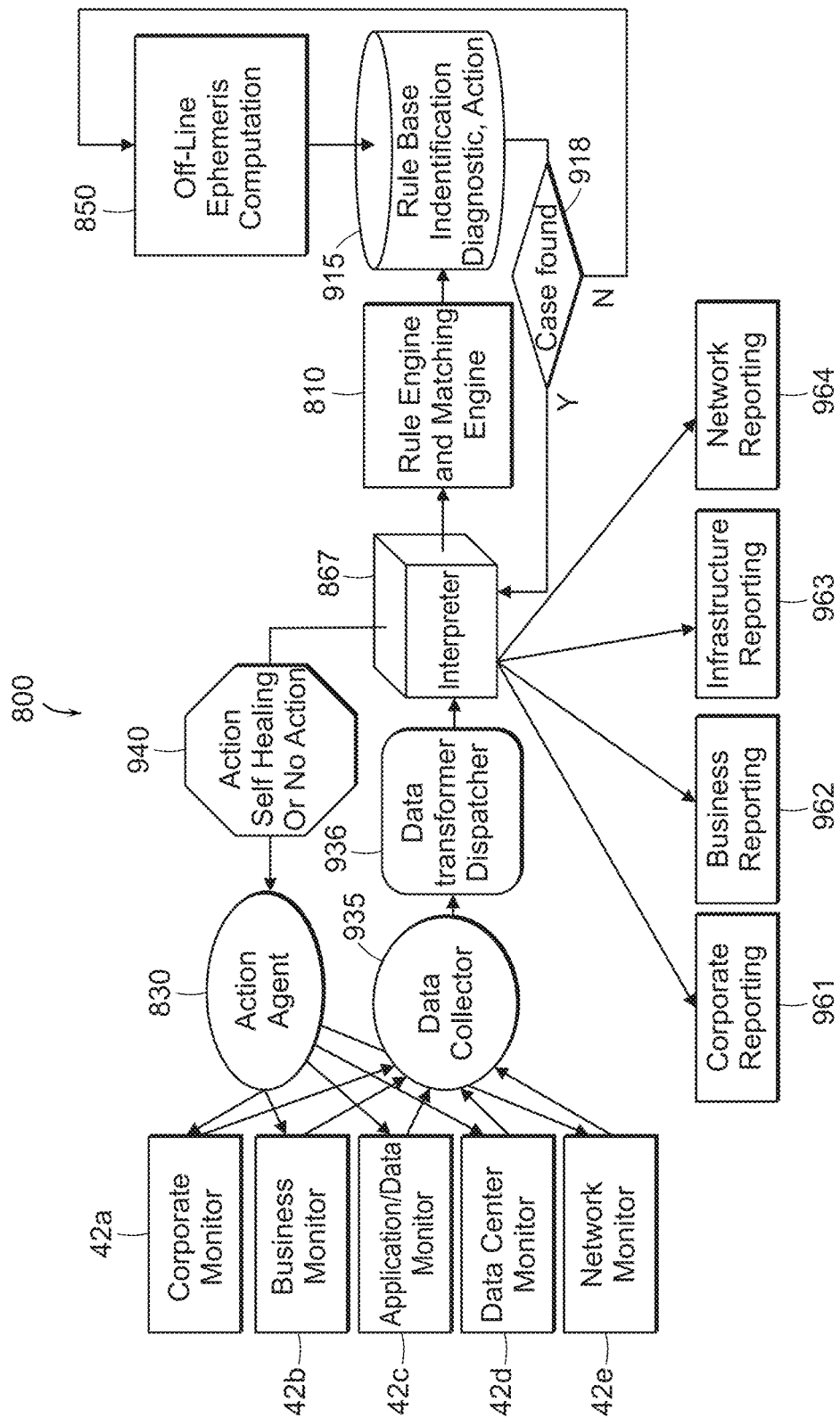
FIG. 9 is a flow diagram of the system of FIG. 8, further illustrating matching and reporting cases.

FIG. 9 is a flow diagram of system 800 matching and reporting cases. The rule/matching engine 810, case base 915, ephemeris 850, interpreter 867 and an action agent 830 are as described above with reference to FIG. 8. The system 800 further provides for multiple modes of reporting, which may be configured to report information, diagnosis and proposed actions that are specific to components of the business information system. Here, four modes of reporting are provided: corporate reporting 961, business reporting 962, infrastructure reporting 963, and network reporting 964. Each mode of reporting provides a view of relevant system metrics, such as throughput, cost efficiency, service quality and scalability. Alternatively, reporting may be specific to such metrics of the information system. The reporting may be provided in real time, which allows a case to be matched to an information system in its current state a provides an immediate, relevant diagnosis and proposed action for the information system. Moreover, case reporting can provide reports in terms of business functions and/or business processes. By operating interchangeably in terms of business functions and business process, the case reporting can provide a common language between business functions and business processes. Thus, embodiments of the present invention can present a business information system as an integrated part of an overall business model, thereby improving accessibility between all levels of the corporation or business.

In matching a case to the state of a business or enterprise information system, a number of monitors 42a-e monitor the various operations of the instant system. This monitoring incorporates features of the monitor 42 described above with reference to FIGS. 1 and 4. For example, the monitors 42a-e may each monitor one or more levels of a model business architecture that is updated in real time. A corporate monitor 42a monitors large-scale system connectivity between multiple business information systems; a business monitor 42b monitors structure, connectivity and changes to a particular business; the applications/data monitor 42c monitors software operation of the information system; the data center monitor 42d monitors system databases; and the network monitor 42e monitors the system network. Data from each of the monitors 42a-e are collected by the data collector 935, and relevant parameters are extracted by the data transformer 936.

By interpreting the data at interpreter 867, parameters of the system are arranged in a format for matching to a case in the case base 915. The rule/matching engine 810 performs the matching, and, if a case is found (step 918), the matching case is received by the interpreter 867. Depending on the matching case, the interpreter 867 may provide the corresponding diagnosis and proposed action or solution to one or more of the reporting modes 961-964. Further, the interpreter 867 may provide a corresponding action (step 940), where the action agent 830 may take action as directed by a user to modify the business information system. The action agent 830 may also take such action automatically (e.g., a self-healing action) without user intervention. If a case is not found (step 918), then parameters of the outstanding case are applied to the ephemeris 850 for off-line ephemeris computation, which in turn updates the case base 915 with a new case providing a matching diagnostic and proposed action.

For corporate management, the monitoring, reporting and action may be done with a given frequency (e.g., monthly), measuring global metrics spanning all business of the enterprise. Responsive action may be taken at the high-level business structure of each business. The corporate monitor 42a monitors corporate operations as described above, and such data is collected by the data collector 935. If a matching case is found (step 918), the case is reported as corporate reporting 961. The corporate reporting may be configured to provide a corporate officer with relevant information on the corporate information system. For example, the reporting 961 may provide a view of cost effectiveness of current hardware and software, productivity, scalability and quality of service, accompanied by proposed actions regarding each. A user may respond by initiating the proposed actions to the interpreter 867, which controls the action agent 830 to modify the system accordingly.

End-to-end business management may function comparably to the corporate management described above, wherein the business monitor 42b collects information regarding the business information and the business reporting 962 shows a diagnosis and proposed action of a matching case. Here, the frequency of the business monitoring and reporting may be higher than for corporate management (e.g., daily or weekly), and the metrics relate to business processes, with proposed action directed to cost and scalability.

Further, in application and data management, the application/data monitor 42c and data center monitor 42d provide updated information on software operation, data allocation and other hardware and software resources. From a matching case, diagnostic and proposed actions on these resources is reported to the business reporting 962 and infrastructure reporting 963 on a periodic basis (e.g., hourly or daily). The reporting metrics may include cache-hit ratio (CHR) and elongation, which is a measure of time in which business processes are scheduled. Proposed actions may be directed to distribution of resources and priority of business functions and processes.

Network management may further be provided by matching data collected from the network monitor 42e and identifying a matching case from the case base 915. The matching case is reported to the network reporting 964, and may be reported frequently (e.g., every second) to give up-to-date information on the state of the information system network. Relevant network diagnosis and proposed actions are thus provided to a user accessing the network reporting 964, and may also be provided to business reporting 962. The reported metrics may include round-trip delay (RTD) and service level agreement (SLA), and proposed actions may be directed to rerouting traffic through the network, modifying priority to network access points, or reconfiguring network routers in other ways.

Figure 10:
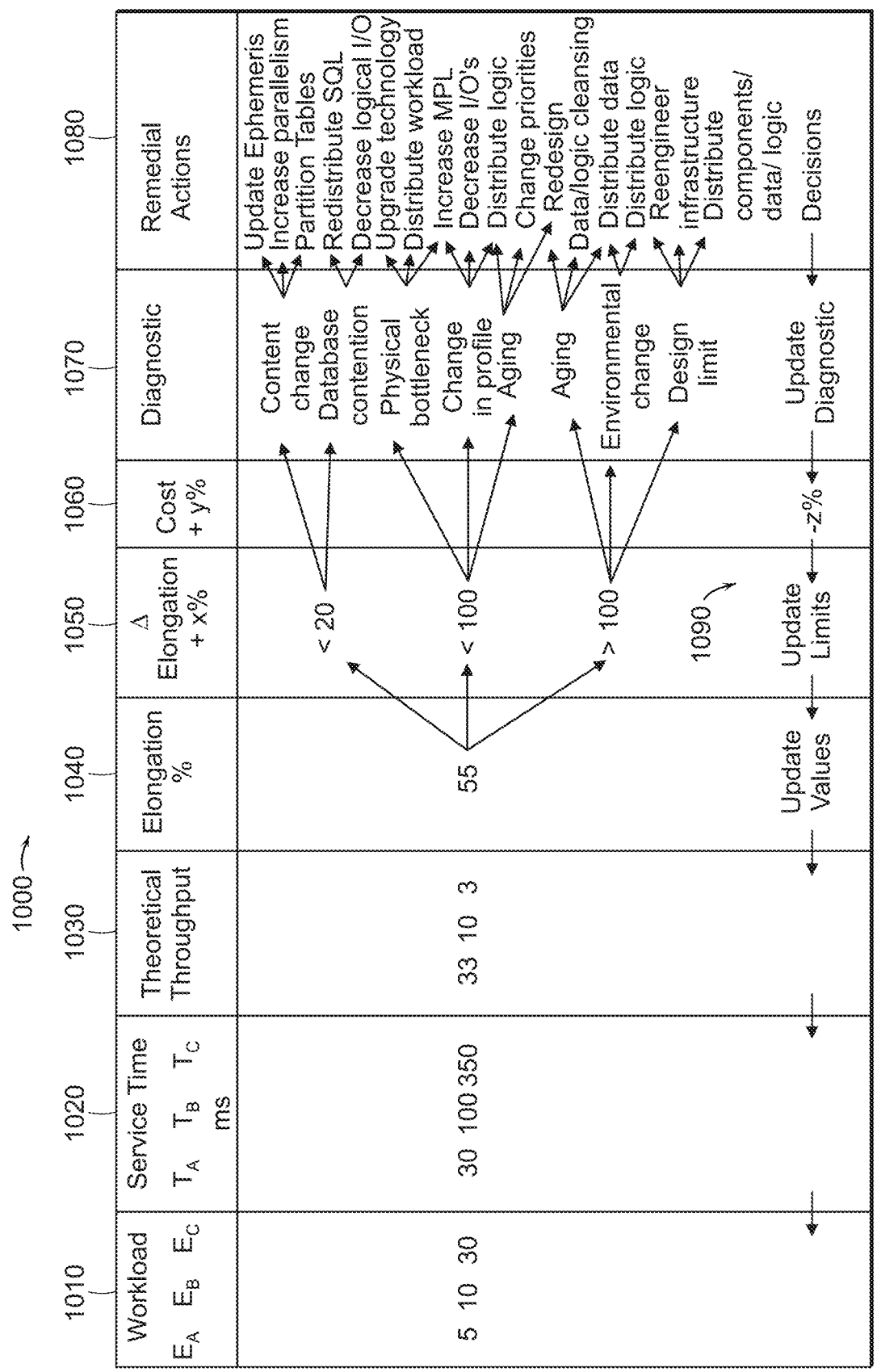
FIG. 10 is a chart illustrating content of a case.

FIG. 10 is a chart 1000 illustrating content of an exemplary case, as well as mechanisms of identifying, acting upon and updating the case. Each of the columns comprises information derived from a business ephemeris and pertains to a case in the case base, as described above. The workload column 1010 includes a number of variables $E_A$, $E_B$ and $E_C$, which correspond to different classes of business functions or business processes that are to be completed by the business information system. Such business processes and business functions may be referred to more generally as "events" that are completed by the business information system. The value of each variable $E_A$, $E_B$, $E_C$ indicates the number of such processes to be performed. The service time column 1020 includes variables TA, TB and Tc, which correspond to the aforementioned workload variables and indicate an estimated time to complete each event. The theoretical throughput column 1030 also comprises three values that correspond to the respective classes of business functions or business processes. The theoretical throughput values indicate the maximum throughput (i.e., number of events that can be delivered per unit time, within given constraints) available for each event. Theoretical throughput may be derived from a range of information about the business information system and the respective business process, such as available system resources, active and queued events, and the service time and resource cost of the business function or process.

The elongation column 1040 and elongation differential column 1050 provide measures of any delays in performing the presently requested events, as well as the change in this delay from a specified previous time. Elongation may be calculated from the measured response time and the measured execution time. By comparing this value with the reported elongation in a previously-matched case, an elongation differential, indicating a change in elongation over time, can also be determined. In the elongation differential column 1050, the case provides three ranges in which the elongation differential may fall: less than 20%, less than 100%, and greater than 100%. Likewise, the cost differential column 1060 may indicate the change in operating cost of the business information system over a given time.

Some of the parameters that may be used in performing diagnostic and remedial actions, including identifying critical and other system states, generating a case and matching a case, are reproduced in Table II, below.

TABLE II

| Parameters to Monitor the System and Identify System States | |
|---|---|
| THROUGHPUT | Total number of events per unit of time. |
| Theoretical Throughput | The maximum throughput a system will be able to deliver without any contention, conflicts, delays and/or locks. |
| Current Throughput | The number of events per unit of time a business system delivers. |
| Throughput Limit: | The maximum number of events per unit of time the system will be able to deliver at acceptable level of service quality. |
| Throughput Ceiling | The maximum number of events per unit of time with the assumption that the physical resources are over dimensioned and the data model as well as the applications is properly tuned |

TABLE II-continued

Parameters to Monitor the System and Identify System States

| | |
|---|---|
| Throughput New Ceiling | Performance oriented redesign, predicted new throughput, monitored and managed |
| RESPONSE TIME | Total time of execution of an event charged with all delays, contentions, conflicts and locks during the event life time |
| Volume1, type(i)* | <T0 |
| Volume1, type(i) | <T1 |
| Volume1, type(i) | <T2 |
| Volume1, type(i) | >Tmax |
| *Where i = number of distinct classes of events profiles | |
| EXECUTION TIME | Total time of execution free from any delays, contentions, conflicts and locks during the event life time |
| Volume1, type(i) | <T0 |
| Volume1, type(i) | <T1 |
| Volume1, type(i) | <T2 |
| Volume1, type(i) | >Tmax (service quality time limit) |
| ELONGATION | Amount of wait due to any delays, contentions, conflicts and locks during the event life time as percentage of the execution time. Elongation = (Response Time/Execution Time − 1) × 100% |

Because change in elongation is a factor in determining a correct diagnosis of the information system, the exemplary case implements the elongation differential as such. After a case is matched, the elongation of the matching case is compared to that of a previously matched case. The resulting elongation differential is then matched to one of the value ranges in column 1050. Alternatively, the case matching process could include matching to a precalculated elongation differential, where the matching case would include specific elongation differential values rather than a range of values.

Each elongation differential range in column 1050 is associated with one or more diagnostic statements, regarded as system diagnoses, indicated in the diagnostic column 1070. For example, if the change in elongation is less than 20%, the case indicates a diagnosis that a content change is required, that a database contention has occurred, or both. From these diagnoses the case further suggests a number of remedial actions to implement in the information system and/or the modeling architecture, as indicated in the remedial actions column 1080. For example, a diagnosis of a database contention may be associated with remedial actions to modify operations of the information system, such as redistributing the structured query language (SQL), or decreasing logical I/O throughput. Larger elongation differentials may be associated with more severe diagnoses, such as a physical bottleneck at a point in the information system, aging of the infrastructure, and reaching performance limits due to system design. Accordingly, associated remedial actions are indicated in column 1080, such as redistributing workload across the system, redistribute data and logic, and reengineering the information system infrastructure.

Moreover, the matching diagnoses and proposed remedial actions, along with characteristics of the information system, may be reported to a user, such as in the reporting modes 961-964 described above with reference to FIG. 9. Certain remedial actions may also be implemented automatically, without user intervention, on the information system by way of an agent such as the action agent 830.

Referring back to FIG. 10, as a result of implementing one or more of the proposed remedial actions, the matching case may no longer accurately characterize the resulting state of the information system. To again obtain a matching case, the case-matching process may be repeated as described above with reference to FIG. 9. However, certain remedial actions may result in case parameters that can be accurately predicted without monitoring the information system. If so, a case update process 1090 may be executed to update the content of a case based on these predicted parameters, rather than repeating the case matching process. One such case update process is described in further detail above with respect to FIG. 8. As a result, the matching case may continue to accurately reflect the information system after certain remedial actions are taken upon the information system.

The performance of an information system, and, by extension, the performance of a enterprise, may depend on a number of factors that reside outside of the information system. These factors, referred to hereinafter as "external resources" and "dynamics," or "non-information technology (IT) resources," can introduce latencies, utilize resources of the information system, and otherwise affect the performance of the information system and, ultimately, the performance of the enterprise. For example, a business process often involves a number of human operators (e.g., employees of the enterprise) to initiate, oversee and confirm completion of the business process. In addition, business operations can include the use of third-party services, such as transportation, consulting and accounting, which may influence the time, cost, efficiency and other qualities of a delivered product or service.

Emulation of an IS architecture, as described above, may therefore be extended to external resources and dynamics to further predict the operation of an enterprise. In providing such emulation, a model of a business service may be introduced to direct emulation at the model IS architecture and at the model of the external resources and dynamics. A business service is a service, provided by the enterprise, that comprises a number of operations completed by the IS architecture and external resources, and may further account for dynamics, constraints and performance requirements associated with that service. For example, a business service may include a number of business processes, as described above, and provide a particular sequence directing the emulation of each business service and other operations under a number of constraints and dynamics. Each business process, in turn, may include a workflow directing operations to be emulated by the IS architecture and external resources model, as well as facilitating communication between the IS architecture and external resources corresponding to such emulation. Alternatively, a business service may be exclusive to operations at the IS architecture, or may include only operations completed by resources (e.g., human operators) external to the IS architecture. Through this emulation, an enterprise may be optimized at multiple levels (e.g., IS architecture, corporate or business structures, etc.) to improve delivery of the emulated service.

Figure 11:
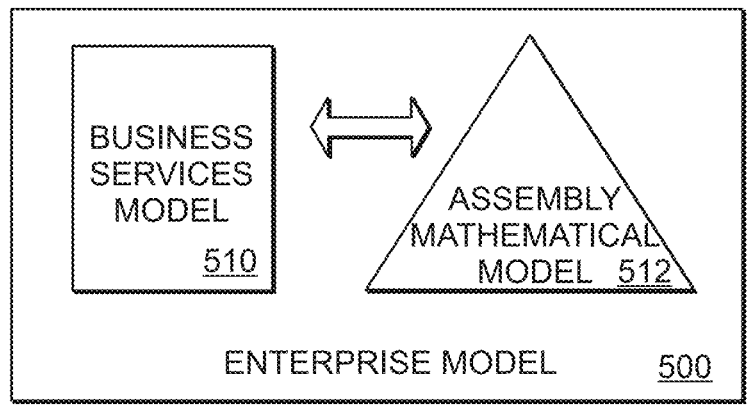
FIG. 11 is a block diagram illustrating an enterprise model in embodiments of the present invention.

FIG. 11 is a block diagram illustrating an enterprise model 500. The enterprise model includes an assembly mathematical model 512 and a business services model 510. The assembly mathematical model 512, a model of the IS architecture of the enterprise, may be comparable to the assembly 12 and the mathematical model 875, described above with respect to FIGS. 1 and 8, and may incorporate features of the mathematical model 62, reference model 64 and predictive model 66, described above with reference to FIG. 6. The enterprise model 500 further includes a business services model 510, described below with reference to FIGS. 12-15c. The business services model 510 includes a number of models of business services to be emulated by the mathematical model 512, and further includes models of external (e.g., non-IT) resources and dynamics. As a result, the enterprise model 500 enables emulation of business services by a broad scope of elements associated with an enterprise.

Figure 12:
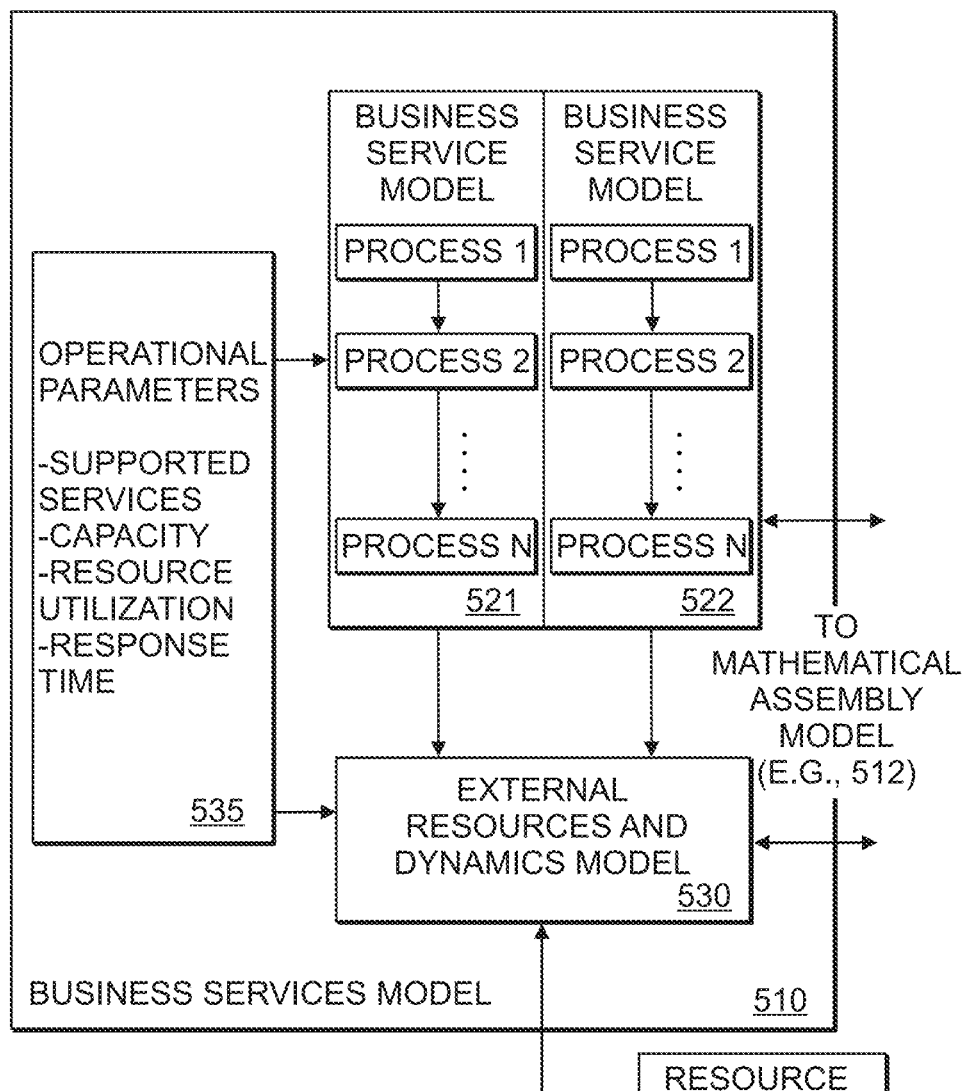
FIG. 12 is a block diagram illustrating a business services model in embodiments of the present invention.

FIG. 12 is a block diagram illustrating a business services model 510. The business services model 510 includes a number of business service models 521, 522, a register of operational parameters 535, and a model of external resources and dynamics 530. The external resources and dynamics model 530 includes a number of models of elements of an enterprise external to the IS architecture, such as human operators, as well as other factors associated with a business service, such as third party services and transportation of products. Such resources and dynamics are described in further detail below with reference to FIGS. 15a-c. A resource model library 540 includes a number of models of external resources and dynamics that may be imported to the external resources and dynamics model 530. The library 540 can include general process routines applicable to one of several external operators or dynamics, and may include more specific process routines designated to model a particular external operator or dynamic. In response to a revision to the business services model 510 (e.g., generation of a prediction model), the external resources and dynamics model 530 may require additional operators or dynamics not present in the model 530. For example, the revision may include a new human operator, or may introduce a new third party service. Accordingly, the external resources and dynamics model 530 may import models corresponding to those services, operators and dynamics from the resource model library 540.

The business services model 510 may include models corresponding to each service that is performed by the enterprise, including (and in addition to) the models 521, 522 as shown. A business service model 521 defines a workflow to be executed by the mathematical model (e.g., model 512 in FIG. 11) and one or more elements of the external resources and dynamics model 530. For example, the business service model may include a sequence of processes (i.e., "process 1," "process 2," etc.) that in turn specify business processes residing at the mathematical model 512, as well as other operations. The business service model 521 thus directs emulation of a respective business service via communication with the mathematical model 512 of the IS architecture and the external resources and dynamics model 530. The emulation of the business service may be monitored, for example by the monitor 42 described above with reference to FIG. 1, and results of the emulation may be compiled with the results of the emulation of other business services and compared against established operational parameters 535 for the enterprise. The operational parameters 535 may define a number of properties relating to the design constraints and performance goals of the enterprise. For example, the operational parameters 535 may specify the particular services (and quantity of each service) that must be supported over a given time (i.e., throughput), the resources that may be utilized or consumed in completing such services, and an acceptable length of time to complete each service (i.e., response time and quality of service). A mathematical engine emulating the business services may refer to the operational parameters 535 to determine the quantity of each business service to emulate, as well as determine whether the results of the emulation meet the performance goals established for the enterprise.

Figure 13:
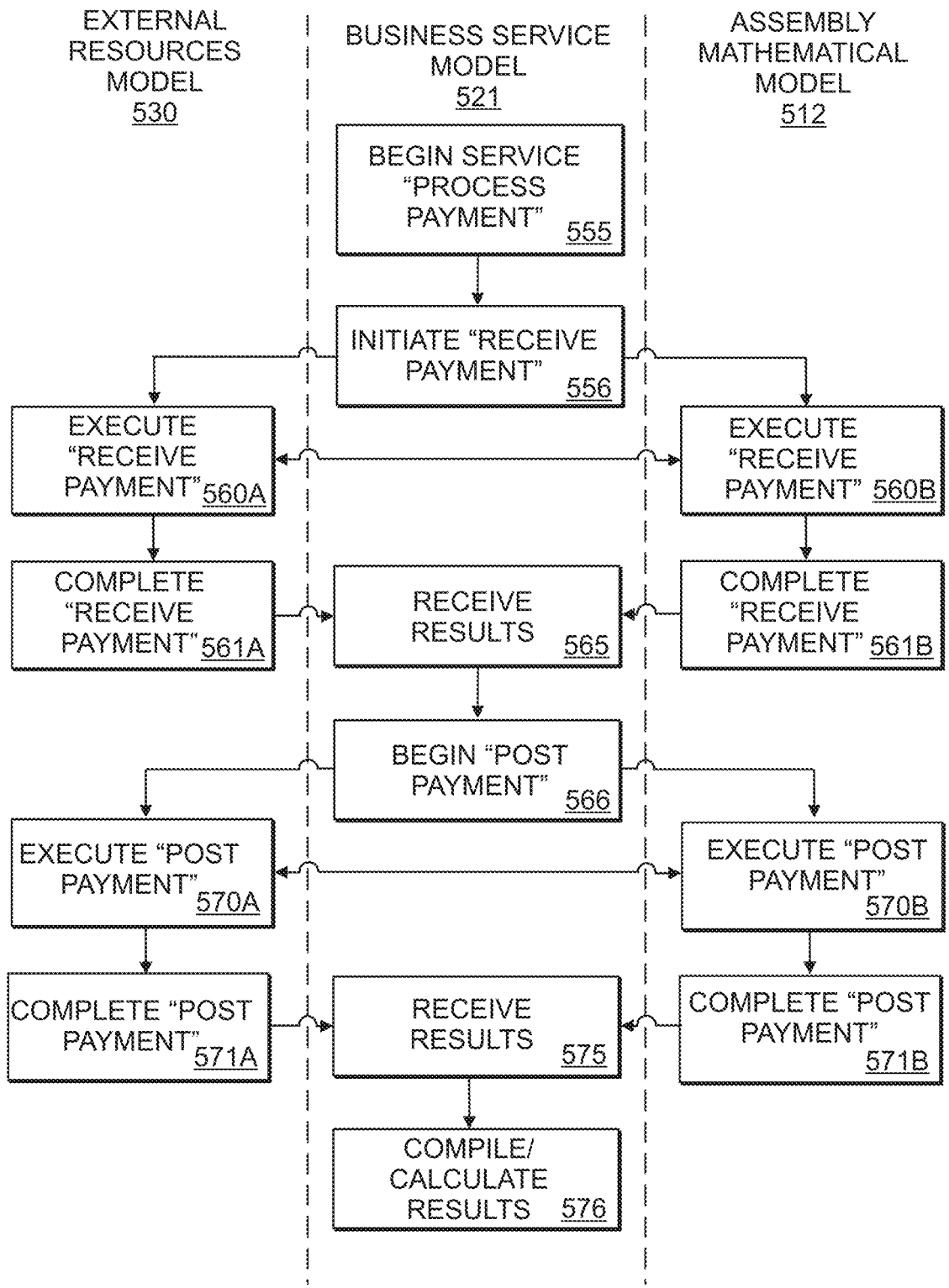
FIG. 13 is a flow diagram depicting an example business service model emulated by an enterprise emulator according to the present invention.

FIG. 13 is a flow diagram depicting an example process of emulating a business service model 521. With reference to FIG. 12, described above, the business service model 521 includes a workflow defining one or more processes and operations to be emulated by the mathematical model 512 and external resources and dynamics model 530. The business service model 521 itself is also emulated, for example by a mathematical modeling engine 49 (described above with reference to FIG. 1) or enterprise emulator 1110 (described below with reference to FIG. 16). The depicted service being emulated, referred to as "process payment" 555, includes business processes "receive payment" 556 and "post payment" 566, which in turn define a sequence of operations to be completed by the IS architecture and external resources. Accordingly, the business service model 521 begins the service "process payment" 555 by initiating the first defined business process, "receive payment" 556. In doing so, corresponding instructions 560A, 560B are received by the external resources and dynamics model 530 and mathematical model 512, respectively. With respect to the mathematical model 512, the received instructions 560B may direct the model 512 to emulate a business process (e.g., business process labeled "receive payment" 561B) defined by a layer (e.g., a business layer) of the model 512. Alternatively, the instructions may direct emulation at other layers of the model 512, such as a logic layer or a technology layer.

Similarly, the external resources and dynamics model 530 may receive detailed instructions 560A specifying the particular resources required to complete the process "receive payment," and may further define (step 561A) the subprocesses of "receive payment" to be emulated by the model 530. Emulation at the models 530, 512 may require communications between the models; for example, the business process at the mathematical model 512 may include a step requiring action by a human operator. In response, the mathematical model may transmit a detailed request for emulation of the required action to the external resources model 530, and the external resources model 530 may reply to the mathematical model 512 when emulation of the action is complete.

At step 265, the business service model 521 receives confirmation when respective operations for "receive payment" 556 are completed by the models 530, 512. Results of the emulation may be received further by a monitoring element (e.g., monitor 42, described above with respect to FIG. 1) for determining performance of the enterprise model in emulating the business process. The business service model then initiates the next business process, "post payment" (566), leading through a sequence, comparable to the process described above, of execution (570A-B) and completion (571A-B) at each of the models 530, 512, and returning results 575 to the business service model 521. Once results (e.g., 575) for the final process in the service is completed, the business service model 521 may compile 576 the results received from the models 530, 512, and may calculate derivative results, such as response time (including time to complete each process and to complete the service in its entirety), utilization of resources, and throughput. Such results may be calculated by an emulator, such as the enterprise emulator 1110 described below with reference to FIG. 16.

Figure 14A:
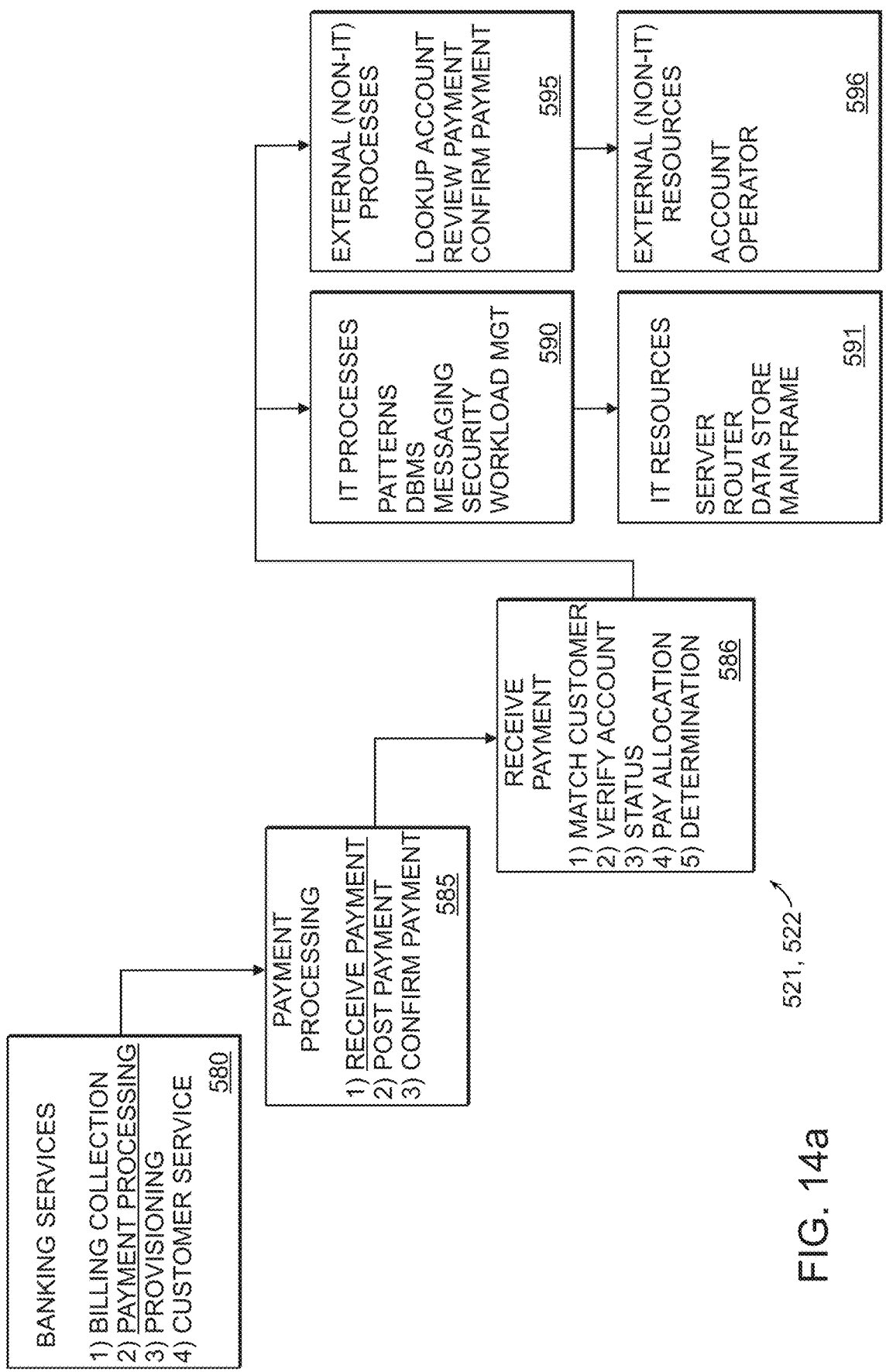
FIG. 14a is a block diagram illustrating structure of an example business service model of the present invention.

FIG. 14a is a block diagram illustrating structure of an example business service model, such as the business service models 521, 522 described above with reference to FIGS. 12 and 13. Index "Banking Services" 580 indicates a number of business services related to banking, and thus may be performed by an enterprise providing banking services. Each of the business services (e.g., "billing collection," "payment processing," etc.) may be modeled as a business service model such as business service models 521, 522 and maintained in a business services model 510 as described above with reference to FIGS. 12 and 13.

Business service index 585 represents a model of a business service, "payment processing," provided in the "Banking Services" index 580. The index 585 represents a business service model, comparable to the models 521, 522 described above, and indicate a sequence of business processes (i.e., "receive payment," "post payment") and other operations associated with the business service. Business process index 586 represents a model of a business process, "receive payment," provided in the "payment processing" index 585. The business process index 586 includes a sequence of tasks to be performed by an IS architecture and external resources in completing the business process. The indexed tasks (e.g., "match customer," "verify account," etc.) may be organized further into more specific processes, instructions, routines and operations to direct operation of particular components of the IS architecture and external resources.

The business process index 586 may also be associated with indexes of processes and resources required by the respective business process. For example, IT processes index 590 indicates the processes supported by the IS architecture that are utilized in completing the business process, such as software applications, messaging services, management services and networking services. IT resources index 591 corresponds with the IT processes index 590 by indicating the IT infrastructure required to support the indexed applications, such as particular data servers, network routers, and other IT components. Likewise, the external processes index 595 indicates processes supported by external resources 596 that are utilized in completing the business process (e.g., "receive payment"), such as actions that are completed by a human operator or are provided by third-party services. The business service model thus may be organized in a manner indicating all processes and resources, both integral and external to the IS architecture, that are required to support the business service.

Figure 14B:
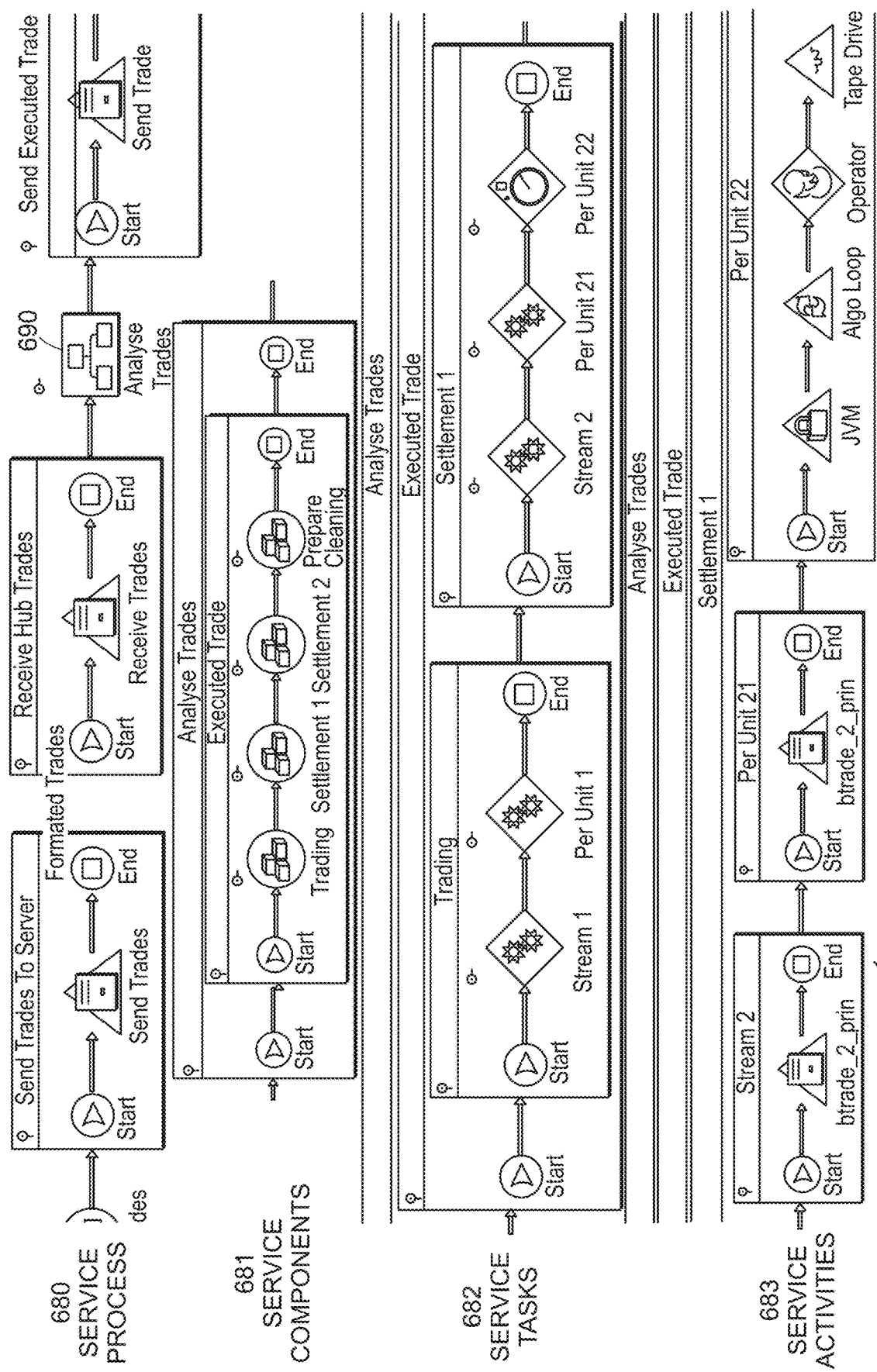
FIG. 14b is a graphic user interface (GUI) view of a structure of an example business service model.

FIG. 14b illustrates a graphic user interface (GUI) view of a structure 670 of an example business service model, such as the business service model 521, 522 described above with reference to FIGS. 12 and 13. The structure 670 may be comparable to the structure described above with reference to FIG. 14a. The structure 670 includes 4 "layers" 680-683 (shown here as excerpts to illustrate relation between the layers). The uppermost layer 680 illustrates the workflow, or service process, of a business service. The example business service relates to a service to process a trade, such as a trade of equities in a market environment. A number of business processes, such as "Analyze Trades" 690, are ordered in a sequence to be executed in delivering the respective business service.

The second layer 681 depicts a number of service components that constitute a respective business process. For example, the service components "Trading" and "Settlement 1" each describe a number of operations undertaken by one or more of the IS architecture and external resources, and in turn constitute a sequence of operations performed to complete the business process "Analyze Trades" 690. The third layer 682 depicts a number of service tasks that constitute a respective business component. For example, the aforementioned service component "Settlement 1" includes service tasks "Stream 2," "Per Unit 21," and "Per Unit 22." Lastly, the fourth layer 683 depicts a number of service activities that constitute a respective service task. These service activities represent the lowest level of operations undertaken to deliver a business service, and each service activity is directed to a specific operation performed by a component of the IS architecture or an external resource. For example, the aforementioned service task "Per Unit 22" includes service activities "JVM," "Algo Loop," "Operator," and "Tape Drive," each of which is executed by a particular component of an enterprise model. By providing a multi-layered structure 670 for each business service model to be emulated with an enterprise model (e.g., enterprise model 500 in FIG. 11), operations of the IS architecture and external resources can be organized in a logical hierarchy, thereby simplifying analysis and optimization for each business service model. The structure 670 is an example organization of business service constituents; alternative embodiments of a business service structure may include a greater or lesser number of layers.

FIG. 15a is a table 598 of a database maintaining properties of external resources and dynamics. The table 598 provides primary information about the operators and dynamics constituting an external resources and dynamics model, such as the model 530 described above in FIGS. 12 and 15, and may be a component of the model 530. The table 598 identifies each of the operators and dynamics by name, and provides appropriate information for each. For example, the entry "account operator" identifies a total of 72 such operators included in the external resources, and provides a quantity of time available to utilize the operators. This time quantity, in turn, may be organized into a calendar or other schedule for determining the availability of resources at a particular time during the emulation process. Each account operator may also be associated with particular IT resources of the IS architecture (e.g., a workstation computer).

The table 598 accounts for each of the operators and dynamics of an external resources and dynamics model 530. The operators, in turn, may be modeled by a number of individual operator models. Example operator models are described below with reference to FIGS. 15b-c. Further, a revision to the external resources and dynamics model 530 (e.g., by adding or removing operators), as in the process of a design revision or generation of predictive models, may be accounted for by updating corresponding entries in the table 598. Alternatively, a revision to the external resources and dynamics model may be initiated by updating the table 598, which, in turn, directs the model to be updated accordingly.

Entries in the table 598 may further include descriptions of resources and dynamics other than operator models. For example, the entry "account audit" describes a third-party service that may be requested by the enterprise and utilized within a business service. The entry specifies a length of time anticipated to complete the third-party service, and may also specify a cost (not shown) and resources (of the IS architecture and/or external resources) that are utilized to complete the third-party service. The entry may further be associated with an operator model, comparable to the operator model described below with reference to FIG. 15*c*, to emulate the operation of the third-party service. Alternatively, if the third-party service can be represented accurately without an operator model, then the entry in the table 598 may be sufficient. For example, during emulation of a business service, a third party service may reliably be accounted for by imputing static information about the third-party service, such as length of time (response time), cost, and enterprise resources required. In such a case, the table 598 may provide sufficient information to represent the third-party service.

The table 598 may also account for additional dynamics, latencies and costs that affect the outcome of a business service. For example, the entry "ship product" may account for the latency introduced by transporting a product to a customer. An emulated business service may therefore receive this table entry, in addition to the relevant output of any operator models or third-party services, to determine the properties of a service involving shipment of a product.

Figure 15B:
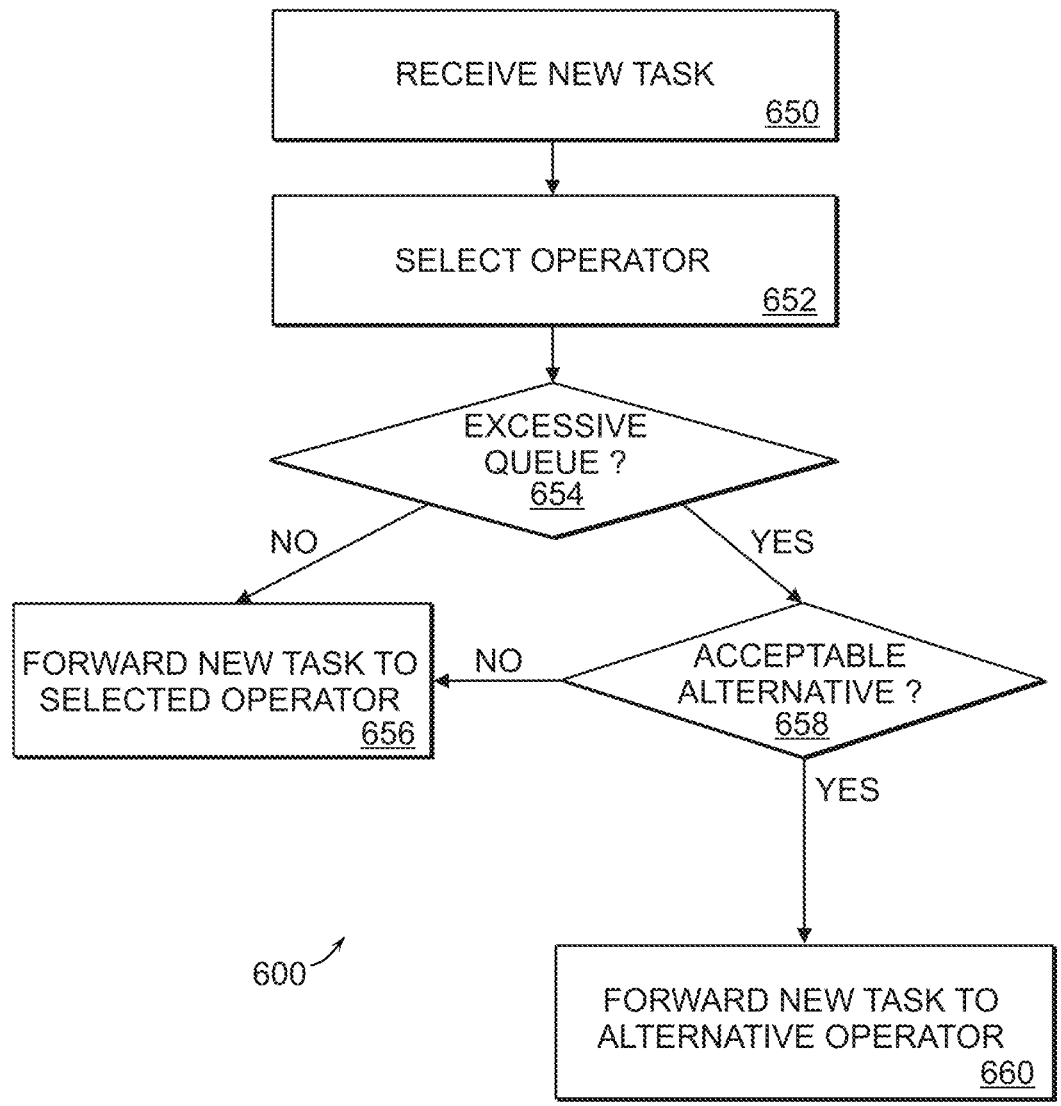
FIG. 15b is a flow diagram illustrating operation of a management model of the present invention.

FIG. 15*b* is a flow diagram illustrating operation of a management model 600. The management model 600 may be a component of the external resources and dynamics model 530, described above with reference to FIGS. 12 and 13. In particular, the model 600 may be utilized to emulate process segments of a business service 521, 522 such as the processes of executing the "receive payment" and "post payment" business processes (560A, 570A) as in FIG. 13.

The management model 600 may be configured to emulate one or more management type processes, and, more specifically, determines how tasks are divided among a plurality of operators. During emulation, the model 600 receives a new task (at 650), which may include one or more operations of a business process or other constituent of a business service 521, 522. The task may identify an operator required to complete the task, as well as a description of the particular operations of the task to be completed. An example task is described below with reference to FIG. 15*c* and an operator model 601.

Upon receiving a new task, the management model 600 selects an operator (at 652) to which the task is assigned. The task may identify a class of operators (e.g., "account operator"), where any one member of the class is suitable to complete the task, or may identify a unique (certain) operator. Identifying a unique operator may be required, for example, when the task relates to a previous task completed by a specific operator, or when the identified operator itself is unique. Thus, at step 652 the model 600 selects an operator according to a class of operators or a unique identifier as specified by the task. Further, the management model 600 may be configured to consider one or more additional conditions in determining assignment of the task. For example, the model 600 may monitor the task queue at each of the operators and, in response, allocate tasks in a manner to equalize workload among the operators in a common class. In alternative embodiments, the management model 600 may be configured to allocate work in a manner more particularly representing how a manager in the enterprise (i.e., an employee of the enterprise) assigns work to other employees under his or her supervision. For example, the management model 600 can be configured to be associated with a particular group of operators, and may assign tasks in accordance with a time schedule based on actual or expected management/employee interaction.

Once an operator is selected, the management model 600 inquires as to the task queue of the selected operator (654). If the task queue at the operator is not excessive, meaning that the operator can be expected to complete the task within an acceptable length of time, then the model 600 forwards the task to the operator model for emulation (656). If the task queue is excessive, the model 600 may review the properties of the task to determine whether an alternative operator (e.g., another operator within the same class of operators) is acceptable to emulate the task (658). If so, then the task is forwarded to an acceptable alternative operator (660); otherwise, the task is forwarded to the originally selected operator regardless of its task queue.

Figure 15C:
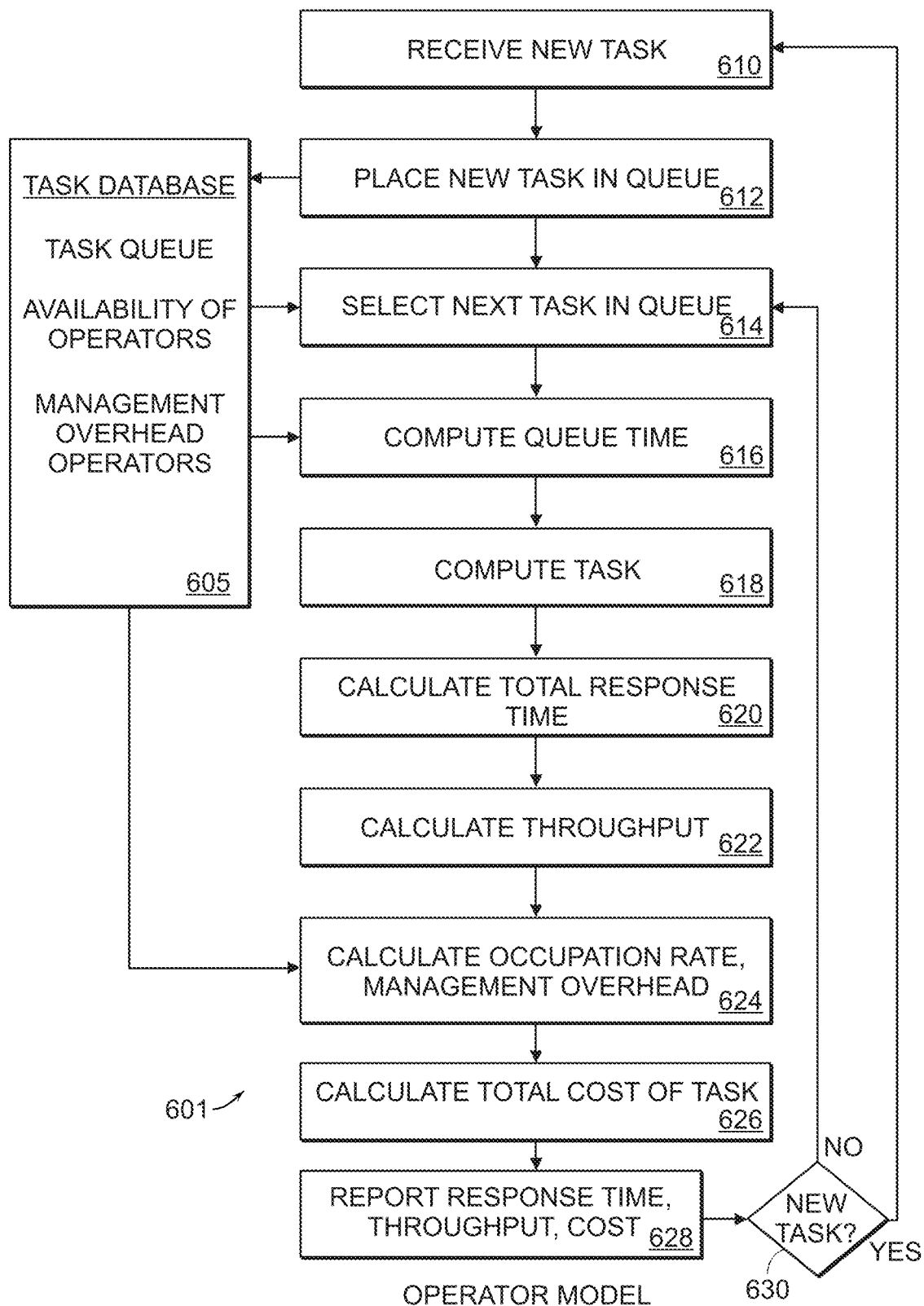
FIG. 15c is a flow diagram illustrating operation of an operator model of the present invention.

FIG. 15*c* is a flow diagram illustrating an example process of an operator model 601. The operator model 601 may be a component of the external resources and dynamics model 530, described above with reference to FIGS. 12 and 13. In particular, the model 601 may be utilized to emulate process segments of a business service 521, such as the processes of executing the "receive payment" and "post payment" business processes (560A, 570A) as in FIG. 13 or external processes indicated by the index 595 in FIG. 14*a*.

The operator model 601 receives a new task (610), for example from a management model 600, and places the new task in a task queue (612). The task database 605 maintains operational data for the operator model, including the task queue, information on the availability of other operators related by a common class or task, and an account of overhead costs and other resources associated with the operator. The new task may be assigned a place in the queue based on its priority (as defined by the task) relative to the priority of other tasks in the queue.

At step 614, the operator model 601 selects the next task in the queue and proceeds to emulate the task by computing a number of properties regarding the task upon its completion. For example, the operator model 601 computes 616 the length of time that the selected task has resided in the task queue, and then computes 618 the length of time to complete the task. In performing this computation, the model 601 may communicate with one or more components of an associated IS architecture model (e.g., model 512 in FIGS. 11 and 13), thereby accounting for any latencies or additional use of resources that are introduced by the operator interacting with the IS architecture. Further, the calculation may incorporate a number of other parameters, constraints and latencies in order to more closely emulate the behavior of a human operator within the enterprise. For example, the model 601 may utilize additional latencies and a time schedule to approximate the availability and productivity of an operator.

At step 620, the operator model 601 then calculates the total response time for the task, which is based on the queue time, the time to complete the task, and any additional latencies. A rate of tasks completed over time, or throughput, may also be calculated based on the productivity in completing the task and other tasks over a given length of time (622). Based on the total response time and data regarding overhead (managing and supporting) resources, at step 624 the model 601 may calculate the occupation rate and management overhead associated with completing the task, which in turn enables calculation of the total cost of the task (626). Upon completing the above calculations, the operator model 601 provides a report indicating, response time, throughput, cost and other data regarding completion of the task (628). The report may be aggregated with information regarding the emulation of other components of the business service, thereby providing information on performance of the business service and the enterprise as a whole. For example, the report may be included in performance vectors for throughput, quality and cost as described above and below with reference to FIGS. 5 and 16.

Once the calculation of the task is complete, the operator model 601 inquires as to whether a new task is received (630). The model 601 places any newly received tasks in the task queue 605 (steps 610 and 612) and repeats the above process (steps 614-628) for the next task in the queue 605.

Figure 5:
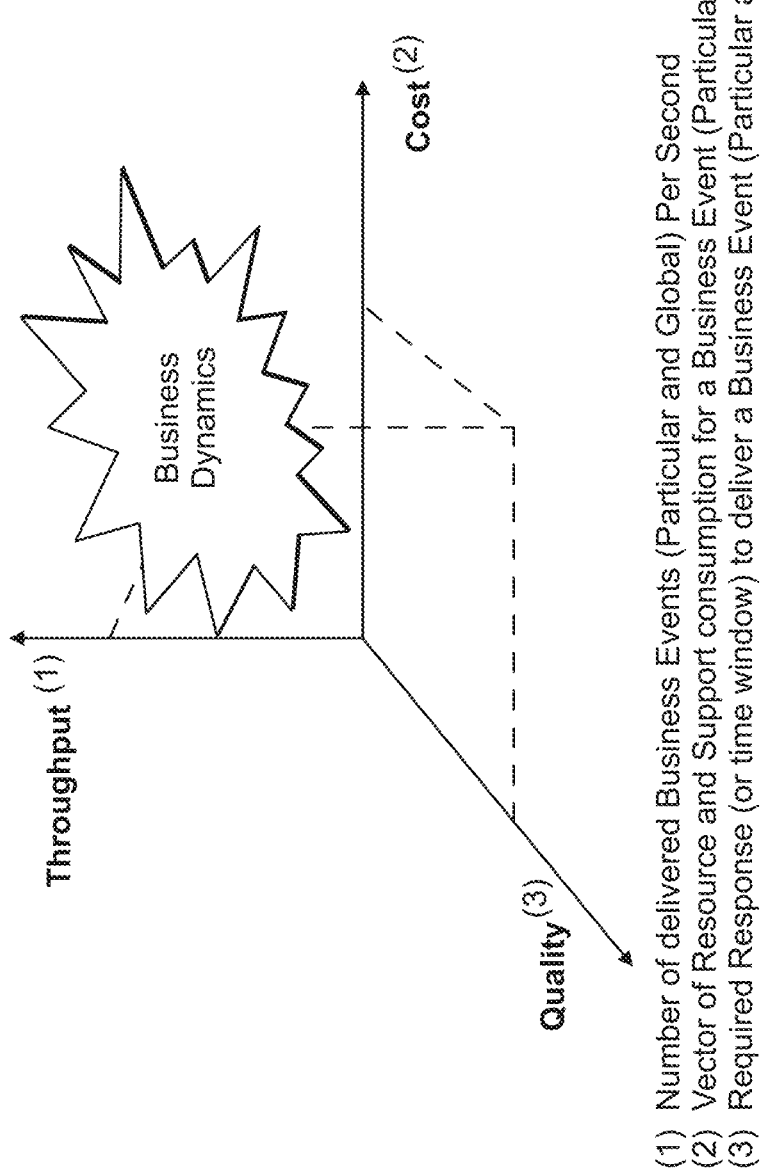
FIG. 5 is a graph illustrating dimensions of quality of service, cost and throughput employed in an automated management system of the present invention.
Figure 16:
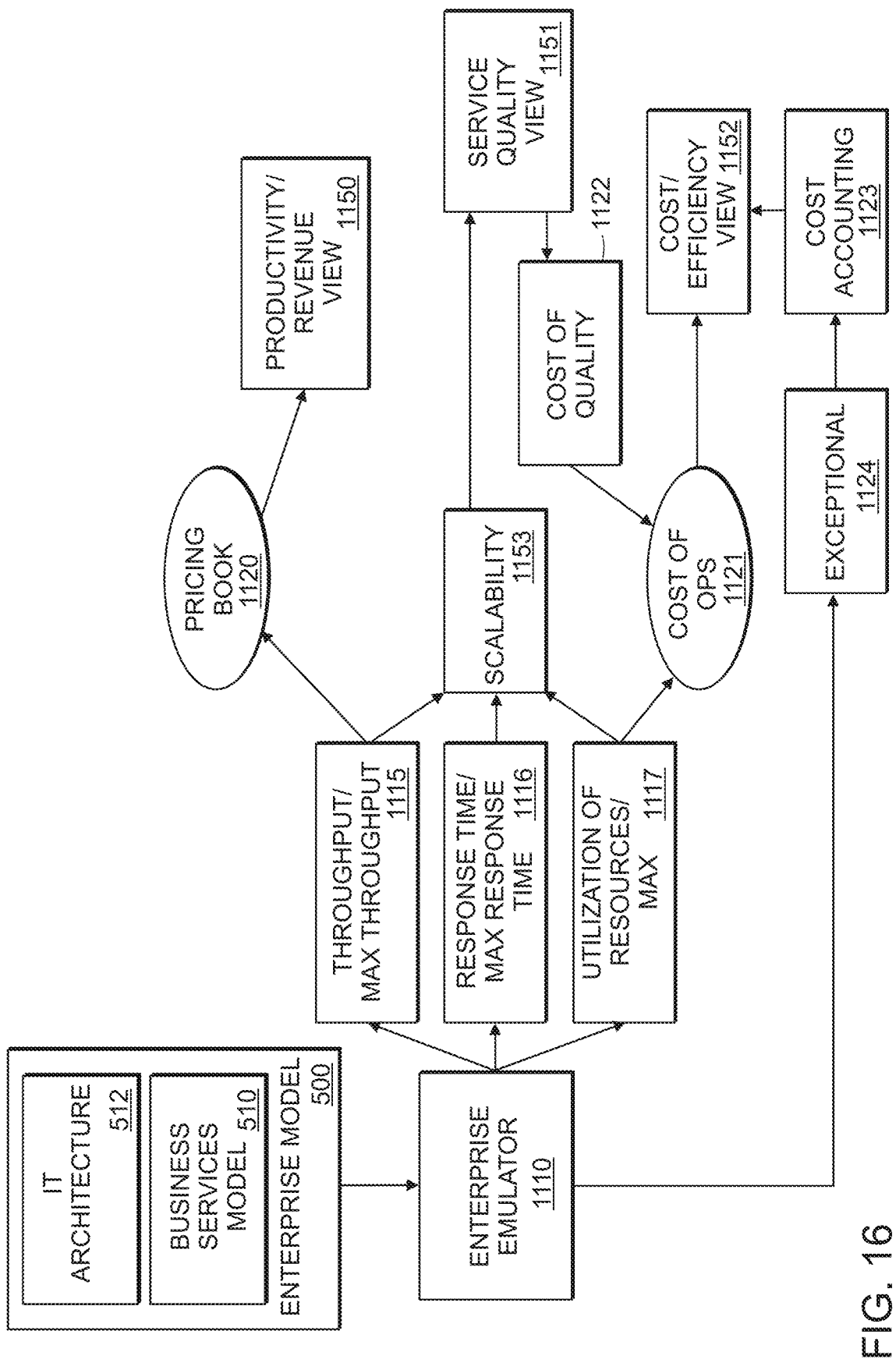
FIG. 16 is a block diagram illustrating system parameters produced by an enterprise emulator of the present invention.

FIG. 16 is a block diagram illustrating system parameters produced by an enterprise emulator 1110. Here, embodiments of the invention are adapted for qualitative modeling of a service oriented architecture and a cost architecture. A system providing business service emulation as described above may be implemented to report and act upon qualitative business metrics such as throughput, response time and cost as illustrated in FIG. 5.

The enterprise emulator 1110 receives an enterprise model 500, including the IS architecture model 512 and business services model 510 (further including the external resources and dynamics model 530, described above), and emulates the enterprise through execution of one or more specified business services. The enterprise emulator 1110 provides vectors for throughput 1115, response time 1116 and consumption 1117, which are derived from the emulation of the business service(s). The vectors may also include maximum values or vectors of throughput, response time and consumption that may result from implementing a proposed action of the case.

The vectors 1115-1117 are translated and applied to additional business information to provide four reporting "views": productivity and revenue 1150, service quality 1151, cost and cost effectiveness 1152, and scalability 1153. For example, the throughput vector 1115 indicates a rate of business events delivered per unit time. This vector 1115 is applied to a pricing book 1120 that indicates a value for each delivered business event. The resulting application is reported in the productivity and revenue view 1150, which reports the total productivity achieved in the present emulation. Moreover, the view 1150 can also report a predicted productivity that would result from implementing the emulated business service. To do so, the throughput vector 1115 is applied to the pricing book 1120 as described above. The vector 1115 represents the predicted throughput of the business service. As a result, the productivity and revenue view 1150 may provide a report on the productivity of the emulated business or enterprise system, as well as the predicted productivity of one or more proposed scenarios as emulated. This in turn enables a user to consider the effect of implementing proposed configurations of IS architecture and external resources.

In a similar manner, the cost view 1152 indicates overall cost and cost efficiency of the subject business information system. The consumption vector 1117 is applied to a cost index 1121 having an associated cost for each operation of the information system. Because response time and, accordingly, service quality also affect system cost, a cost of quality metric 1122 is also applied to the cost index 1121. The resulting cost is indicated to the cost view 1152. Further, additional system costs may not be accounted for by the vectors 1115-1117 generated from the emulation. If so, these cost factors are captured in the exceptional costs metric 1124, and provided with a corresponding cost by the cost accounting index 1123 to the cost view 1152. As a result, the cost view 1152 enables a user to view the overall cost and cost effectiveness of the enterprise, including the IS architecture and external resources.

The reporting views 1150-1153 may provide a more detailed window of information to a user regarding a particular emulated enterprise model 500. For example, the corporate reporting 961 of FIG. 9 may be implemented as vectors 1115-1117 to produce one or more of the views 1150-1153 of FIG. 16. Corresponding vectors 1115-1117 are applied as described above, resulting in the four views 1150-1153 indicating productivity, service quality, cost and scalability of the present emulation. Further, predicted outcomes of proposed solutions or remedial actions may also be represented by vectors 1115-1117. By applying these vectors as described above, a user may further observe one or more views 1150-1153 indicating productivity, service quality, cost and scalability as a predicted outcome of implementing the present enterprise configuration or a proposed solution. Thus, a user may view various characteristics of the present enterprise, as well as compare those characteristics to predicted characteristics of an enterprise after a proposed solution is implemented. Through this comparison, a user can determine the effects of implementing a proposed solution.

Figure 17:
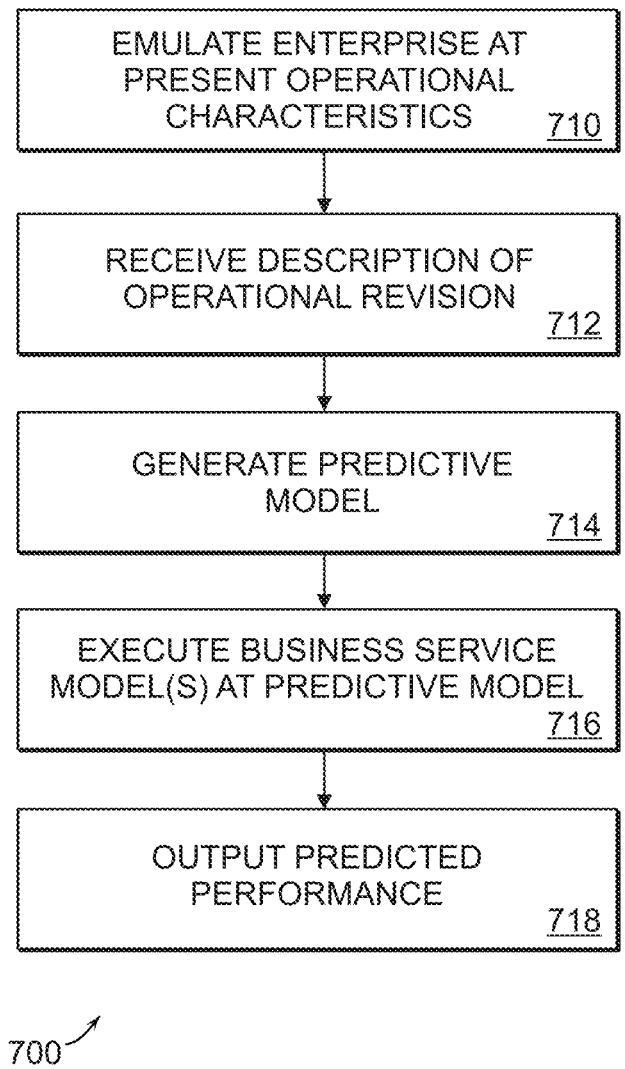
FIG. 17 is a flow diagram of a process of generating and emulating a predictive model of an enterprise according to the present invention.

FIG. 17 is a flow diagram of a process 700 of generating and emulating a predictive model of an enterprise. The process may be comparable to (and incorporate) the processes of generating and analyzing mathematical models described above with reference to FIGS. 1-6, while further providing for the emulation and analysis of an enterprise model including business services and external resources and dynamics. For example, the mathematical modeling 49 and monitoring 42 applied to the mathematical assembly model 12, as provided in FIG. 1, may be applied further to the enterprise model 500 in FIG. 11.

Beginning at step 710, the process 700 initially emulates an enterprise, based on a present enterprise model, to determine the present operational characteristics of the enterprise, including quality of service (response time), capacity to deliver services (throughput) and cost (utilization of resources). A description of a revision to the enterprise may be received (712). This revision may indicate an actual modification to the enterprise itself, or may reflect a predictive scenario for analyzing a potential modification to the enterprise. With reference to FIGS. 11 and 12, for example, the revision could pertain to a change in the IS architecture 512 (e.g., by introducing new hardware or software, or by reconfiguring a network), a change to a business service model 521, 522 (e.g., by adding or removing business processes), a change to the external resources and dynamics model 530 (e.g., by adding a new operator or modifying the quantity of an existing operator), or by changing the operational parameters (e.g., by requiring a shorter response time for delivering a service, or by increasing the number of business services that must be supported over a given length of time). The operational revision may be introduced by a user or by an automated process of optimization.

From the description of the operational revision, a predictive model is generated (714). The predictive model is then emulated through the execution of one or more business service model(s) (716). For example, a set of business services, corresponding to a required capacity of business services as indicated in the operational parameters 535, may be emulated at the enterprise model 500. Based on such emulation, a system may output a predicted performance for the predictive model (718). As a result, a user can determine the performance to be expected to result from introducing the operational revision, including, for example, the predicted throughput, quality of service, and cost of the enterprise.

Figure 18:
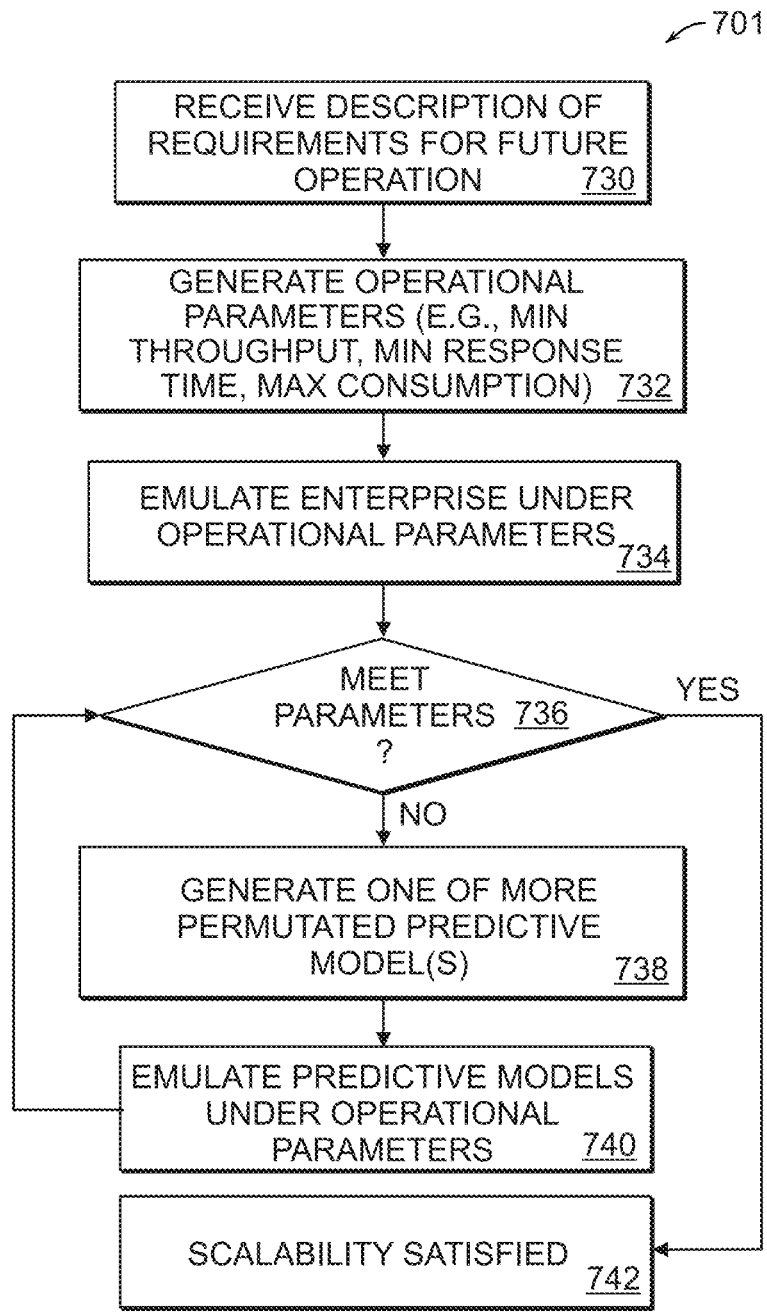
FIG. 18 is a flow diagram of a process of determining properties of a model enterprise to meet scalability or other design requirements according to the present invention.

FIG. 18 is a flow diagram of a process 701 of determining properties of a model enterprise to meet scalability or other design requirements. The process 701 may be comparable to the process 700 described above, with the addition of further processes for generating and analyzing predictive models. Under this process, a description is received pertaining to performance requirements for the enterprise (730). For example, if the enterprise is predicted to require a higher capacity of delivered services in the future, then the requirements can include a quantity of services delivered, minimum throughput, and other considerations. From these requirements, corresponding operational parameters may be generated 732, which may then be utilized to update the operational parameters (e.g., parameters 535) of a predictive enterprise model.

Once updated, the enterprise model may then be emulated through one or more business services (734). From this emulation, it can be determined at 736 whether the emulated enterprise is capable of performing to the standard imposed by the operational parameters (e.g., parameters 535). If so, then the enterprise model is determined at 742 to be scalable to the operational parameters. If the enterprise model fails to meet the operations parameters, for example by delivering a throughput lower than the minimum required throughput, then a design system may undergo a process of generating and emulating one or more predictive models, comparable to the process described above with reference to FIGS. 3a-b. One or more predictive models may be generated in an automated and/or user-controlled process of introducing acceptable changes to the emulator model, and generating a predictive model incorporating those changes (738). Such modifications may include changes to the models of the IS architecture, the external resources, and the business services.

The predictive model(s) are then emulated at step 740 and step 736 to determine whether the proposed changes result in an enterprise meeting the new operational parameters. If so, then the corresponding changes to the enterprise may be proposed to a user as a solution to meet the new (or future) operational parameters. If not, then the process at steps 738, 740 may be repeated until such a solution is found. A user may respond to the proposed changes by accepting the changes as a revision to the enterprise model. Accordingly, the user (e.g., a manager, executive or director of the enterprise) can direct the changes to be implemented in the enterprise itself, for example by upgrading computer hardware, reconfiguring a database system, or hiring additional employees. Thus, as a result of predictive modeling of business services within a model enterprise, including both an IS architecture and resources and dynamics external to the architecture, an enterprise can be revised and updated continuously to meet and exceed operational parameters over time.

Predictive Deconstruction of Dynamic Complexity

Embodiments of the present invention provide for deconstruction and analysis of dynamic complexity within a complex environment or system, such as a business enterprise. Embodiments may be adapted to a range of applications related to complex environments or systems, where a complex environment or system may be a coordinated environment or system that is made-up of a large number of parts or units. In general, complexity in a system increases with the number of constituent parts or units. Such environments or systems may have a number of characteristics that determine its complexity, including:

Each part or unit may be the same or may be different; in general, complexity increases as the number of types increases.

Each part or unit is connected to another part or unit; in general, complexity increases as the number of connections increases.

Changes occur within the environment or system to parts, units and connections; a larger number or changes, or the magnitude of those changes, may in turn change the complexity and behavior of the system to an increasing degree.

Changes flow through the environment or system and cause it to alter its behavior; this flow of changes causes the dynamic complexity of the environment or system to change. Actions and reactions occur within and around the environment.

Changes in managing the environment that may result of creation of feedback processes, more combinatorial or further distribution (e.g. virtualization)

The changes can be the result of many factors like growth, aging, failures, lack of information, bottlenecks.

Example environments or systems include weather systems, economic systems, information technology (IT) systems, biological systems, and manufacturing systems.

Embodiments of the invention provide for determining when the behavior of a complex environment or system becomes unexpected and "singular," also referred to as a "singularity." Such behavior can be destabilizing and dangerous not only for the system itself but the environments that surround the system. The term "singular," as used herein, may be understood as having a quality beyond or deviating from the usual or expected, or that is highly unusual, exceptional, or remarkable. The term "singularity," as used herein, may be understood as a point or event that is singular. Examples of singularities in mathematics include a point at which a function is not differentiable although it is differentiable in a neighborhood of that point, a discontinuity, or a point at which the rate of change of some quantity becomes infinite or increases without limit.

Much of the current understanding of such unexpected or singular behavior is based upon the probability of an unexpected big event occurring, as well as the reactions that occur outside the system as a result of this. Today much effort is spent on remedying unexpected results without understanding their cause. Embodiments of the invention serve to identify a cause or causes that may produce unexpected results.

Example embodiments provide for predicting the time and amplitude when an unexpected event will happen and what combinations of actions within the system are affected. A change may have a frequency (how frequent it may occur) and amplitude (how great a change may be).

Figure 19:
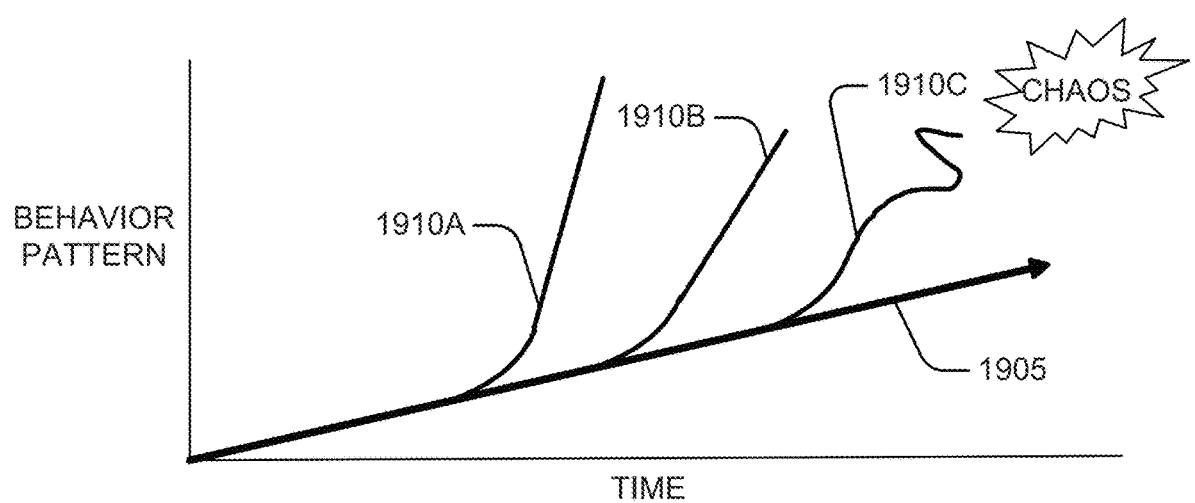
FIG. 19 is a chart illustrating the concept of changing behavior of a system over time.

FIG. 19 is a chart broadly illustrating the concept of changing behavior of a system over time. The behavior pattern, as measured on the vertical axis, may include one or more variables that are characteristic of the behavior of the subject system. For example, a behavior pattern might include one or more of the following:

The cost of operations or maintenance of an environment or system

The effort to produce a unit of production

The time to deliver a service

The selling activity when a crisis occurs (e.g., equities)

A pandemic spreading and the demand for medicine to combat it

Access to information on a web site when an event occurs

Over time, as represented by the horizontal axis, it may be expected that the behavior pattern will change. For example, as the number of units produced by a system increases, one or more bottlenecks may develop within a production channel of the system, thereby causing an increase in the time to deliver a product (the time to deliver a product being a behavior pattern). In a relatively simple system, or in a system configured to account for dynamic interactions, the behavior pattern may be expected to change in a linear or otherwise predictable manner over time, as illustrated for example by line 1905. In contrast, systems with high dynamic complexity that are not properly configured may exhibit unpredictable behavior patterns over time, as illustrated by the lines 1910A-C. The lines 1910A-C may represent a singularity in the behavior pattern, which in turn may adversely effect the system itself. For example, as the time to deliver a product increases exponentially (as in line 1910A), the system may quickly fail to deliver all expected products, effectively shutting down the system's production channels. Alternatively, if the cost of operations (e.g., number of CPU cycles) to deliver a service increases exponentially, then the system may crash shortly thereafter. Thus, singularities in the behavior pattern of a system may be viewed generally as chaotic events having an acute or immediate and adverse effect on the system.

Defining, understanding and predicting the definition of the static complexity of a complex environment or system, by itself, may not be sufficient to enable accurate predictions to be made about its behavior because such analyses fail to account for dynamic complexity. Dynamic complexity can be accounted for by defining a "layer" of characteristics of the system, which is distinct in that it defines how the static complexity of the system changes over time. Such changes may be so fast and dynamic that they can cause behaviors that are both sudden and extreme. Static complexity alone does not allow prediction of these sudden and extreme changes or when they will happen. Dynamic complexity and how it influences actions and reactions within and around a complex environment or system is the missing link that is needed to address this problem that affects many forms of our human, business and global experiences.

Prior to analyzing dynamic complexity through simulation as described above, a system must first be deconstructed to provide a model of the system's dynamic complexity. Embodiments of the invention use a structural framework to discover, identify, emulate, predict and project both static and dynamic complexity and their effect on an environment's or system's properties and dynamics behavioral patterns.

Embodiments of the invention may employ the methods described above, particularly with reference to FIGS. 1-5, to construct a mathematical model of a system. In addition to the aforementioned methods, embodiments employ further methods, described below, to provide a further dimension of dynamic complexity to the mathematical model of the system, enabling analysis of the model as it exhibits both static and dynamic complexity as the model is emulated. Thus, embodiments employ a number of stages to deconstruct or decompose the environment or system into its parts or units and then mathematics to compute the changes in the complexity of the internal dynamic working of the environment or system and show how changes within these, even though these may be small, can cause the unexpected to happen at a specific time. Changes to the whole or parts of the system or environment can be modeled and predicted initially and then on an ongoing basis.

Static Complexity

The static complexity of an environment or system is a perception that is based upon the numbers and types of units and how these are joined together. This is a static view of a system, and may be illustrated as a diagrammatic model or, for more complex environments, a computer model. Such models suffer from two distinct limitations toward managing complexity of some of the advanced environments or system for which analysis is desired. First, the whole description may become too complex in itself to be understood without the assistance of computer-based modeling. Second, a static model is most suitable for understanding the static structure of a system, yet it is often the changes on the system over time that must be understood. Given a particular set of inputs, a model can change over time in various ways not predictable under a static model. For example, a unit might change only by a small delta but this change might cause all other units to change and when added together this is a significant change in the environment.

The rapid increase in the use of inter-connected computer systems means that the speed at which a change could be communicated increase dramatically in terms of time and global reach. Thus changes in the behavior of an environment or system and its complexity can start small and very quickly become big and dramatic. The understanding of static complexity does not address such a challenge. Dynamic complexity, in contrast, accounts for change over time to address more than a few states of static complexity. For many such inter-connected computer systems, as well as other systems and environments, there may be a time lag between the cause and the effects that we observe. Embodiments of the invention, by accounting for dynamic complexity, provide insight into the time at which such effects will occur, thereby predicting when one or more variables causes a change and when the system or environment must react to stop that change from causing a singularity or other unintended, adverse effect.

Much of traditional complexity theory has focused on the analysis and definition of static problems. Some environments start with a complex structure. Other environments become complex as more units and connections are added through aging and growth. Many financial systems, for example, have grown like this. They evolve through the addition, and sometimes the subtraction, of stringent objects.

Dynamic Complexity

As described above, restricting analysis to only the static side of complexity (also called detailed complexity) leaves the real problem of discovering, understanding and managing the changes untouched. In fact, dynamic complexity represents the real cause of many of the phenomena that environments and their systems face during their life time (degradations, diseconomy, sudden collapse, sudden changes in behavior etc). In short, it is the cause of a very significant change behavior at which point the mathematics and logic that defined them no longer applies.

Dynamic complexity arises from the interactions of the units or parts of an environment of a system over time. It can be viewed as the change of the complexity state over time. What may begin as a system having a stable and well-understood order tends towards disorder, with a resulting loss of control and predictability. Examples of such turns toward disorder include economic crises, pandemics, and the failure of a global enterprise. These changes can happen due to external events and actions (e.g., changes in workload, applied forces, macro or micro economic fluctuations or perhaps accidental occurrences). Likewise, internal changes in components may induce impact, or multiple impacts, on other components or connections as well as the overall system dynamics (e.g. bottlenecks appear, mortgages are foreclosed, blood pressure rises).

Through the application of deconstructive theory and predictive analysis, embodiments of the invention support the creation of new, efficient environments and their services, and determine how current systems may be better understood and improved. In example embodiments described below, a subject system or environment is broken down (deconstructed) into its basic units. From the information gained through deconstruction, the subject system is defined and modeled in terms of its constituent units and how they are inter-connected, and then provides for predictive analysis in one or more states.

Complexity Metrics

It would be useful to any assessment of complexity, whether static or dynamic, if there was a manner in which it could be measured as a standard metric. The base metric for such a metric is not obvious. However, complexity can be measured in relative terms as it is changed. That is, a system can be determined to be more or less complex after a change to the system.

Accordingly, embodiments can be employed to detect changes in the underlying complexity (static or dynamic) of a system or an environment that lead to changes in its behavior and that are sudden and divergent from an expected trend. Changes in behavior of a system can be categorized by relative size.

Figure 20:
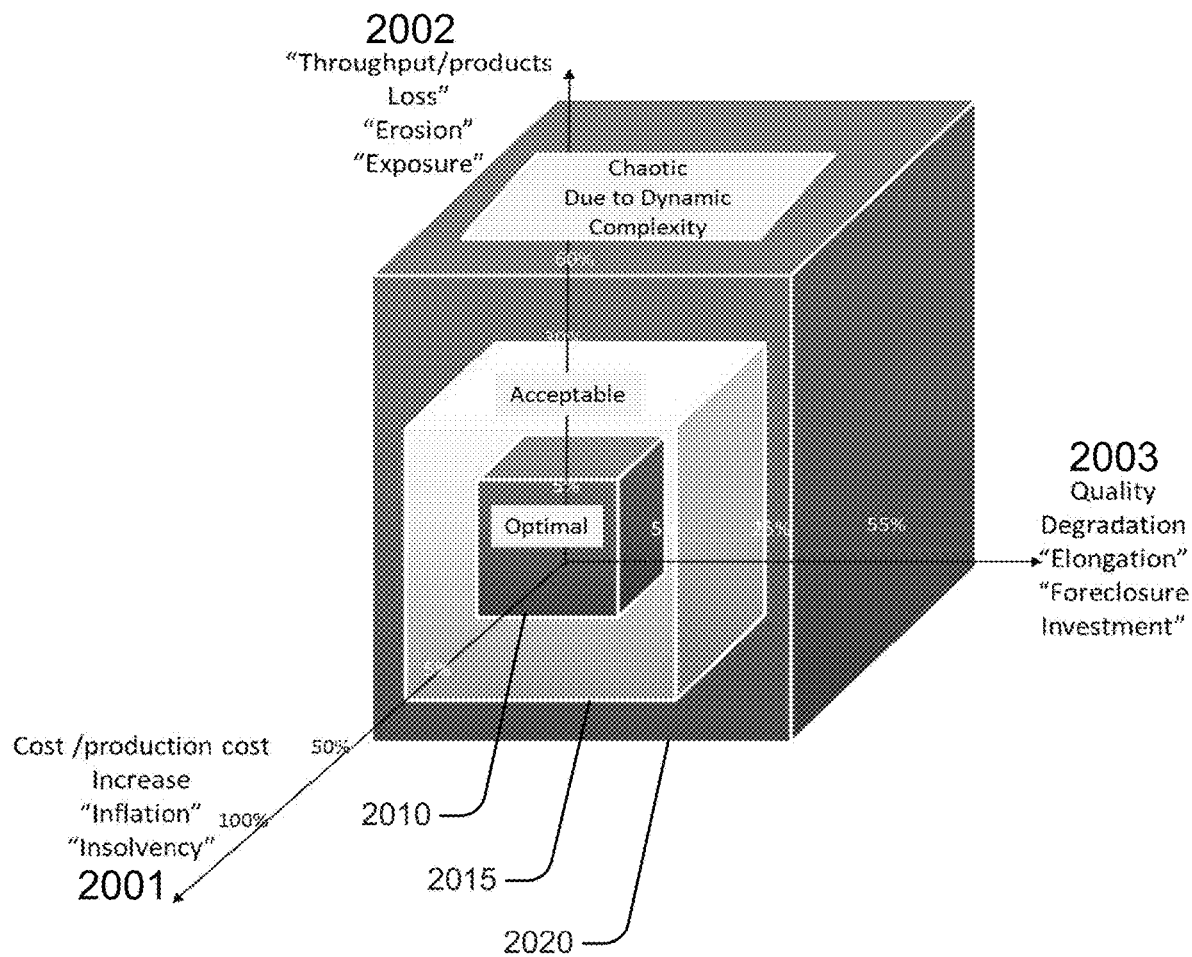
FIG. 20 a graph illustrating categorized changes in the behavior of a system, encompassing dimensions of quality of service, cost and throughput.

FIG. 20 is a graph illustrating categorized changes in the behavior of a subject system, encompassing dimensions of quality of service, cost and throughput. The graph is comparable to the graph described above with reference to FIG. 5, and is applicable to example systems encompassing financial services, business enterprises or other systems delivering services or products. Behavior of such a system is plotted in three dimensions, where cost is a first axis 2001, throughput a second axis 2002, and quality of service is a third axis 2003. In one embodiment, along the cost axis is provided a vector of resource and support consumption for a business event (particular and/or global). Along the quality of service axis required response (or time window) to deliver the business event is measured. The number of delivered business events per second is measured along the throughput axis. Similarly, cost-based pricing is enabled.

Change along each of the axis 2001-2003 is measured as a percentage relative to prior behavior or behavior patterns. Changes in behavior are divided into three possible outcomes based on this percentage. An optimal outcome 2010, having a minimal tolerance of behavior change (e.g., 5%), describes the behavior change in a system performing in a predictable manner, where the system exhibits expected behavior. Under such optimal conditions, the underlying complexity of the system is therefore changing within expected results.

An acceptable outcome 2015, having a moderate tolerance of behavior change (e.g., 25%), describes the behavior change in a system performing in a sub-optimal manner, which may indicate a new, adverse trend in the behavior of the system. Such a result may indicate a need to intervene in the configuration or design of the system in order to prevent a more severe change in behavior. Under such conditions, the underlying complexity is changing close to the limits of the expected results.

An unacceptable, or "chaotic" outcome 2020, having a large tolerance of behavior change (e.g., 50%), describes the behavior change in a system encountering a singular or other unacceptable state. Under such conditions, a singularity may be predicted because the actual behavior has quickly and severely departed from an expected behavior trend, which can be interpreted as a chaotic or out-of-control state. Under such conditions, the underlying complexity has changed, or will change, beyond the expected results. Although the outcomes 2010, 2015, 2020 are shown having thresholds forming cubic shapes, thresholds can be configured having other dimensions.

Embodiments of the invention provide for assessing how the complexity of an environment or system is changing based upon a set of axes (dimensions) which is specific to an environment or system. As a result, it can be determined how the system behavior is moving along any one of the axes (dimensions) and how the effects of complexity change are causing such movement.

In order to accommodate a given system, a Complexity Index can be defined as the summation of a set of constituents, where the constituents are chosen based on the relevant characteristics of the system to be measured.

These complexity constituents are changing as both classes of complexity change. In general, a growth in static complexity produces positive effect on both quantity and quality through inflating cost. Growth in dynamic complexity on the other hand produces generally a degradation impact on quality, quantity and cost. Below are several examples of quantifying complexity as a relative value in order to assess relative change in complexity over time.

Complexity Index I100=change (Quality×Quantity*Cost)
Complexity Index I100=Elongation×Erosion*Inflation
Complexity Index I100=Foreclosure×Exposure*Insolvency
Complexity Index I100=Fab time extension*Unfinished products×Cost ineffectiveness
Complexity Index I100=lifetime shortening*Production loss×Cost to fix
Complexity Index I100=Time to market×Inventory*Dynamic ROI Examples of the above Complexity Index can be configured for different environments such as an IT system, an economy, a manufacturing system, a bio-system, or a corporate system (enterprise).

Figure 21:
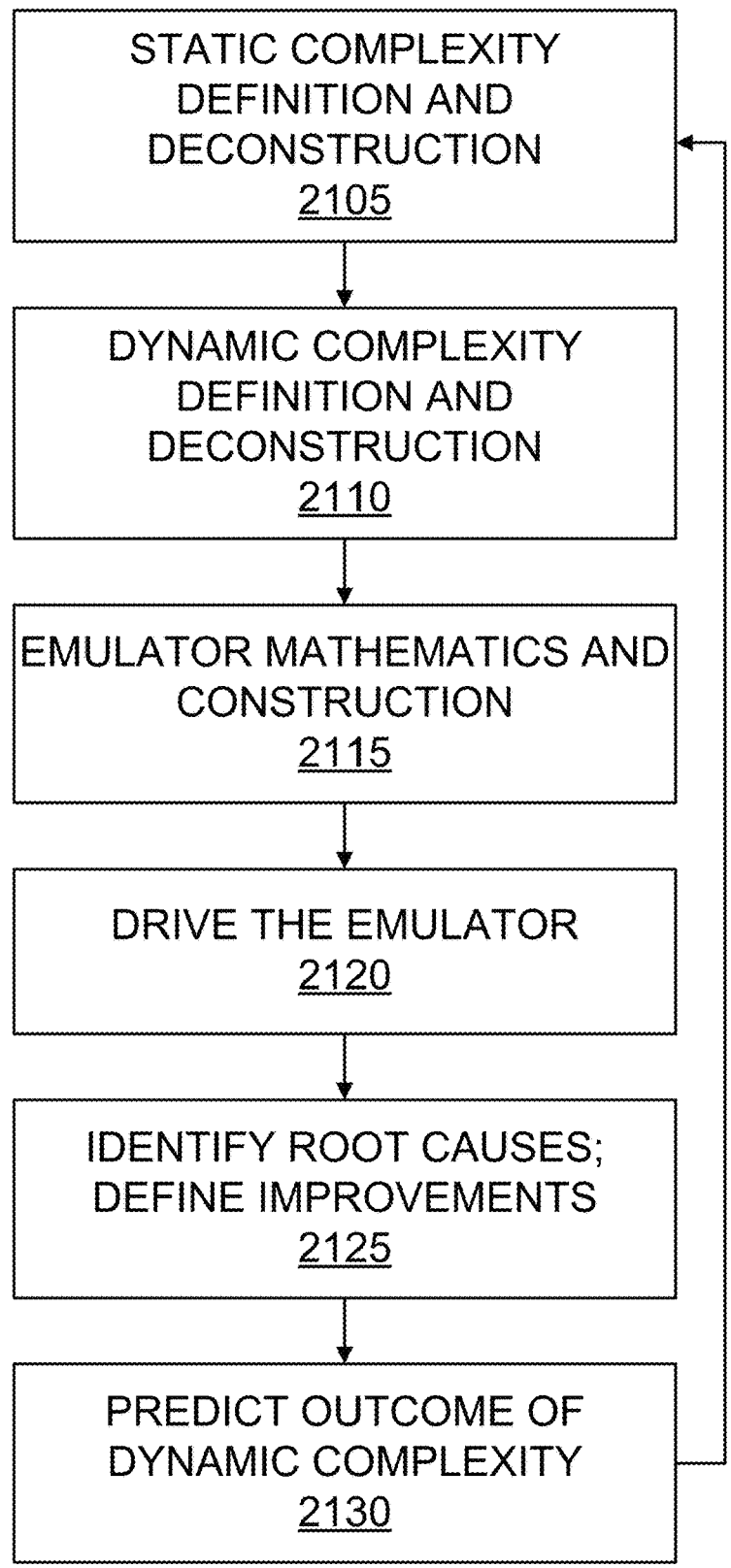
FIG. 21 is a flow diagram illustrating a process of deconstruction, emulation and analysis of a system accounting for dynamic complexity.

FIG. 21 is a flow diagram illustrating a process of deconstruction, emulation and analysis of a subject system accounting for dynamic complexity, as employed in example embodiments of the present invention. The process includes stages that are described above, in particular with reference to FIGS. 1-5, where a subject system or environment is defined in terms of static complexity (i.e., the architecture and characteristics of each component in the system), the system is modeled and emulated under varying conditions, and the results of the emulation are analyzed and quantified, providing for solutions for improving the system. The process further includes defining the subject system in terms of dynamic complexity, and those definitions are incorporated into the stages of modeling, emulation and analysis.

The stages, as shown in FIG. 21, include: 1) Definition of the static complexity base and its deconstruction (2105), 2) Definition of the dynamic complexity base and its deconstruction (2110), 3) Construction of the emulator based upon defined Mathematics and Deconstruction (2115), 4) Drive the emulator (2120), 5) Identify root causes of unexpected behavior/singularities and define improvements (2125), and 6) Predict the new behavior patterns with the dynamic complexity (as newly defined at 2110) using the emulator (2130). Each stage follows the previous stage such that the outputs of one stage become the inputs of the next stage. Each stage is described in further detail below.

Stage 1: Definition of the Static Complexity Base and its Deconstruction (2105)

As an initial stage of preparing a mathematical model of a subject system or environment, information is collected regarding each of the components of the subject system, as well as the operational connections between those components. The information to be collected is sufficient for drawing an accurate mathematical model as described above with reference to FIGS. 1-5, and an example process of such information collection can be found in U.S. Pat. No. 6,311,144 (herein incorporated by reference). Inputs of this stage (2105) include information regarding the construct of the environment or system that are its static definition, including functional definitions (how each component operates and interacts with other components) and physical and technology definitions (capabilities, limitations, and compatibility requirements of each component). The output of this stage (2105) is a definition of the static complexity base of the subject environment or system.

In order to achieve an accurate static deconstruction of the subject system, the following actions may be taken:

1. Discover and identify the units or parts that make-up the environment or system. The granularity of this identification will vary with degree of precision that is needed to make the predictions at a later stage.
2. Discover and identify how these units are interconnected
3. Discover and identify what flows along these connections.
4. Identify constraints and bottlenecks that are important characteristics of any parts, units, and connections. Such constraints might include:
    a. the finite capacity of a part, unit or connection
    b. a known bottleneck at a particular point in the environment or system
    c. cost and cost thresholds Stage 2: Definition of the Dynamic Complexity Base and its Deconstruction (2110)

In order to characterize a model of the system beyond its static description, additional information about the subject system and its components is collected and incorporated into the model as a definition of the dynamic complexity of the system. Inputs of this stage include the static complexity definition produced in stage (2105), as well as information regarding how the static complexity changes over time. This information can be obtained through analysis of historical trends of the same or comparable systems, sub-systems and components, as well as observed dynamic signatures and pattern (i.e., how the behavior of a component or group of components changes over time in response to one or more inputs). The output of this stage (2110) is a definition of the dynamic complexity base model of the subject environment or system. In order to achieve an accurate dynamic deconstruction of a system, the following actions may be taken:

1. Discover and identify how each part or unit might change within the static complexity definition, which in turn indicates dynamic complexity. This could involve changes in the parts or units themselves, such as:

a. growing through extra workload or tasks that they have to perform
    b. aging through constant maintenance
    c. growing in numbers because there are splits or fragmentations of the original parts or units.

2. Discover and identify how the connections within the static complexity base model have changed. These changes might be:

a. growing increased numbers of connections some of which are new types
    b. increased flows across existing connections
    c. time schedules that have to be met Stage 3: Construction of an Emulator based upon defined Mathematics Deconstruction (2115)

Given the static and dynamic definitions of the subject system (2105, 2110), a mathematical model of the subject system or environments is then constructed for emulation (2115). The mathematical model may be constructed as described above with reference to FIGS. 1-5, and as described in U.S. Pat. No. 6,311,144 (herein incorporated by reference). Inputs of this stage include the dynamic complexity definition produced in stage (2110), defined mathematical techniques for emulation of the model, and computer programming techniques for production of the model. Outputs of this stage (2115) include the emulator that can be used to establish the dynamic complexity and the resulting behavior patterns of the defined environment or system.

The mathematics of the emulator may include the following definitions:

U.S. Pat. No. 7,389,211 establishes the basis for a mathematical predictive solution that analytically predict system performance in general terms). According to one embodiment such solution can be conceptually expressed in the form:

$$X = X_0 + \Sigma_M^{(d)} X_M + \Sigma_N^{(s)} X_N \quad (1)$$

Where $X_0$ is the initial value of a metric domain (e.g. complexity impact on performance, cost, capacity etc.)

$X_N$ is calculated direct impact due to N causes of static complexity (number of connections, number of interfaces, number of links, number of sites, distances, etc.)

$X_M$ is calculated direct impact due to M causes of dynamic complexity (interaction that impact components effectiveness, feedback that require higher throughput, interference that impact liquidity, pandemic that impact health, aging that impact longevity etc.)

Convolution theorem allows a solution of a combined mathematical expression of two function-domains:

$$X = \frac{\delta X}{\delta \sigma}$$

and $$\sigma' = \frac{d\sigma}{dt}$$

with the combined solution using Laplace Transform $\mathcal{L}$:

$$\text{Complexity Function } h(\sigma) = \mathcal{L}(h) = \int X(\tau) \cdot \sigma(t-\tau) d\tau \quad (2)$$

Let us denote the vector $\sigma = \sigma(k)$ that represent the set of metrics that define a domain The system of equations that represents the variations is:

$$\frac{d\sigma}{dt} = X^{(d)}(\sigma^{(d)}) + X^{(s)}(\sigma^{(s)}) \quad (3)$$

From (1) and (2) the impact of complexity on the domain metrics and using Laplace transform, is:

$$\frac{d\sigma}{dt} = \sum_k^{(d)} \frac{dX_d}{d\sigma_s}(\sigma'^{(d)}, \sigma''^{(d)}) + \sum_k^{(s)} \frac{dX_s}{d\sigma_k}(\sigma'^{(s)}, \sigma''^{(s)}) \quad (4)$$

d and s denote the 2 types of complexities and, $$\frac{dX_d}{d\sigma_s} \text{ and } \frac{dX_s}{d\sigma_k}$$

are computed by the method proposed in NA(3) where ($\sigma'^{(d)}$, $\sigma''^{(d)}$) and (($\sigma'^{(s)}$, $o''^{(S)}$) are representing σ through different coordinates and $\sigma^{i,s \text{ or } d}$ represent the complexity (i order) derivative, expressed in exponential form $$\sigma'^{(u)} = \Sigma_k^{(t)} \Sigma_n^{(i)} C_{n,g} \exp^{z^i} \quad (5)$$

where z is a complex variable that represent the two complexities
$z = \sigma^{(s)} + i\sigma^{(d)}$ where $i = \sqrt{-1}$, $\sigma^{(s)}$) and $\sigma^{(d)}$) the static and dynamic complexity respectively The set of equations 3,4 and 5 allow the computation of all domain metrics as a function of varying the two portions of complexity representation.

We propose an aggregative concept, let us call it Complexial that represents the aggregated impact produced in each domain $X_0$ of the vector $X_0$ where $X_0(1)$ is performance, $X_0(2)$ denotes cost, $X_0(3)$ means quality of service and $X_0(4)$ represents availability etc.

From the above:
Complexial=$\xi = n_n(X_0(n) + X(n) + X^+(n) + \ldots)$ where X are the complexity contribution of higher order perturbations (direct and indirect) of domain metrics n.

Stage 4 Drive the Emulator (2120)

Once the mathematical model of the subject system or environment has been defined, the model is then emulated. The mathematical model may be constructed as described above with reference to FIGS. 4-18, and as described in U.S. Pat. No. 6,311,144 (herein incorporated by reference). Inputs of this stage (2120) include the mathematical model (emulator) from the previous stage (2115), as well as one or more sets of operational scenarios that will be the actions that drive the emulation of the subject environment or system. Outputs of this stage (2120) include a set of reactions of the emulated system that shows its behavior under a set of varying scenarios and how its complexity changes, as well as conditions and points in time when the behavior of the environment or system becomes singular or encounters another adverse or unacceptable outcome.

The outputs of this stage (2120) allow for discovery and identity of when the behavior of the emulated environment or system becomes 'unexpected' due to a sudden change. This may comprise running a number of starting positions and controlling the emulator to run for a number of different time lines under different initial conditions.

In short, to establish a "system limit" due to complexity, two results in particular are identified. First, the system limit due to static complexity (the "ceiling") is what may be deemed to be the predictable limit that we understand from simple extrapolations, statistical trending and actual experiences. The "ceiling" is what is normally understood as the operational limits of a system. Second, the system limit due to dynamic complexity (a singularity), which is unpredictable by conventional methods (e.g. statistical trending) is identified. A singularity may occur at any point in time, predictable and governable through the present invention's mathematical methods that emulate interactions, feedback and interferences.

Stage 5: Identify Root Causes of Unexpected Behavior/Singularities and Define Improvements (2125)

Once the mathematical model has been emulated through one or more test scenarios as described above, the results of the emulation can be analyzed to identify the root causes of the various detected results, including adverse effects (e.g., a singularity), and changes to the system to avoid such adverse effects. Inputs at this stage (2125) include the calculated results of emulation from the previous stage (2120), as well as measurements and observations of the actual system to condition and verify the outputs of the previous stage (2120). Outputs of this stage (2125) include improvement directions, which are suggested changes or improvements to the system. Such improvement directions can include utilization scenarios, technology improvements, cost justifications, and immediate actions that can be taken to modify the system. Outputs also include re-engineering directions, which may include long-term transformations, technology improvements, and cost justifications (e.g., re-prioritization of operations).

Operations at this stage (2125) include various methods of analyzing the emulation results, including discovering aging, discovering architecture drawbacks, detecting implementation defects, determining technology limitations, and building and computing further scenarios for emulation. Further, the results of the previous stage (2120) may be quantified and qualified in a number of ways, including assessing the result for each scenario; combining scenarios to build improvement plans; classifying the actions constituting the emulation in terms of resources, implementation, architecture, algorithmic, and processes; evaluating cost versus gain (e.g., QoS, Throughput, availability etc.), and defining the plan (e.g., steps, monitoring execution, effort etc.). A method of determining whether an adverse effect has occurred is described below with reference to FIG. 23. Further, one method of diagnosing an emulated system to determine the cause of adverse effects is described below with reference to FIG. 24.

Stage 6 Predict the New Behavior Patterns with the New Dynamic Complexity using the Emulator (2130)

In response to recommended changes to the system provided in the previous stage (2125), those changes are incorporated into a revised model of the system, and the revised model may be emulated to determine the specific benefits incurred by those changes. Inputs of this stage (2130) include the ouputs of the previous stage (2125), as well as defined improvement scenarios. Such improvement scenarios may include changes to the system intended to remove bottlenecks, increase productivity, reduce cost and increase effectiveness, expand more for less cost, and increase scalability. Such improvements may be suggested as a result of a process as described above with reference to FIGS. 6 and 8-12. In particular, the outputs of this stage (2130), following emulation of the system incorporating the suggested revisions, may include an improvement plan specifying improved utilization scenarios, technology improvements, cost justifications, and superior sequences of actions. Outputs may also include a re-engineering plan, long term transformation, and recommended improvements to technology.

Operations at this stage (2130) include use of the reference predictive emulator to compute the improvement scenarios and define the plan. Further, the emulator may driven to provide ongoing monitoring of complexity (e.g., over long-term simulated scenarios) to identify degradation due to increase in complexity, determining the impact of such degradation, define actions to address the degradation, and determine the frequency of complexity monitoring and analysis (e.g., continuous, daily, weekly).

Stage 7 Dynamic Complexity under Control

As a result of the previous stages, once implemented to identify and take preventive action against adverse events resulting from dynamic complexity within an emulated system, the dynamic complexity of the system can be deemed to be controlled and predictable within an acceptable tolerance. Thus, the results, and particularly the proposed changes to the system, can be exported from the model as recommendations to modify and improve the real-world system corresponding to the model.

Inputs of this stage include the outputs, knowledge and experiences of all previous stages, a change management plan, and information on the identified problems and challenges underlying the system.

The outputs and ongoing states of this stage include a proposal regarding reporting structure, destination, frequencies, and content; the operations of a control function to implement the plan; and ongoing maturity improvements.

Figure 22:
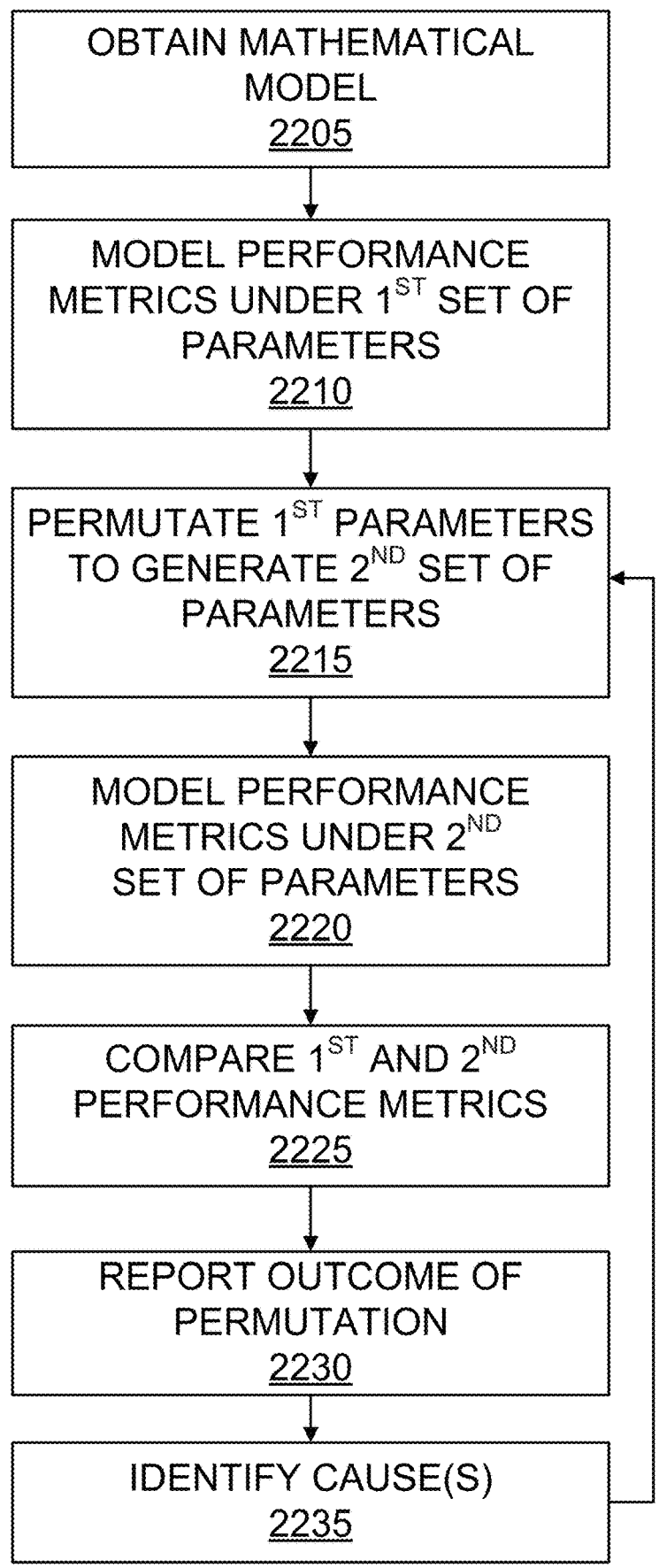
FIG. 22 is a flow diagram illustrating a process of emulating a system under varying parameters accounting for dynamic complexity.

FIG. 22 is a flow diagram illustrating a process of emulating a system under varying parameters accounting for dynamic complexity. This process may be incorporated into the process described above with reference to FIG. 21, and in particular expands upon the aforementioned steps of driving an emulator (2120) and identifying root causes and defining improvements (2125).

Initially, a mathematical model is obtained for emulation (2205). The mathematical model may be constructed according to the process described above with reference to FIG. 21 (i.e., steps 2105-2115), and so may incorporate definitions of both static and dynamic complexity. In order to drive emulation of the model, a first set of parameters (operating conditions) are defined. The first set of parameters may be defined, as described above with reference to FIGS. 3a-b, 6, 8 and 9, to simulate the model as it operates through a given workload (or other set of inputs) over time. With the first set of parameters defined, the model is then simulated under the first set of parameters to generate a corresponding first set of performance metrics (2210). The first set of performance metrics may be quantified in a manner as described above with reference to FIGS. 5, 6, 10 and 20. The first set of performance metrics may also include a dimension of time (referred to, for example, as time "T1"), indicating that the results correspond to the first set of input parameters upon simulation for a given length of (simulated) time.

Embodiments of the invention, as described above, provide for emulating a model system through a number of differing scenarios, where the results of such emulations can be analyzed to identify problems and potential solutions for the system. One method of this emulation is to permutate a set of input parameters, by altering one or more values, to generate one or more additional scenarios for emulation. Such selection of differing parameters is described above with reference to FIGS. 3a-b, 6, 8 and 9. When selecting input parameters to detect an adverse effect resulting from a system's dynamic complexity, a number of variables can be selected for permutation. For example, input parameters can be permutated to simulate the failure of a component of the system architecture, a delay of an operation, a change in a sequence of operations, or an alternative mode of operation. Further, the length of time over which the model system is emulated may be varied. Such variation in time may be employed, with or without other permutations, to determine whether the input parameters result in an adverse event (e.g., a singularity) over a different (e.g., longer) length of time. With one or more variables selected, the first parameters are permutated to generate a second set of parameters (2215), and the model is again simulated to generate a corresponding second set of performance metrics (2220).

Following obtaining the results of the first and second performance metrics, those metrics may be compared (2230) and reported to a user (2230) to determine the effect of the different input parameters on the performance of the system. The performance metrics can be analyzed further, as described below with reference to FIG. 24, to identify the cause or causes of the modeled results (2235). The steps of permutation, simulation and analysis (2215-2235) may be repeated to determine performance and identify adverse events under a range of scenarios corresponding to different input parameters.

Figure 23:
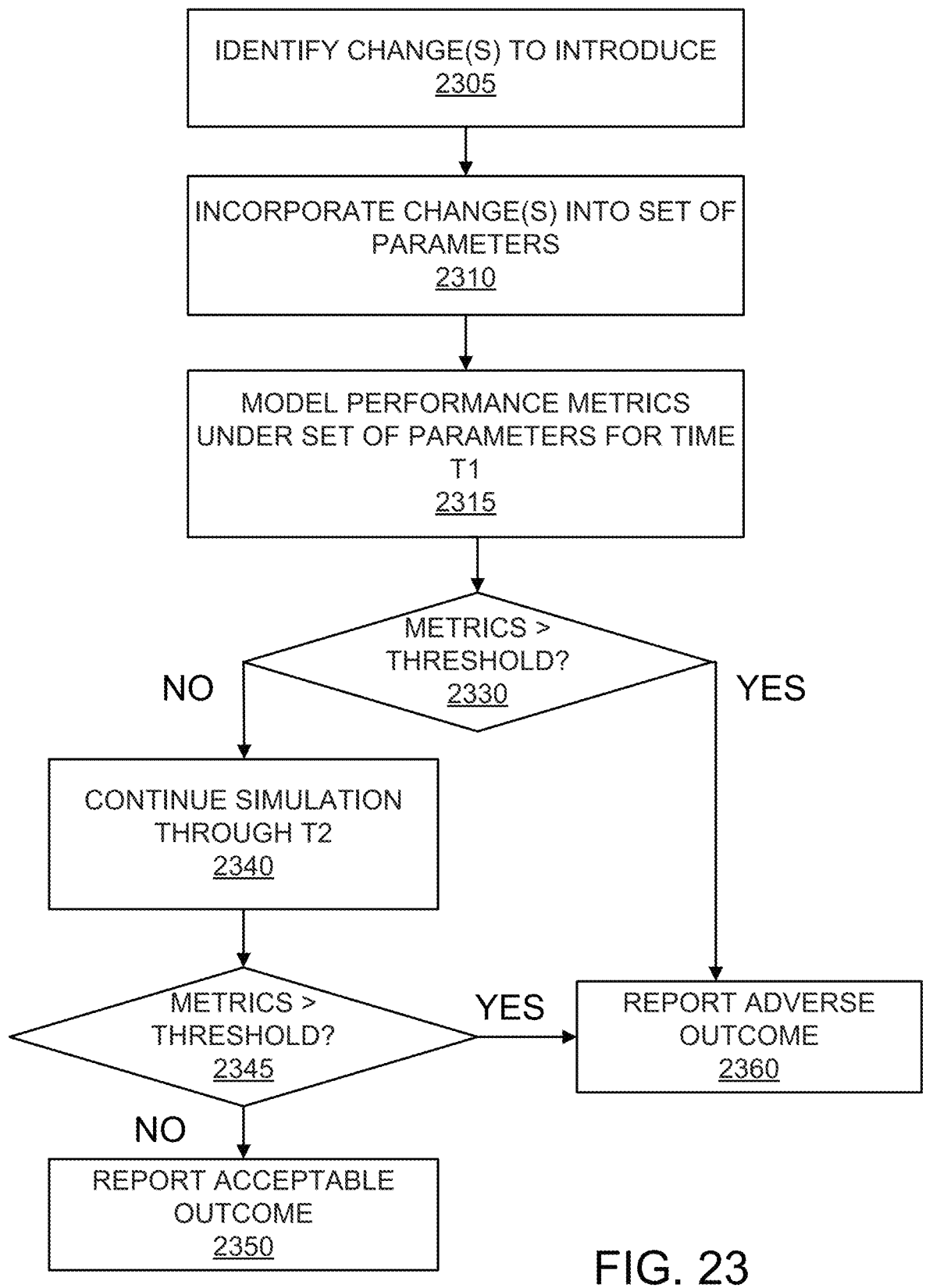
FIG. 23 is a flow diagram illustrating a process for determining whether an adverse event has occurred.

FIG. 23 is a flow diagram illustrating a process for determining whether an adverse event has occurred. The process may augment the process of emulating a model system under different parameters as described above with reference to FIG. 22, whereby performance metrics are generated and compared against performance thresholds as the model system is emulated over varying lengths of time.

At an initial stage, changes to a set of input parameters are identified (2305) and incorporated into a new set of parameters (2310) for emulation. These steps may correspond to step 2215 described above with reference to FIG. 22. Further, a time dimension T1 is selected as a simulated time over which to emulate the model system. The model system is then emulated under the new set of parameters over time T1 to obtain performance metrics for time T1 (2315). The resulting performance metrics may then be quantified and compared against one or more thresholds (2330). For example, performance metrics may be quantified in terms of cost, throughput and quality, and then plotted on a chart as shown for example in FIG. 5. The plotted metrics may then be compared against one or more thresholds corresponding to the relative change in system performance, as shown for example in FIG. 20, to determine whether the change in behavior of the model system has exceeded an acceptable threshold. If so, then an adverse outcome (e.g., a singularity or less-severe event) is reported (2360). If not, then the simulation may be continued through to a further time T2 (2340).

Due to the dynamic complexity of a system, an adverse event may only develop after an extended length of operating time, and may develop despite the failure to predict such an adverse event over a shorter length of simulated time. Thus, by extending the simulation through time T2, a model system can be tested more thoroughly to determine whether adverse outcomes result over greater lengths of time. If the resulting performance metrics after time T2 exceed an acceptable threshold (2345), then an adverse outcome is reported (2360). Otherwise, an acceptable outcome can be reported (2350), indicating that the model system performs in a controlled, predictable manner under the given set of input parameters.

Figure 24:
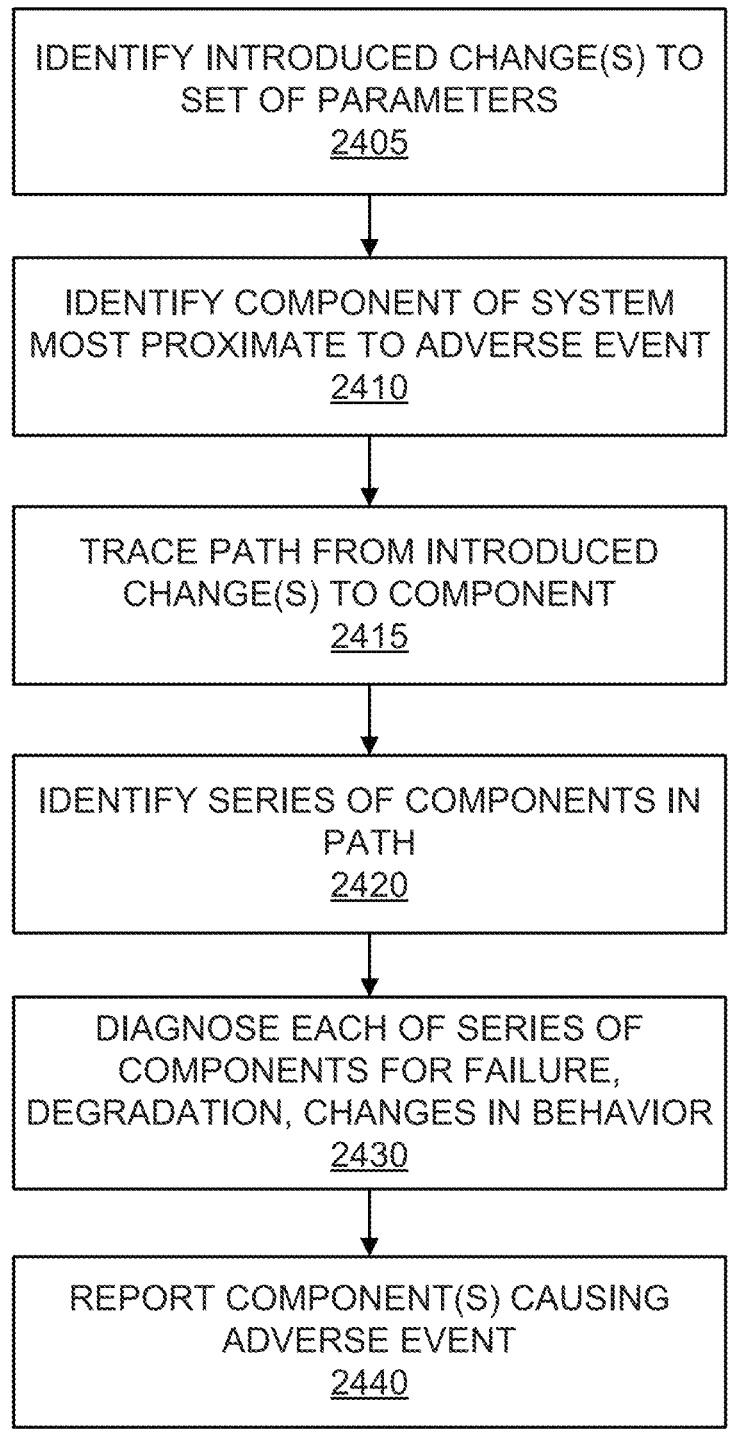
FIG. 24 is a flow diagram illustrating a process for diagnosing a system following detection of an adverse event.

FIG. 24 is a flow diagram illustrating a process for diagnosing a system following detection of an adverse event. The process may be implemented to analyze the results obtained from the processes described above with reference to FIGS. 21-23. Given at least two different sets of performance metrics generated by corresponding sets of input parameters, the differences between the input parameter sets are identified as the "changes" introduced into the model system (2405). Those changes may be viewed as the initial (but not necessarily proximate) cause of an adverse event in the performance metrics. For example, those changes may include simulating the failure of a component of the system architecture, a delay of an operation, a change in a sequence of operations, or an alternative mode of operation.

Next, a component is identified that is most proximate to the adverse event (2410). For example, a model system may include a computer server that exhibits a sudden spike in cost (in CPU cycles) to provide a given service, which in turn causes an unacceptable change in production cost for the system as a whole. Once the initial and proximate causes are identified, a path may then be traced between them (2415), where the path encompasses all operations and activities connecting the initial causes to the proximate causes. From this path, a series of components can be identified in the path, each of which can be considered to have contributed to the operations leading to the adverse event (2420). Each of these components can then be evaluated individually for failures, degradation, and other changes in behavior that may have contributed to the adverse event (2430). For example, it may be determined that a computer workstation, in response to the initial causes in combination with degradation over time, exhibited a crash, which in turn contributed to the adverse event further down the stream of operations. In addition, recognizing that other components (outside of this path) may also contribute to an adverse event, those other components may be evaluated in the same manner. With the components contributing to the adverse event identified, those components, as well as the specific problems inherent in each, may be reported for further analysis and remedial measures (2440).

Example Application: Supply Chain

Embodiments of the present invention may be applied to model, emulate, diagnose and improve systems implementing a supply chain, such as a business producing and providing a product or service to a customer. Dynamics of a supply chain include:
1. Dynamic Complexity of an logistics network including both production and transportation
2. Operational Risk Index of a Logistics Network
3. Measurement and Benchmarking of the Dynamic Complexity of a vertical Supply Chain
4. Measurement and Benchmarking of the Operational Risk Index of a vertical Supply Chain
5. Measurement and Benchmarking of the Dynamic Complexity of a shared logistics service
6. Measurement and Benchmarking of the Operational Risk Index of a shared logistics service This analysis supports the requirement of both the customers (vertical supply chain) and the operators of the shared logisitics networks. Customers need to be able to measure and manage the operational risk of their supply chain, which will typically include suppliers and transportation, with mixes of production and transport that vary from industry to industry and company to company.

At the same time these customers are often share these supplier and logistics vendors. These vendors in turn have both operational and reputational risk in meeting the aggregate workload.

This interdependence is further complicated because wide dispersion of the time dependency of decisions. In some industries strategic sourcing decisions have to be made year's in advance of the final sale. Similarly transportation decisions: routes, committed volumes, contract prices are determined on a longer time frame than the dynamic variability in the available capacity. Well know examples would include the bulk freight capacity. In commodity booms shortages appear and prices rise, this in turn triggers shipbuilding of new and larger ships, which usually arrive as the boom ends driving rates down These dynamics have been studied extensively in System Dynamics models, but these are largely descriptive and cannot be integrated into a complete management model.

Logisitcs networks are also subject to sudden restrictions in capacity. For example:
   A volcano in Iceland shuts down all transatlantic air cargo movements
   An explosion at a petrol storage facility in the south of England disrupts supplies to gas stations and airports
   Strike in France shut down refining capacity causing tankers to be unable to offload their cargo and therefore will not be able to make their next scheduled pick up on time.
   An incident at a key component supplier affects causes changes to production schedules across an industry.

A typical management paradigm will assign tasks and processes to strategic, tactical and operational layers. As organizations have implemented lean processes dynamic complexity in the operational layer has become more obvious and the effects more disruptive. In a lean process inventory is no longer available when supply is interrupted. Also, dynamic complexity cannot be isolated to the operational layer. Processes in the tactical and strategic layers need measurements and benchmarks of complexity and risk to understand trade offs in netwoerk and sourcing topologies The Dynamic Complexity Efficiency (DCE) and the Operational Risk Index could be used to monitor and manage a Supply Chain—to continuously determine when limitations are exceeded and alert management to excessive risk.

DCE Analysis for a Supply Chain—an Example of an Operational Network

Embodiments of the invention may be applied to the operational and IT elements of Dynamic Complexity across Supply Chains and Supply Chain Topologies—detailing the attributes—functional and non-functional that combine together to determine a supply chains Dynamic Complexity Efficiency (DCE)—which is detailed within this invention.

Supply Chains are complex system with emergent behaviour built from many components often owned or controlled by different entities, yet which in combination need to deliver a defined level of service. Typical components include:
   Physical transformation: including extraction, and process and batch manufacturing
   Logistics: transportation and storage, packaging and fulfilment.
   Documentation: All manner of commercial paperwork that needs to be created and controlled.
   Batch and Lot control
   Tests and Certifications
   Movements, e.g airway bills Customs and Legal Financial: Trading and settlement systems, Insurance and payment All such components are underpinned by IT systems. In corporate systems these fall, largely within the categories of ERP and Supply Chain and encompass both the tracking of units of work across multiple entities and directing and scheduling work. —who, what, when, where, how.

All such components have a number of "service" attributes in common:

Throughput or Capacity: measured as number of transactions, movements etc.

Cost: this can be defined as financial or a measure of value, within the context of this invention—it is the measure of the resources consumed (or reserved) of the supply route for a component or product Quality: this can be also defined as operational efficiency—where a component might not operate or meet the target operable limits, this can be in the form of specification quality, or conformance quality of the service Continuity (or Reliability): the degree or ratio of time that the component is specified as operable and committable. state to deliver the required service. Example for a or a logistics service with a daily pick up this would be the number of days pick up was made versus days there was no pick up.

Response time (or transit time): this is defined as the actual time a component takes to deliver, it can be compared with service time—which defined as the minimal time a component can deliver if there are no queues. This can be defined for production, links and shipments.

Operational Efficiency: this details the effectiveness and efficiency of the Supply Chain supporting the end to end service, being a measure of the people, process and tools deployed to compare the delivered service against the optimal usage.

Sustainability: measures of consumption of non renewable (including carbon footprints and clean water consumption) and constrained resources Also represents the degree to which cost of service is influenced by changes in input prices.

Security: includes questions of physical security (probability of loss through theft, accident, or mishandling) and confidentiality (ability to retain control of commercial information).

Coding Efficiency: a measure of brown field development code re-use and language.

These attributes are expanded within this invention to a number of ratios/percentages for each of the Service Attributes:

Throughput Index (TI)=Actual Throughput/Maximum Throughput

Cost Efficiency (CE)=Cost of Service Path/Cost of Optimal Service Path

Quality Index (QI)=Perceived Quality/Expected Quality (how is this measured)

Service Continuity (SC) equivalent to Availability and Recovery of service=Operable Time/Required Operable Time Response Time Index (RTI)=Response time/Service time Operational Efficiency (OE)=(Number of People/Standard for Application environment)×effectiveness of tools (%) and efficiency of process (%)

Sustainability (SU)=PUE of the (Data Centre+Network+Application-+Operating System)

Security Efficiency (SE)=measure of the security established to protect the Service is f (firewall, password, encryption, network)

Coding Efficiency=(New development/Brownfield Development)×Language Quotient

Language Quotient=f (language) (e.g., example machine code and Java will have different LQs)

For most applications of DCE in Supply Chain we would expect $w_{lq} \approx 0$ as capacity is dominated by logistics and the time frame is hours to weeks. This would not be true for data consolidators whose function is to collect, filter, aggregate and transform transaction records where the measurement period can be minutes or seconds.

The Operational Risk Index of a Service does consider all of the element including the CE for example one could develop a highly resilient service, with full redundancy, if the cost element was not considered then this option would always be taken, and for practical purposes, while the overall risk of a service is reduced; this is not realistic. The Operational Risk Index of a Service therefore=(1−DCE)=the service having a DCE≈1 means that the OR Index of Service is low.

Industry and Company DCE

Industry DCE is defined using standard weights and provides a benchmark number for processes all falling in a single class.

Where a company in that industry sets the weights on the DCE away from thr industry standards they create a set of shadow components that measure the unobserved inefficiency. Thus if a company underweights cost and overweights quality compared to the industry DCE their DCEgradient is less sensitive to cost changes. The deviation of the two Gradients represents the degree to which the company is ignoring cost signals in its goal setting.

Embodiments of the invention may be applied across industry and to develop an environment that reviews the end to end service and provides a measure to report the DCE against the benchmark standards.

In summary, the Dynamic Complexity and the associated Efficiency index of a service is determined by a number of metrics. Through assessment of these metrics (from input from a user/client) the DCE index can be meaningfully measured. The optimal DCE and ORI of a service can be determined through extensions to the emulator algorithm and engine. These measurement can be used by providers and users of supply chains to determine the overall risk of a service or logistics strategy (the Operational Risk Index). Embodiments further provide for monitoring and reporting on the Operational Risk Index through a system of benchmarking. The DCE and ORI can be used to determine how minor or major changes will affect the service:

Extend emulation to consider all the attributes of the DCE and ORI

Determine the inter relationship of the attributes (for example TI and SC)

Determine the relative importance of the attributes for an industry and a set of users Develop standards for industry and a set of users Develop input format that records the key attributes from a clients environment Develop standard output format, that displays the results Develop the interpretation that highlights changes to improve the efficiency and reduce the risk of the service An advantage conferred by embodiments of the invention is to provide a measure of the DCE and ORI for clients that can be used for reporting.

Thus, embodiments of the invention extend emulation of a mathematical model of a system as follows:
1. Use the Cost, Quality and Throughput metrics
2. Utilize modeling aspects, while extending to service continuity. Therefore, include recovery paths and redundancy (associated time to recover) and action/activity required to regain production throughput
3. Extend the power consumption model to include the end to end view of sustainability
4. Develop a method of input to cover the attributes of Operational Efficiency and Security Efficiency
5. Expose the emulation capability to include endogenous and exogenous price changes
6. Extend the utilization model to distinguish between committed and uncommitted usage at each point in time.
7. Determine how the emulation algorithms and engine needs to adjust to develop the optimal path across all attributes
8. Determine how the emulation algorithms and engine are changed to prioritize attributes—as each attribute will have a different impact on DCE.
9. Determine the optimal model of DCE—for each industry and client situation, as applicable to a corporate supply chain and logistics company operations.
10. Develop continuous computation—a sequence of batches—to emulate a continuous flow of events though as supply chain as a single trajectory Example Application: Postal Service Postal services face major challenges to find an optimal equation between quantity, quality and cost. La Poste and its partner Accretive Technologies propose an innovative technology to deal with such challenge on daily as well as predictive basis. This invention represent, reproduce and predict the impact of dynamic complexity produced by the dependencies produced by the dynamic sequencing of services, feedback processes produced through outstanding events and combinatorial structures originated by machines, operators, distances, logistics, service and logistics constraints and transport configurations. Its uniqueness is based on a foundation of layered analytical, mathematical predictive technology that allows surveillance, risk management and scenario evaluation for short, medium and long terms. It is also indispensable for the predictive identification of service quality and cost under different scenarios of locations of mail/parcel sorting centers, number of machines, windows of processing and human role and maintenance regime and support. The predictive capability will represent explicitly and mathematically compute the cost, service quality and chronograms for all classes of mail, processed and exchanged, transported and distributed for a whole country, region or area. It provides a holistic view of service which allows a close surveillance of the delivery, globally as well as at the micro levels.

Introduction

For a number of years there was a common believe that the growth in complexity (due to involved number of constituents, interfaces and connections) is the main cause of eventual or observed efficiency degradation. Such category of complexity is called detail complexity that generally managed through spreadsheets (of whatever complexity). While such complexity seems natural evolution for resource planning; it does not explain by itself the majority and most frequent observed operational phenomena such as a temporal volatility in quality of service, sudden singularities, steep cost ineffectiveness or a domino consequential degradation.

We are interested here by the impact of the other category of complexity, namely dynamic complexity. Dynamic complexity is the time-dependent dynamics that emerge during service delivery and are produced by the aggregated dependencies of dynamic behaviors: between processes dynamics, physical components performance, human/machine interactions and resulting limits and constraints. Dynamic complexity manifests itself in the generation of time sensitive stock of mail and the speed of service processing to timely absorb such stock. While changes to a system's detailed complexity (number of components, interfaces, connections etc.) may solve resource scarcity and sometimes localized events; its effect on dynamic complexity could be disastrous as new components comes with additional dynamics that generate consequential alteration in system behavior and cost of operations.

Proposed Invention

What we propose here is an innovative discipline that does not only deal with dynamic complexity, but also expresses it mathematically in order to predict its impact on efficiency under different scenarios of mail/parcel volumes, components dynamics, organizational dynamics and structural dependencies. By efficiency we intend to cover and solve indeed the equation of dynamic complexity that expresses its simultaneous impact on: the quantity, the quality and the cost in time.

Dynamic complexity emerges through the continuous adaptive process in enterprise life-time that alters the systemic dynamics resulting from changes in structures, architecture, and technology, degrades its implementation, ages its performance and puts operations at risk by eventually hitting a service limit. An adaptive process may happen at any point in time and at any layer in the service stack; dictated by change in business, produced according to tougher service constraints, as a result of changes in logic, technology or operations conditions, Dynamic complexity is expressed as an equation that relates the quantity produced to a specific quality of service and at a predictable cost. Dynamic complexity is generated through the dynamics of dependencies and the combinatorial interactions between service constituents that involve multiple feedback processes.

A pioneering application of such approach is implemented at the French La Poste (Mail Service Emulator). We used an analytical mathematical emulation of the full end-to-end service to manage, plan and anticipate potential problems that may affect the right time delivery, the temporal changes in volumes and the cost of service covering: processes, technology, humans, logistics and organizations. We deliver robust diagnostic and analytical findings, to predict limits, to propose transformation actions, and to evaluate the outcome with the necessary: accuracy, representativeness and reproducibility. Since April 2010 such predictive/preventive emulator became the decision support of different strategic scenarios of changes (for next years). In addition the emulator is used to explore the causes of the eventual deviation between actual and predicted quality and cost and find out the proper remedial action susceptible to solve a problem or eliminate/fix an impact and a cause.

Postal Services Challenges and Proposed Predictive Technology Roadmap

The Internet revolution and the explosion of multimedia heavy public consumption provoked a new paradigm in human activity connectivity both in terms of nature, speed and coverage. Consequentially, the economic equation that governs the traditional mail and associated services suffers a severe distress. Both cost effectiveness and volumes are in decline for an industry recognized for more than a century as indispensible part of the social and economic fabric. On the other side solutions that rely on cost rationalization and wise economic deployment of involved resources are limited anyway. Moreover, the forthcoming deregulation will certainly produce another host of fierce competition on even smaller and more crowded space.

A candid observation of the postal service operations and in general a well-established industry, is the widespread culture of fixing problems (Circumstantial or operational) and the continuous handling of exceptions rather than anticipating on their occurrence and their right time resolving. Major consequential problems appear therefore causing substantial difficulties in terms of readiness and flexibility to change, agility to adapt and the large absorption of resources in ancillary activities.

Only simplification, new products, services and innovation will be able to stop the apparent decline and regenerate a renewal role of postal services, which certainly will be able to lead to wider role in the social and economic connectivity aligned to the evolution of the society.

It appears clearly that new tools and solutions are required to facilitate such transformation. They become indispensible technologies for both strategic planning and operational control that should allow better anticipation through finding the optimal compromise between volume, service quality and cost for both investment and operations that correspond to a particular scenario of change. This invention addresses precisely such requirement. It computes the overall cost as well as the cost contribution for each component, process or object involved in a scenario of change based on its utilization. It also computes the change in quality that corresponds to a particular increase (or decrease) in volume for a fixed cost. The resulting emulator delivers therefore the necessary evaluation and computes the outcome of a new business solution or service in terms of volume (revenue), cost (ROI, TCO and ops) for particular quality constraints (end-to-end chronogram). It also mathematically computes analytical metrics (AM's) that represent the impacts of the new solution/service on the existing ones (in terms of gain/loss in efficiency, cost, effectiveness, volume per time window and availability, etc.).

Another dimension of the capabilities of the emulator is its ability to define the cost-based pricing for a new service/ solution and build the curve of price evolution as a function of solution maturation and market reception drawing an additional advantage for stakeholders to define even more competitive solutions.

The Dynamic Complexity Efficiency and the Operational Risk Index of a service is built on a number of metrics developed to assess the service; these are detailed below.

There are a number of uses and or embodiments of the invention the Dynamic Complexity Efficiency and the associated Operational Risk Index in service and operations. That is detailed below:

The Dynamic Complexity Efficiency and the Operational Risk Index of an IT service is built on a number of metrics developed to assess the service; these are detailed below.

There are a number of uses and or embodiments of the invention the Dynamic Complexity Efficiency and the associated Operational Risk Index in service and operations. That is detailed below:

In one embodiment the Dynamic Complexity Efficiency and the Operational Risk Index of a service can be assessed to determine where there are limitations, degradation, source to inflate the stock of outstanding mail, how service can be improved, and what the required actions are.

In another embodiment the Dynamic Complexity Efficiency and the Operational Risk Index can be assessed against standards for that service (e.g. the mail should be delivered within a window of time, a machine cannot work more than n hours, so benchmarking the service against peer or best services)—using both comparators and through the establishment of client and industry standards.

In another embodiment the Dynamic Complexity Efficiency and the Operational Risk Index can be assessed in real time—providing management information on the impact of positive or negative change—for example mail volumes or the failure of a process In another embodiment there can be reporting to the regulators on the Operational Risk Index—to continuously assess and report on the overall Risk of a service.

In another embodiment the Dynamic Complexity Efficiency and the Operational Risk Index can be used to determine the optimal positioning of conventional mail processing environments—determining where workload should be positioned—for hybrid mail environment, parcel processing environments In another embodiment the Dynamic Complexity Efficiency and the Operational Risk Index can be used to determine the correct/optimal platform for a workload (mail and others)

In another embodiment the Dynamic Complexity Efficiency and the Operational Risk Index can be used to optimise the platform sizing against future imperatives—how workload can be distributed across an environment to minimise the platform In another embodiment the Dynamic Complexity Efficiency and the Operational Risk Index can be used to optimise operational process; to determine where the balance of people process or technology needs to be changed Example Applications There are a number of aspects to this patent that deal with the industrial (mail, automotive, distribution of energy etc.) services and operations:

1. Dynamic Complexity of a Service (Sorting, distribution, transportation etc.)
2. Operational Risk Index of a Process (logistics, maintenance, failover, support etc.)
3. Measurement and Benchmarking of the Dynamic Complexity of a Service
4. Measurement and Benchmarking of the Operational Risk Index of a Process While the Dynamic Complexity Efficiency and Operational Risk Index are interesting measures of a Service; it is key that standards are established so that comparative benchmarks can be completed Benchmarking of Dynamic Complexity Efficiency and Operational Risk Index however are industry dependent. So a mail, energy distribution, retail may accept a different measure for its key services, compared to a automotive organisation.

The Dynamic Complexity Efficiency and the Operational Risk Index could be used to monitor and manage a Service and/or a Process—to continuously determine when limitations are exceeded These measures/attributes will need to be balanced to meet service requirements, as each industry and set of users will have a different priority on the attributes.

Standard need to be established by industry and user to determine the correct mix of attributes for a service Measurements need to be made to benchmark service suppliers against the standards Key attributes and the benchmark need to be user to determine the cost of a service against the committed service limits.

A mathematical emulator is built to allow the predictive, preventive, fixing mechanism for both future states as well as operational monitoring. Input to the emulator will be performed through automatic feed or submitted scenarios to compute the dynamic complexity gradient as well as a global risk index For each scenario as well as an operational state (operation, projected or predicted) dynamic complexity gradient as well as a global risk index are computed as function of the metrics outlined above (AM's)

These metrics are expanded within this invention to a number of ratios/percentages for each of the Service Attributes Throughput (mail volume per window of time) Index (TI)=Actual Throughput/Maximum Throughput Cost Efficiency (CE)=Cost of Optimal Service Path/Cost of actual Service Path Quality Index (QI)=Expected Quality (as planned)/Perceived Quality (response delayed for whatever reason)

Service Continuity (SC) equivalent to Availability and Recovery of service=Operable Time/Required Operable Time Systemic Response Time Index (RTI)=Service time (as planned)/Response time (aggregation of service components)

Operational Efficiency (OE)=(planned number of people/actual number of people)×effectiveness of tools (%) and efficiency of process (%)

Sustainability (SU)=PUE of the (sorting centers+logistics+transport+Operating process)

The Dynamic Complexity Efficiency Gradient (DCE) of a service =

$$\sum_{t=1}^{t=x}(TI \times CE \times QI \times SC \times RTI \times OE \times SU \times SE \times LQ) \div t$$

The Operational Risk Index of a Service does consider the entire element including the CE for example one could develop a highly resilient service, with full redundancy, if the cost element was not considered then this option would always be taken, and for practical purposes, while the overall risk of a service is reduced; this is not realistic The Operational Risk Index of a Service therefore=(1−DCE)=the service having a DCE≈1 means that the OR Index of Service is low.

We can differentiate the role each metric plays in the formula by affecting a weight that represent a qualitative perception or a strategic importance, such as:

The Dynamic Complexity Efficiency Gradient (DCE) of a service =

$$\sum_{t=1}^{t=x}(wt_i.TI \times w_{ce.}CE \times w_{qi.}QI \times w_{sc.}SC \times w_{rti.}$$

$$RTI \times w_{oe.}OE \times ws_{u.}SU \times w_{se.}SE \times w_{lq.}LQ) \div t$$

and where $w_{xy}$'s represent normalized weight factor that translate the importance of a factor with respect to the others which obviously different from industry to another or from perception to another.

The simplest way is to consider them is as a power e.g. availability loss for a safety critical mission depends on the reliability of constituents and the eventual domino effect that may result. Therefore we put higher power to the availability term and lower power for the rest. That may be tough in certain cases and we need sometimes the power to be a fraction. The outcome is better than straightforward one-fit-all principle but it is too strong integers to apply.

An embodiment will be a polynomial (of different degrees) another will be to treat it as a cost function that may be numerically computed (as opposed to analytically expressed, therefore our solution becomes semi-analytical) and then re-injected in the dynamic complexity formula. In fact there is an amazing host of methods we can use for estimating these weighting factors, which is a happy position. I think we will not be able to avoid such exercise if we want a decision maker to gain certainty and confidence in the outcome.

Each metric in the gradient should be 1 or less (i.e. 0.8 availability, 0.6 quality of response means we are only deliver good RT 60% of time etc.), then the perception is different from situation/company/project to another; therefore we need to multiply each term by a weighting factor. E.g. for a space mission the availability is more important than quality so we multiply it by a factor which will greatly impact the risk and reduce eventually the other factors (i.e. 90% availability is worse than 30% quality). The question that will stay is: should we normalize the sum of weights. Open question that will eventually impact to what extent an elegant the formulae will be. I think we can use the famous say of patent people: in one embodiment the sum will equal 1.

For most applications of DCE in Supply Chain we would expect $w_{lq} \approx 0$ as capacity is dominated by logistics and the time frame is hours to weeks. This would not be true for data consolidators whose function is to collect filter aggregate and transform transaction records where the measurement period can be minutes or seconds.

The Operational Risk Index of a Service does consider all of the element including the CE for example one could develop a highly resilient service, with full redundancy, if the cost element was not considered then this option would always be taken, and for practical purposes, while the overall risk of a service is reduced; this is not realistic. The Operational Risk Index of a Service therefore=(1−DCE)=the service having a DCE≈1 means that the OR Index of Service is low.

Towards Robust Service Delivery

Global services require stable quality, flexible scalability and anticipated cost structure. In short a predictive capability becomes quickly an indispensable tool to control the quality of delivery, plan necessary resources and assess and intervene to optimize the cost-based-pricing.

Few dynamic characteristics should be explicitly expressed in a predictive apparatus to allow "what if?" scenarios to be tested and evaluated with sufficient confidence and necessary details:

The formation and absorption mechanisms of unprocessed or delayed stock of mail (timely stamped or not), formed at different stages of the service trajectory, due multiple origins (physical capacity, delays of arrivals, synchronization, priorities, interruptions of different kinds, differences in speeds etc.)

The multiple feedback processes that occur due to lack of resources to accomplish the workload, or because of incidents at or between different stages of the processing and some odds in the delivery/distribution processes The simultaneous representation of the provisional workload and the workload resulting from the processing of departed mail. That should allow a real time sizing of the resources necessary for delivery and distribution as well as the management of the end-to-end next day process including the formed stock and the resulting feedback mechanisms.

By real time injection of the status information about each component, process, objects forming the full service topology, the tool will be able to alert on the cause of eventual degradation and suggest alternative routes/actions The case-base of the tool and the real time injection of workload sizes and the information gathered in the previous point should allow efficient and right time problem solving.

The explicit representation of technical, social and economic characteristics and their updates The metrics, parameters and definitions for the Strategic planning Service Planning, Control and Monitoring through the Predictive Emulation Strategic requirements in terms of predictive planning, risk management and corporate actions such as consolidation, merger/acquisition and investment and transformation evaluations are performed through a single tool. Such approach insures continuity, baseline comparisons and maximum certainty and robustness due to its mathematical foundation. The same tool, but deployed differently is used to monitor the operations both in terms of surveillance and supervision. Now the industrial process of collecting, processing and distributing mail is assessed and monitored globally as well as locally allowing the right time fix, the risk anticipation and a robust assessment of improvement and transformation options The Predictive technology is 2-fold: MBA methodology of execution that mainly represents the modus operandi of building representative and accurate predictive emulator and the set of metrics, libraries and algorithms supporting the computation, interpretation and scenario creation and evaluation.

Mail Emulator and MBA (Model-Based-Architecture) Methodology: Phases:
Emulator definition: Capture information and collect data through MBA workshops:
Organization and business service workshop
Strategic documents
Ops, logistics and Process definitions
Service and dynamics constraints identifications
Mail emulator construction
Service organization view: classes of mail, volumes, service constraints
Process, logic and structural components view:
collect, departure, logistics, transportation, stock, arrival and distribution
Sorting centers
Sorting processes
Distribution structures, planning and logistics
Physical implementation view:
Locations
Physical structures of centers, machines, priorities
Human organization, constraints
Mail emulator Validation
Accuracy: computed prediction versus real measurements on actual case
Representativeness: obtain the agreement among stakeholders
Reproducibility: of few actual days
Mail emulator in-use
Keep the model up-to-date: update the base model, anticipate on reflections
Maintain the model definition and scope of use: update libraries and expose required parameters to changes
Educate Stakeholders
Create scenarios and assess outcome in terms of complexity, economy, time to deliver, and cost
Mail Results:
Metrics: Emulator set of patented metrics addresses directly management language. Classified into diagnosis, planning and monitoring metrics, they cover the three dimensional space-time: quantity, quality and cost.
Views: Results are organized as a top/down walk-through set of views:
Control Panel
Throughputs
Service quality
Resources utilization, Cost
Chronograms
Emulation Technology: The main constituents are:
Mathematical Algorithms to compute the three dimensional diagrams at local and aggregated to global levels
Libraries of pre-modeled sub-assembly components representing: processes, vehicles, machines, human interventions, storages build-up, decay processes
Set of patented metrics that explicit the views at global as well as constituent levels
Critical success factors: successful implementation of the approach requires a number of prerequisites, namely:
The Emulator should be representative, accurate, reproducible
Executive management buy-in and backing
Scenario creation and exercising
Ability to perform sensitivity and stress analysis
Ability to perform the work: individually, in group, in project
Re-organizing for the emulator to be at the center of decision
Future Directions for the Role of Predictive Emulator During the next few years, Postal Services will transform, innovate and expand under fierce market dynamics and competition that will touch the three axes (quantity, quality and cost) concurrently. New problems to solve wider range of transformational scenarios to assess and high degree of automation of processing and service delivery will emerge. For these requirements the present invention is transforming to address the real-time constraints in order to support:
Facilitate agile service management
Evaluate technical, economic and market opportunities for new services, products and solutions
Offer both global and local monitoring
Support decommissioning scenarios
Draw the move from oversize of resources to address volatilities to right size of resources invoked on demand
Facilitate the economic, technical and organizational move from public economy to service economy While this invention has been particularly shown and described with references to example embodiments thereof, it will be understood by those skilled in the art that various changes in form and details may be made therein without departing from the scope of the invention encompassed by the appended claims.

What is claimed is:

1. A computer implemented method for deconstructing and evaluating operation of an information system architecture, comprising:
in a computer processor:
defining a static complexity base of an information system of an enterprise, the static complexity base identifying components of the information system and mapping interconnections between the components;
defining a dynamic complexity base of the information system, the dynamic complexity base indicating 1) change in properties of the components over time, and 2) change in properties of the interconnections over time;
constructing a mathematical model of the information system, the mathematical model incorporating information of the static complexity base and the dynamic complexity base;
modeling performance metrics of the model under a first set of operational parameters, said modeling including dimensions of cost, quality of service and throughput;
generating a second set of operational parameters, the second set being distinct from the first set of operational parameters by one set of variables, the one set of variables include at least one of: failure of a component of the system architecture, a delay of an operation, a change in a sequence of operations, and an alternative mode of operation;
modeling performance metrics of the model under the second set of operational parameters, said modeling including dimensions of cost, quality of service and throughput;
comparing the performance metrics of the second set of operational parameters against at least one of the performance metrics of the first set of operational parameters and a set of predetermined thresholds, the predetermined thresholds having dimensions of cost, quality of service, and throughput;
determining a rate of change over time in the performance metrics of the second set of operational parameters relative to the performance metrics of the first set of operational parameters;
determining whether the rate of change over time exceeds at least one of the predetermined thresholds;
identifying an adverse event based on an exponential rate of change over time of at least one of the performance metrics and the determination whether the rate of change exceeds at least one of the predetermined thresholds;
identifying a modification to the model, the modification causing the model to avoid the adverse event under the second set of operational parameters;
updating the model to incorporate the modification; and
modifying the information system of the enterprise based on the updated model to provide a modified information system, the modified information system being configured to avoid the adverse event under the second set of operational parameters.

2. The method of claim 1, wherein defining the static complexity base includes defining behavior of a plurality of the components in response to system functions and the internal state of the component.

3. The method of claim 2, wherein the set of predetermined thresholds include dimensions of cost, quality of service and throughput.

4. The method of claim 1, wherein defining the static complexity base includes defining constraints of the system, the constraints including at least one of: the work capacity of a component, the flow capacity of a connection between components, and a cost threshold.

5. The method of claim 1, wherein defining the static complexity base includes defining a flow of work product between components.

6. The method of claim 5, further comprising comparing the difference in performance metrics against a threshold.

7. The method of claim 6, further comprising identifying characteristics of the series of components contributing to the adverse event.

8. The method of claim 1, wherein defining the dynamic complexity includes defining changes undertaken by a plurality of components of the system over time in response to an indicated input.

9. The method of claim 1, wherein defining the dynamic complexity includes defining changes to a component over time in response to at least one of: growth via an increased workload, growth in content of the component, and change in performance of the component resulting from aging.

10. The method of claim 1, wherein defining the dynamic complexity includes defining changes to a connection between components over time in response to at least one of: growth in a population of the connection, and increased flow through the connection.

11. The method of claim 1, further comprising reporting the adverse event and characteristics of the information system architecture under the second set of operational parameters.

12. The method of claim 1, wherein reporting the characteristics of the information system architecture includes reporting the performance metrics under the second set of operational parameters relative to the set of predetermined thresholds.

13. The method of claim 1, wherein reporting the characteristics of the information system architecture includes reporting a difference in performance metrics resulting from the first set of operational parameters and the second set of operational parameters.

14. The method of claim 13, further comprising identifying a series of components operationally linked between the one set of variables and the component proximate to the adverse event.

15. The method of claim 1, wherein generating the second set includes:
analyzing a record of operation of the information system architecture; and
selecting the one set of variables as a function of at least one of a historical trend, a pattern and a fault as indicated in the record.

16. The method of claim 1, wherein the mathematical model includes characteristics corresponding to changes in components of the system relative to an operational time of the system.

17. The method of claim 1, wherein the mathematical model includes characteristics corresponding to changes in connections between components of the system relative to an operational time of the system.

18. The method of claim 1, wherein modeling the performance metrics of the model under the second set of operational parameters includes modeling the performance metrics over a given time, the adverse event includes a change in the performance metrics that exceeds a threshold of change over the given time.

19. The method of claim 1, wherein the adverse event includes a singularity.

20. The method of claim 1, further comprising identifying a component of the system that is proximate to the adverse event.

21. A computer implemented method for evaluating operation of a system architecture, comprising:
   in a computer processor:
   defining a static complexity base of a system, the static complexity base identifying components of the system and mapping interconnections between the components;
   defining a dynamic complexity base of the system, the dynamic complexity base indicating 1) change in properties of the components over time, and 2) change in properties of the interconnections over time;
   constructing a mathematical model of the system, the mathematical model incorporating information of the static complexity base and the dynamic complexity base, the model including a plurality of components, a description of connections and functional relationships between the components, and a description of behavior of each component in response to system functions and the internal state of the component, the mathematical model including a definition of changes undertaken by a plurality of components of the model over time in response to an indicated input;
   modeling performance metrics of the model under a first set of operational parameters, said modeling including dimensions of cost, quality of service and throughput;
   generating a second set of operational parameters, the second set being distinct from the first set of operational parameters by one set of variables, the one set of variables include at least one of: failure of a component of the system architecture, a delay of an operation, a change in a sequence of operations, and an alternative mode of operation;
   modeling performance metrics of the model under the second set of operational parameters, said modeling including dimensions of cost, quality of service and throughput;
   comparing the performance metrics of the second set of operational parameters against at least one of the performance metrics of the first set of operational parameters and a set of predetermined thresholds, the predetermined thresholds having dimensions of cost, quality of service, and throughput;
   determining a rate of change over time in the performance metrics of the second set of operational parameters relative to the performance metrics of the first set of operational parameters;
   determining whether the rate of change over time exceeds at least one of the predetermined thresholds;
   identifying an adverse event based on an exponential rate of change over time of at least one of the performance metrics and the determination whether the rate of change exceeds at least one of the predetermined thresholds;
   identifying a modification to the model, the modification causing the model to avoid the adverse event under the second set of operational parameters;
   updating the model to incorporate the modification; and
   modifying the information system of the enterprise based on the updated model to provide a modified information system, the modified information system being configured to avoid the adverse event under the second set of operational parameters.

22. The method of claim 21, wherein defining the static complexity base includes defining behavior of a plurality of the components in response to system functions and the internal state of the component.

23. The method of claim 21, wherein defining the static complexity base includes defining constraints of the system, the constraints including at least one of: the work capacity of a component, the flow capacity of a connection between components, and a cost threshold.

24. The method of claim 21, wherein defining the static complexity base includes defining a flow of work product between components.

25. The method of claim 21, wherein defining the dynamic complexity includes defining changes undertaken by a plurality of components of the system over time in response to an indicated input.

26. The method of claim 21, wherein defining the dynamic complexity includes defining changes to a component over time in response to at least one of: growth via an increased workload, growth in a population of the component, and change in performance of the component resulting from aging.

27. The method of claim 21, wherein defining the dynamic complexity includes defining changes to a connection between components over time in response to at least one of: growth in a population of the connection, and increased flow through the connection.

28. The method of claim 21, further comprising reporting the adverse event and characteristics of the information system architecture under the second set of operational parameters.

* * * * *